(12) United States Patent
Fujita et al.

(10) Patent No.: US 7,863,794 B2
(45) Date of Patent: Jan. 4, 2011

(54) ARMATURE WINDING OF ROTATING ELECTRICAL MACHINE

(75) Inventors: Masafumi Fujita, Yokohama (JP); Tadashi Tokumasu, Tokyo (JP); Mikio Kakiuchi, Yokohama (JP); Hiroshi Hatano, Chofu (JP); Takashi Ueda, Yokohama (JP); Ken Nagakura, Fujisawa (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 12/834,477

(22) Filed: Jul. 12, 2010

(65) Prior Publication Data
US 2010/0277029 A1 Nov. 4, 2010

Related U.S. Application Data

(63) Continuation of application No. PCT/JP2009/069397, filed on Nov. 13, 2009.

(30) Foreign Application Priority Data

Nov. 13, 2008 (JP) .............................. 2008-291216

(51) Int. Cl.
*H02K 3/28* (2006.01)
*H02K 3/40* (2006.01)
(52) U.S. Cl. ......................... 310/198; 310/196; 310/205
(58) Field of Classification Search ................. 310/196, 310/198–205
See application file for complete search history.

(56) References Cited

U.S. PATENT DOCUMENTS

| 2,778,963 | A | 1/1957 | Habermann |
|---|---|---|---|
| 3,152,273 | A | 10/1964 | Harrington |
| 3,201,627 | A * | 8/1965 | Harrington .................. 310/198 |
| 3,408,517 | A * | 10/1968 | Willyoung ................... 310/198 |
| 3,652,888 | A * | 3/1972 | Harrington .................. 310/198 |
| 3,660,705 | A | 5/1972 | Willyoung |
| 3,739,213 | A * | 6/1973 | Willyoung ................... 310/198 |
| 4,200,817 | A * | 4/1980 | Bratoljic ..................... 310/198 |
| 4,341,970 | A | 7/1982 | Auinger |
| 4,404,486 | A * | 9/1983 | Keim et al. .................. 310/198 |
| 6,388,357 | B1 | 5/2002 | Tokumasu |
| 2007/0170804 | A1 | 7/2007 | Baumann |
| 2009/0096312 | A1 | 4/2009 | Tokumasu |
| 2009/0195105 | A1* | 8/2009 | Tokumasu et al. .......... 310/198 |

FOREIGN PATENT DOCUMENTS

| JP | 9205750 | 8/1997 |
|---|---|---|
| JP | 2000350396 | 12/2000 |
| JP | 2001309597 | 11/2001 |
| JP | 3578939 | 7/2004 |
| JP | 200899502 | 4/2008 |

\* cited by examiner

*Primary Examiner*—Burton Mullins
(74) *Attorney, Agent, or Firm*—Harness, Dickey & Pierce, P.L.C.

(57) ABSTRACT

There is provided a 3-phase 2-layer armature winding of a rotating electrical machine. The lead-out connection conductor connected to the output terminal is connected to a coil piece positioned at least farther than a first coil piece inside the phase belt counted from the end of the each phase belt, and a coil piece positioned at the end of the phase belt is connected to a coil piece positioned at least farther than the n-th (n is an integer larger than 1) inside the phase belt counted from the other end of the phase belt in the same parallel circuit, by a jumper wire.

41 Claims, 41 Drawing Sheets

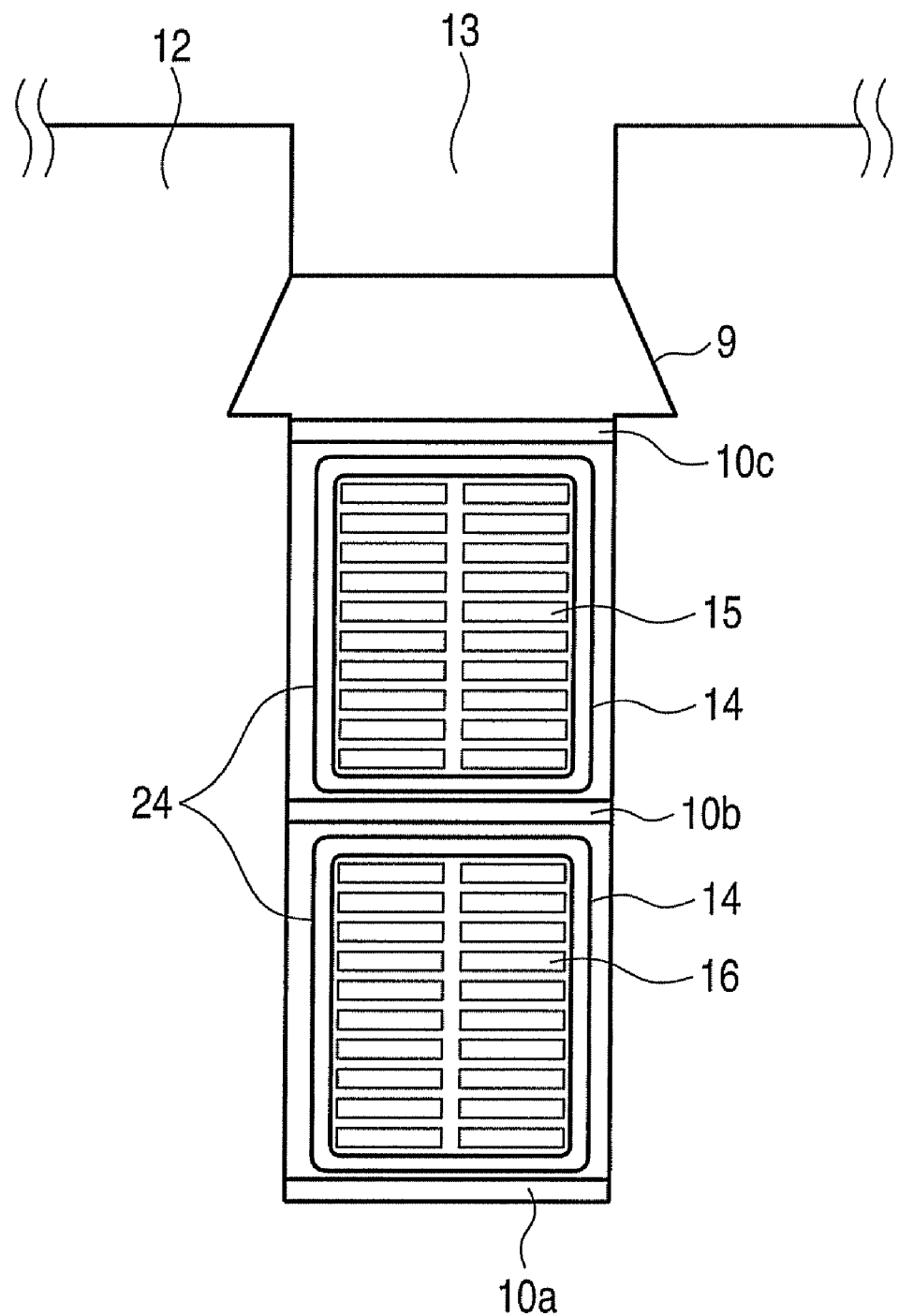
F I G. 33

ARMATURE WINDING OF ROTATING ELECTRICAL MACHINE

CROSS-REFERENCE TO RELATED APPLICATIONS

This is a Continuation Application of PCT Application No. PCT/JP2009/069397, filed Nov. 13, 2009, which was published under PCT Article 21 (2) in Japanese.

This application is based upon and claims the benefit of priority from prior Japanese Patent Application No. 2008-291216, filed Nov. 13, 2008, the entire contents of which are incorporated herein by reference.

BACKGROUND OF THE INVENTION

1. Field of the Invention

The invention relates to an armature winding of a rotating electrical machine, which is configured to prevent generation of corona discharge by reducing a potential difference between adjacent coil pieces.

2. Description of the Related Art

A conventional armature winding of a rotating electrical machine has a structure shown in FIG. 33.

FIG. 33 is a sectional view showing an example of an armature winding placed in a slot of an armature core of a rotating electrical machine.

In FIG. 33, a reference number 12 denotes an armature core formed by stacking a laminated iron plate. An armature winding 14 is housed in a slot 13 provided in the circumference of the armature core 12.

The armature winding 14 is provided in two layers of upper coil pieces 15 close to the slot opening, and lower coil pieces 16 close to the slot bottom, and the outer circumference is covered by a main insulating layer 24.

An insulating plate 10a is provided at the slot bottom, and an insulating partition plate 10b is provided between the upper coil piece 15 and lower coil piece 16. A wedge 9 is inserted into the slot opening through an insulating plate 10c.

In a large-capacity rotating electrical machine, the machine capacity is increased by increasing a generated voltage by connecting the upper and lower coil pieces 15 and 16 of the armature winding 14 in series.

As a voltage of the armature winding 14 is increased, the thickness of the main insulating layer 24 of the armature winding is increased to withstand the voltage. As a result, a cross section of a conductor is decreased, a current density is increased, and a loss is increased. Thus, the armature winding is divided into multiple parallel circuits, the armature winding voltage is decreased without changing the machine capacity, and the thickness of the main insulating layer 24 is decreased, thereby decreasing the loss and increasing the cooling capacity.

First, a first example of a conventional armature winding is described.

FIG. 34 is a developed perspective view of one phase of a 2-pole 3-phase 66-slot armature winding having two parallel circuits. FIG. 35 is a developed perspective view of three phases of the same armature winding shown in FIG. 34. The other two phases not shown in FIG. 34 are obtained by displacing the configuration of the shown armature winding by 120° and 240°, respectively.

As shown in FIG. 34, in the armature winding 14, eleven slots are occupied by each of the upper and lower coil pieces per one phase belt.

The phase belt mentioned here means a part of a winding, which forms one same phase by dividing each of three phases into multiple parts, housing upper and lower coil pieces in two layers in multiple slots of an assigned laminated iron core (an armature core), and sequentially connecting them in series.

As shown in FIG. 34, the armature winding 14 of each phase has the upper coil piece 15 (15a, 15b) housed in a slot close to an opening, and the lower coil piece (16a, 16b) housed in a slot close to a bottom. The ends of the upper and lower coil pieces 15 and 16 are connected in series at a connection side coil end 19a connected to a lead-out portion of the winding, and at a counter-connection side coil end 19b that is axially opposite and not connected to a lead-out portion of the winding.

Further, the armature winding 14 has a first phase belt 17, in which each of the upper and lower coil pieces 15 and 16 are housed in eleven slots 13 ($1^{st}$ to $11^{th}$ slots, and $28^{th}$ to $38^{th}$ slots) provided in the armature core 12, and a second phase belt 18, in which each of the upper and lower coil pieces 15 and 16 are housed in eleven slots 13 ($34^{th}$ to $44^{th}$ slots, and $61^{st}$ to $5^{th}$ slots).

The armature winding 14 of each phase has two parallel circuits, which are indicated by a solid line and a broken line.

In the first and second phase belts 17 and 18, the upper coil piece 15 is connected to the corresponding lower coil piece 16 separated by a fixed pitch, at the connection side and counter-connection side coil ends 19a and 19b, thereby forming two parallel circuits. The parallel circuits are connected in parallel through a lead-out connection conductor 21 provided at the connection side coil end 19a, thereby forming the armature winding 14.

In FIG. 34, on the counter-connection side, an upper coil piece placed in the $1^{st}$ slot (the $1^{st}$ upper coil piece) is connected to a lower coil piece placed in the $28^{th}$ slot (the $28^{th}$ lower coil piece), and a coil pitch is 27. On the counter-connection side, an upper coil piece placed in the $11^{th}$ slot (the $11^{th}$ upper coil piece) is connected to a lower coil piece placed in the $37^{th}$ slot (the $37^{th}$ lower coil piece), and a coil pitch is 26.

In the armature winding shown in FIG. 34, a winding pitch means a pitch between the slot 13 housing the upper coil piece 15a of the first phase belt 17 and the slot 13 housing lower coil pieces, for example, and the winding pitch in FIG. 34 is 27. In other words, the upper and lower coil pieces are connected to have a coil pitch one less than a winding pitch at the connection side coil end, and a coil pitch equal to a winding pitch at the counter-connection side coil end.

When the number of parallel circuits of each phase belt is less than the number of poles, as seen in Patent document 1 (FIG. 2), for example, a lead-out portion is usually provided at the end of a phase belt, and a conductor of the lead-out portion is connected to a coil piece at the phase belt end. For example, in FIG. 34, at the connection side coil end 19a of the first phase belt 17, the lead-out connection conductor 21 connected to the output terminal 22 is connected to the $1^{st}$ coil piece of the upper coil piece 15a, and the $38^{th}$ coil piece of the lower coil piece 16a is connected to the lead-out connection conductor 21, and further connected to a neutral terminal 23.

In the second phase belt 18, at the connection side coil end 19a, the lead-out connection conductor 21 connected to the output terminal 22 is connected to the $5^{th}$ coil piece of the lower coil piece 16a, and the $34^{th}$ coil piece of the upper coil piece 15b is connected to the lead-out connection conductor 21, and further connected to the neutral terminal 23.

In the following description, the centers of magnetic pole Pa and Pb are defined as shown in FIG. 34, and in the first phase belt, the $1^{st}$ upper coil piece is called an upper coil piece positioned at the phase belt end far from the magnetic pole center, and the $11^{th}$ upper coil piece is called an upper coil piece positioned at the phase belt end close to the magnetic pole center. Concerning the lower coil piece, the 28$^{th}$ lower coil piece is called a lower coil piece positioned at the phase belt end close to the magnetic pole center, and the 38$^{th}$ lower coil piece is called a lower coil piece positioned at the phase belt end far from the magnetic pole center.

Therefore, in normal connection, the first upper coil piece that is an upper coil piece positioned at the phase belt end far from the magnetic pole center is connected to the 28$^{th}$ lower coil piece that is a lower coil piece positioned at the phase belt end close to the magnetic pole center.

In the armature winding 14, coil pieces are sequentially wound from the left side to right side in FIG. 34, namely from the 1$^{st}$ upper coil piece to 28$^{th}$ lower coil piece, 2$^{nd}$ upper coil piece, and 29$^{th}$ lower coil piece. Hereinafter, this will be described as coil pieces wound so that upper coil pieces are positioned close to the magnetic pole center.

Similarly, in the second phase belt, the 5$^{th}$ lower coil piece, 4$^{th}$ upper coil piece, 4$^{th}$ lower coil piece, and 43$^{rd}$ upper coil piece coil pieces are wound so that lower coil pieces are positioned close to the magnetic pole center.

In the following description, a phase comprising the 1$^{st}$ to 11$^{th}$ upper coil pieces is called a V-phase, a phase comprising the 12$^{th}$ to 22$^{nd}$ upper coil pieces is called a U-phase, and a phase comprising the 23$^{rd}$ to upper coil pieces is called a W-phase. This will be repeated in the following coil pieces. It is of course no problem if the configuration and sequence of the V, U and W phases are changed.

Next, a potential difference between adjacent coil pieces is explained. Here, the potential difference is indicated by p.u. as a ratio to an induced voltage in one phase.

Regarding the coil pieces at the phase belt end in FIG. 35, the potential of the upper coil piece placed in the 23$^{rd}$ slot (the 23$^{rd}$ upper coil piece) at the connection side end is 1[PU], and the potential of the upper coil piece placed in the adjacent 22$^{nd}$ slot (the 22$^{nd}$ upper coil piece) is 10/11 [PU].

FIG. 36 shows a vector indicating an example of the potential difference between the adjacent coil pieces in FIG. 35. The potential difference between the 23$^{rd}$ upper coil piece and 22$^{nd}$ upper coil piece is 1.654 [PU] considering a phase difference.

On the other hand, as the upper coil piece placed in the 12$^{th}$ slot (the 12$^{th}$ upper coil piece) is connected to the neutral terminal 23, the potential of the 12$^{th}$ upper coil piece at the connection side end is 0 [PU] at the connection side end, and the potential of the upper coil piece placed in the adjacent 11$^{th}$ slot is 1/11 [PU]. As indicated by the vector in FIG. 36, the potential difference between the 12$^{th}$ upper coil piece and 11$^{th}$ upper coil piece is 1/11=0.091 [PU].

On the other hand, between coil pieces of the same phase, the potential difference between any coil pieces is 1/11=0.091 [PU].

FIG. 37 shows the potential differences between adjacent coil pieces, particularly upper coil pieces, at the connection side coil end obtained as described above. The phases shown in legends indicate the phases of coil pieces to which smaller numbers are given.

As shown in FIG. 37, in the above-described 2-pole 3-phase 66-slot armature winding having two parallel circuits, a maximum potential difference between adjacent coil pieces is 1.654 [PU] in the boundary of phase belts.

Next, a second example of a conventional armature winding is explained.

FIG. 38 is a developed perspective view of one phase of a 2-pole 3-phase 66-slot armature winding having one parallel circuit. The number of slots occupied by each of the upper and lower coil pieces per one phase belt is 11, as in the armature winding shown in FIG. 34.

In FIG. 38, the winding pitch is 27, which is the same as the coil pitch 27 at the counter-connection side coil end 19b, and the coil pitch 26 at the connection side coil end 19a is one less than the winding pitch.

In FIG. 38, as in FIG. 34, a coil piece at the phase belt end is connected to a lead-out connection conductor. For example, in FIG. 34, at the connection side coil end 19a of the first phase belt 17, the 1$^{st}$ coil piece of the upper coil piece 15a is connected to the lead-out connection conductor 21, and further connected to the output terminal 22, and at the connection side coil end 19a of the second phase belt 18, the 34$^{th}$ coil piece of the upper coil piece 15b is connected to the lead-out connection conductor 21, and further connected to the neutral terminal 23.

The 38$^{th}$ coil piece of the lower coil piece 16a in the first phase belt 17 and the 5$^{th}$ coil piece of the lower coil piece 16b in the second phase belt 18 are connected by a connection side jumper wire 20a.

Next, the potential difference between adjacent coil pieces will be explained. For example, regarding the coil pieces at the phase belt end in FIG. 38, the potential of the 44$^{th}$ upper coil piece at the connection side end is 10/22 [PU], and the potential of the not-shown adjacent 45$^{th}$ upper coil piece is 1 [PU]. The potential difference between the 44$^{th}$ upper coil piece and 45$^{th}$ upper coil piece is 1.289 [PU] considering a phase difference of 120°.

FIG. 39 shows a potential difference between adjacent coil pieces at a connection side coil end. In the second example of a conventional armature winding, a maximum potential difference between adjacent coil pieces is 1.289 [PU] in the boundary of phase belts.

Next, a third example of a conventional armature winding is explained.

In a large-capacity rotating electrical machine using an indirect cooling system, in particular, it is common to increase a cooling cycle of an armature winding by increasing the number of slots in an armature core. Thus, an armature winding having three or more parallel circuits is required. When the number of parallel circuits is more than the number of poles, as in a 2-pole 3-parallel-circuit armature winding, it is impossible to completely equate the voltage generated in each parallel circuit, and a circulation current is generated between the parallel circuits, increasing a loss in the armature winding.

To decrease a loss caused by a circulation current, it is necessary to minimize the imbalance in the voltages generated in the parallel circuits. Therefore, it is necessary to take special care in the arrangement of coil pieces in each parallel circuit in each phase belt.

FIG. 40 is a developed perspective view of one phase of an armature winding described in Patent document 4. This is a 2-pole 3-phase armature winding having 72 slots in an armature core. The number of slots per one phase belt occupied by each of the upper and lower coil pieces is 12.

The armature winding comprises three parallel circuits, 1 to 3, indicated by three kinds of line in FIG. 40. The parallel circuits of twelve upper coil pieces 15a and lower coil pieces 16a, constituting a first phase belt 17, are numbered 1, 2, 3, 1, 2, 3, 1, 2, 3, 1, 2, 3 sequentially from the left side, and similarly, the parallel circuits of twelve upper coil pieces 15b and lower coil pieces 16b, consisting a second phase belt, are numbered 3, 2, 1, 3, 2, 1, 3, 2, 1, 3, 2, 1 sequentially from the left side, thereby decreasing a voltage deviation (an absolute value of deviation from an average phase voltage) in the parallel circuits and a phase deviation (a phase angle deviation from an average phase voltage) in the parallel circuits.

To realize the above connection, in the armature winding 14 shown in FIG. 40, the lead-out ends of the parallel circuits of the first and second phase belts 17 and 18 are connected by the lead-out connection conductor 21.

The potential difference between adjacent coil pieces is 1.231 [PU] at maximum in the boundary of the phase belts, between the $1^{st}$ upper coil piece and not-shown $72^{nd}$ upper coil piece, for example.

Next, a fourth example of a conventional armature winding is explained.

Patent document 5 describes an improvement to simplify the structure of an armature winding of a rotating electrical machine shown in the third example.

FIG. 41 is a developed perspective view of one phase of an armature winding improved by the method described in patent document 5. This is a 2-pole 3-phase armature winding having 72 slots in an armature core. The number of slots per one phase belt occupied by each of the upper and lower coil pieces is 12.

The armature winding comprises three parallel circuits, 1 to 3, indicated by three kinds of line in FIG. 40. The parallel circuits of twelve upper coil pieces 15a and lower coil pieces 16a, consisting a first phase belt 17, are numbered 1, 2, 1, 2, 1, 1, 2, 1, 1, 2, 1 sequentially from the left side. Similarly, the parallel circuits of twelve upper coil pieces 15b and lower coil pieces 16b, consisting a second phase belt 18, are numbered 3, 2, 3, 3, 2, 3, 3, 2, 3, 3, 2, 3 sequentially from the left side. The parallel circuit 3 of the first phase belt and parallel circuit 1 of the second phase belt, which are electrically equivalent, are interchanged so that the parallel circuits 1 and 3 are placed in the same phase belt.

To realize the above connection, in the armature winding 14 shown in FIG. 41, the connection side lead-out end 19a is expanded by a 2-phase jumper wire 20a, and the lead-out terminals of the parallel circuits of the first and second phase belts 17 and 18 are connected by the lead-out connection conductor 21.

The potential difference between adjacent coil pieces is 1.625 [PU] at maximum in the boundary of the phase belts, between the $1^{st}$ upper coil piece and not-shown $72^{nd}$ upper coil piece, for example.

When the voltage of the armature winding is increased, the potential difference between adjacent coil pieces is increased. Particularly, in the above-described example of a conventional armature winding, the potential difference between adjacent coil pieces in the boundary of phase belts is increased, and corona discharge may occur during operation at the coil end in the boundary of phase belts.

Especially, in a rotating electrical machine using an indirect cooling system to cool an armature winding from the outside of a main insulating layer, when non-pressurized air is used as a coolant, corona discharge is more likely to occur than when using hydrogen as the coolant, the insulation is deteriorated, and the operation of a rotating electrical machine may become unstable. This becomes a problem when increasing the voltage and capacity of a rotating electrical machine.

In an ideal state, corona discharge occurs in an electric field of about 3 kV/mm in air at a room temperature and atmospheric pressure, but actually, corona discharge may occur in a lower electric field, depending on the surface conditions of a charged material.

To prevent corona discharge between coil pieces in the boundary of phase belts, patent document 1 improves corona resistance by winding a mica tape or sheet around a coil end, or the outside of a corona prevention layer.

Further, even if electric discharge occurs between coil ends, the corona resistant mica prevents corona discharge caused by the electric discharge, or decreases the insulation damage.

The invention described in the patent document 1 decreases the insulation damage without changing the coil shape, whereas a tape or sheet is further wound around the outside of an insulated coil. This deteriorates heat transfer in the insulating material, and coil cooling effect, causing localized overheating. Further, the size, including the insulating material, is increased, the maintenance workability is lowered, and the armature may be accidentally damaged by maintenance.

In patent document 2, two kinds of coil groups with different directions of induced magnetic flux are prepared and combined to decrease a potential difference between coil pieces.

However, in the configuration described in patent document 2, the coil end structure is restricted, and the coil group structure is complicated. The configuration is not suitable for a large-capacity rotating electrical machine such as a large turbine generator for thermal power generation.

Further, patent document 3 describes a 3-phase 4-pole 72-slot armature winding having three parallel circuits, in which coil pieces other than those at the ends of a phase belt are connected to a lead-out portion, and the voltage imbalance between the parallel circuits is reduced, and the potential difference between adjacent coils in the other phase is decreased on the connection side.

However, patent document 3 aims at reducing the voltage imbalance between parallel circuits, and describes a winding method with specific numbers of poles, slots and parallel circuits. It does not decrease the potential difference from the coil pieces of the adjacent other phase, while keeping the same state as in conventional examples with respect to the voltage imbalance between parallel circuits.

It is possible to provide a larger space between coil pieces to increase the distance between the coil pieces of different phases at a coil end. However, this increases the size of a rotating electrical machine, increases the amount of material, and the increased weight restricts transportation and installation of the machine. It is also possible to provide a larger space between coil pieces by deforming a coil end after assembling. However, this may damage the insulation when deforming the coils, generates an unbalanced electromagnetic force, causing a problem in the reliability of a rotating electrical machine.

It is necessary to increase a line current or a terminal voltage to increase the capacity of a rotating electrical machine. A line current is restricted by a temperature increase, and the size and weight of a coil doctor. Therefore, it is necessary to increase a terminal voltage. For this purpose, it is necessary to restrict corona discharge of an armature winding as described above.

PRIOR ART DOCUMENTS

Patent Documents

Patent document 1: U.S. Patent Application Publication No. 2007/0170804

Patent document 2: U.S. Pat. No. 4,341,970

Patent document 3: Japanese Patent No. 3578939

Patent document 4: U.S. Pat. No. 3,152,273

Patent document 5: U.S. Pat. No. 3,660,705

BRIEF SUMMARY OF THE INVENTION

It is an object of the invention to provide a highly reliable armature winding of a rotating electrical machine, which is configured to prevent generation of corona discharge by reducing a potential difference between adjacent coil pieces, without increasing the dimensions of an insulator at a coil end.

According to one aspect of the invention, there is provided a 3-phase 2-layer armature winding of a rotating electrical machine, comprising: upper coil pieces and lower coil pieces housed in two layers in a plurality of slots provided in a armature core, the upper coil pieces and lower coil pieces being sequentially connected in series at a connection side coil end and a counter-connection side coil end, forming one and the same phase, each phase belt of the winding having n-th parallel circuits (n is an integer larger than 1), and an output terminal lead-out connection conductor connected to an output terminal and a neutral terminal lead-out connection conductor connected to a neutral terminal being connected to the coil pieces at the connection side coil end of said each phase belt, wherein the lead-out connection conductor connected to the output terminal is connected to a coil piece positioned at least farther than a first coil piece inside the phase belt counted from the end of said each phase belt, and a coil piece positioned at the end of the phase belt is connected to a coil piece positioned at least farther than the n-th (n is an integer larger than 1) inside the phase belt counted from the other end of the phase belt in the same parallel circuit, by a jumper wire.

According to the invention, it is possible to improve reliability by reducing a potential difference between adjacent coil pieces, and prevent generation of corona discharge, without increasing the dimensions of an insulator at a coil end.

BRIEF DESCRIPTION OF THE SEVERAL VIEWS OF THE DRAWING

FIG. 33 is a sectional view of a slot of an armature of a rotating electrical machine;

DETAILED DESCRIPTION OF THE INVENTION

Hereinafter, embodiments of the invention will be explained with reference to the accompanying drawings.

Embodiment 1

Figure 1:
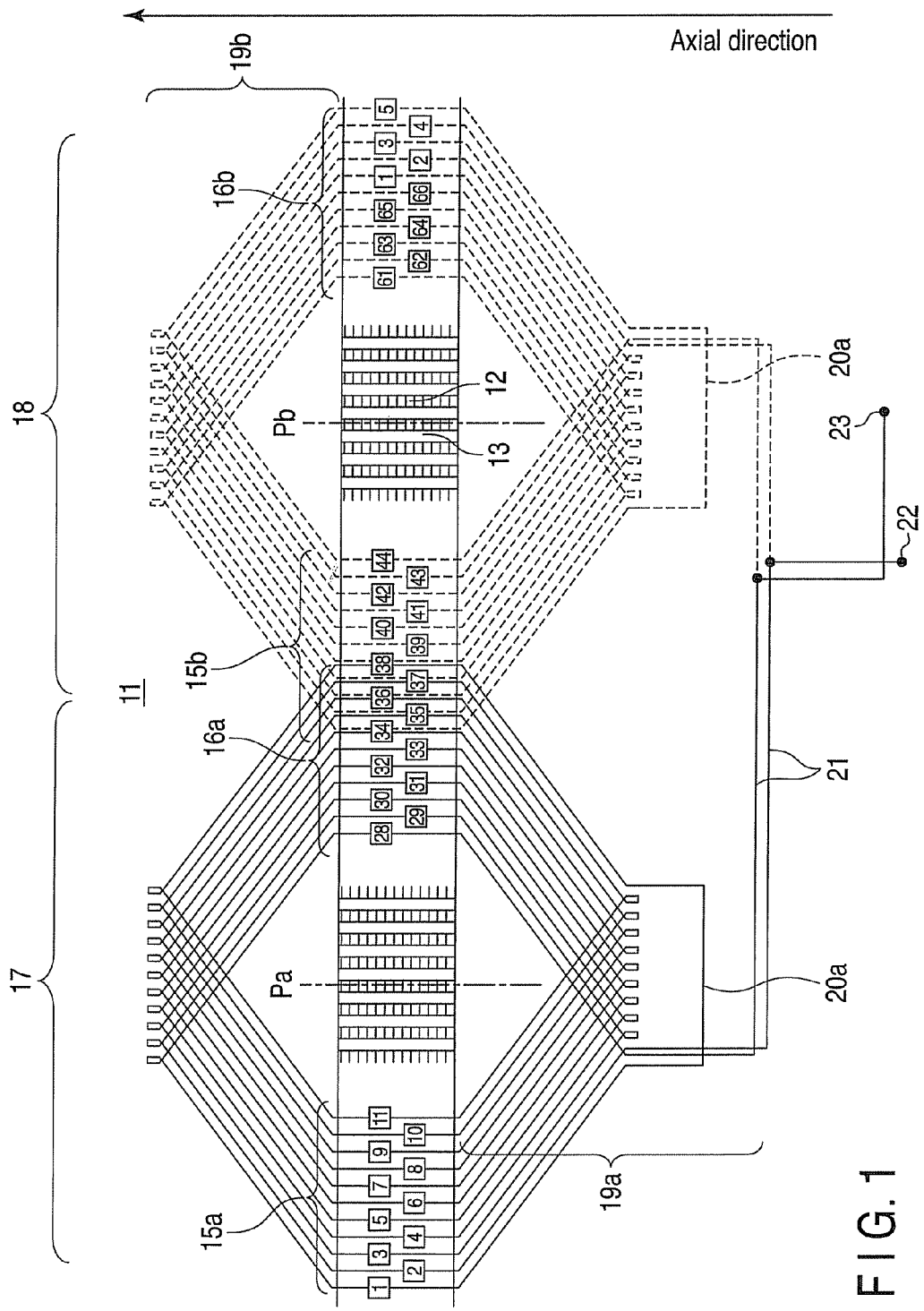
FIG. 1 is a developed perspective view of one phase of a first embodiment of an armature winding of a rotating electrical machine according to the invention.
Figure 2:
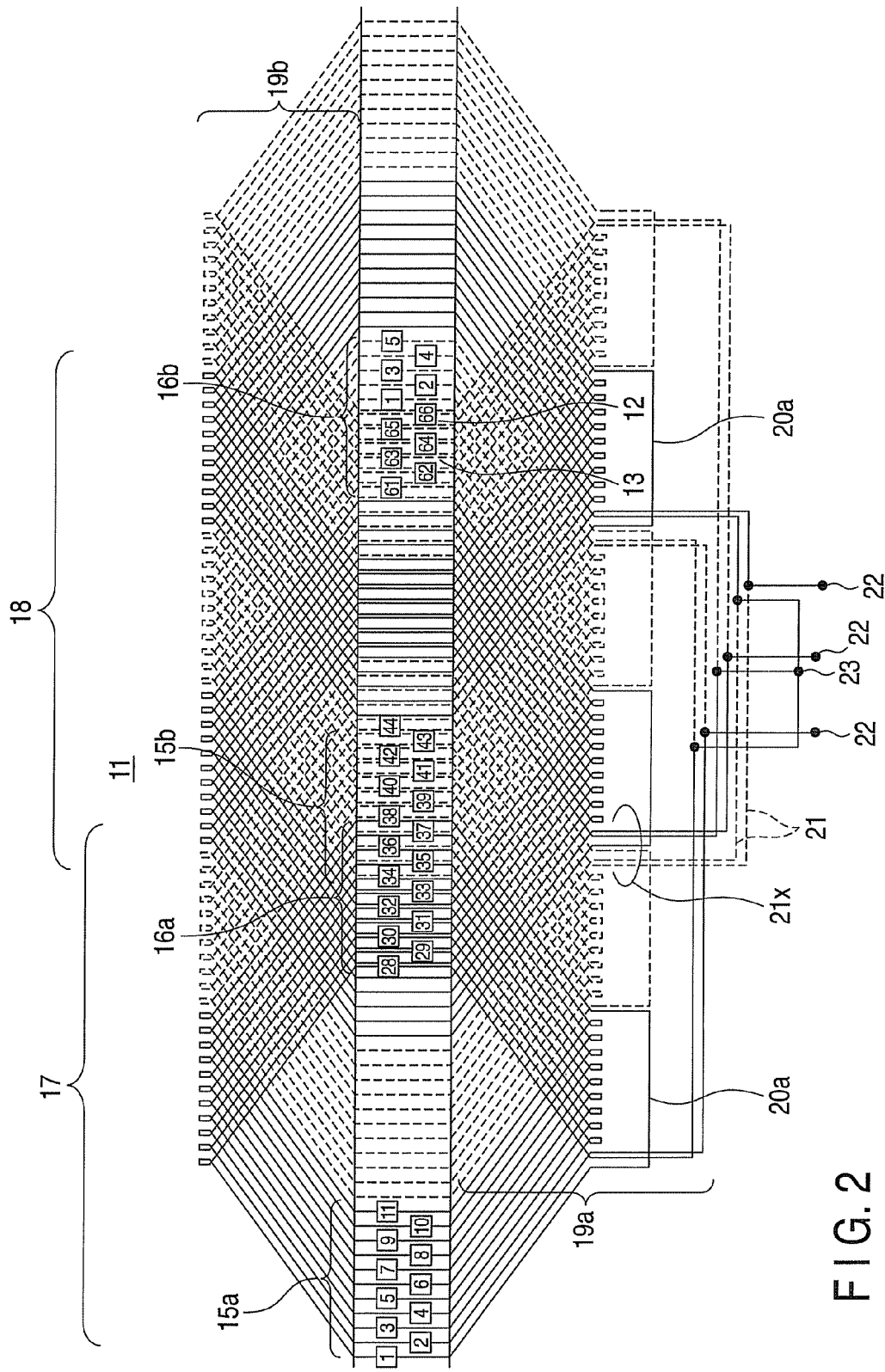
FIG. 2 is a developed perspective view of three phases of the same embodiment.

FIG. 1 is a developed perspective view of one phase of a first embodiment of an armature winding of a rotating electrical machine according to the invention. FIG. 2 is a developed perspective view of three phases of the same embodiment, in which two phases arranged by shifting an electric angle by 120° and 240° are added to one phase of the armature winding shown in FIG. 1.

As shown in FIG. 1, an armature 11 of a rotating electrical machine has sixty-six slots 13 in an armature core 12 comprising a laminated iron core. In the slot 13, a 2-pole 3-phase 2-parallel-circuit armature winding 14 is housed in two layers. The armature winding 14 of each phase has an upper coil piece 15 (15a and 15b) housed close to the slot opening, and a lower coil piece 16 (16a and 16b) housed close to the slot bottom. The ends of the upper and lower coil pieces 15 and 16 are connected in series at a connection side coil end 19a connected to a lead-out portion of the winding, and at a counter-connection side coil end 19b that is axially opposite to the connection side coil end and not connected to a lead-out portion of the winding.

Further, the armature winding 14 has a first phase belt 17 in which each of the upper and lower coil pieces 15 and 16 are housed in eleven slots 13 ($1^{st}$ to $11^{th}$ slots, and $28^{th}$ to $38^{th}$ slots) provided in the armature core 12, and a second phase belt 18 in which each of the upper and lower coil pieces 15 and 16 are housed in eleven slots 13 ($34^{th}$ to $44^{th}$ slots, and $61^{st}$ to $5^{th}$ slots).

The armature winding 14 of each phase has two parallel circuits. The parallel circuits are indicated by a solid line and a broken line, respectively.

In the first phase belt 17 and second phase belt 18, the upper coil piece 15 is connected to the corresponding lower coil pieces 16 separated by a fixed pitch, at the connection side end 19a and counter-connection side coil end 19b, thereby forming two parallel circuits. The parallel circuits are connected in parallel through the lead-out connection conductor 21 provided at the connection side coil end 19a, thereby forming the armature winding 14. In FIG. 1, on the counter-connection side, the upper coil piece placed in the first slot (the $1^{st}$ coil piece) is connected to the lower coil piece placed in the $28^{th}$ slot (the $28^{th}$ lower coil piece), and the coil pitch 27. On the counter-connection side, the $11^{th}$ upper coil piece is connected to the $37^{th}$ lower coil piece, and the coil pitch is 26.

In the armature winding shown in FIG. 1, the winding pitch is 27, and the coil pitch at the connection side coil end is one less than the winding pitch, and the coil pitch at the counter-connection side coil end is equal to the winding pitch.

In the first embodiment, to decrease the potential difference between coil pieces in the boundary of phase belts, the coil piece housed in the second slot from the end of a phase belt is connected to a lead-out portion. In other words, in FIGS. 1 and 2, at the connection side coil end 19a of the first phase belt 17, the lead-out connection conductor 21 connected to the output terminal 22 is connected to the $2^{nd}$ upper coil piece 15a, and sequentially wound from the $2^{nd}$ upper coil piece to $29^{th}$ lower coil piece, $3^{rd}$ upper coil piece, and $30^{th}$ lower coil piece, so that the upper coil pieces are positioned close to the magnetic pole center, and the $38^{th}$ lower coil piece that is the phase belt end of the lower coil piece far from the magnetic pole of the first phase belt 17 is connected to the $1^{st}$ upper coil piece that is the phase belt end of the upper coil piece far from the magnetic pole, by the jumper wire 20a.

The $1^{st}$ upper coil piece is connected to the $28^{th}$ lower coil piece positioned at the phase belt end of the lower coil piece close to the magnetic pole, and further connected to the neutral terminal 23 through the lead-out connection conductor 21.

In the second phase belt 18, at the connection side coil end 19a, the lead-out connection conductor 21 connected to the output terminal 22 is connected to the lower coil piece 16b, and sequentially wound from the $4^{th}$ lower coil piece to $44^{th}$ upper coil piece, $3^{rd}$ lower coil piece, and $43^{rd}$ upper coil piece, so that the lower coil pieces are positioned close to the magnetic pole center, and the $34^{th}$ upper coil piece that is the phase belt end of the upper coil piece far from the magnetic pole is connected to the $5^{th}$ lower coil piece that is the phase belt end of the lower coil far from the magnetic pole center, by the jumper wire 20a. The $4^{th}$ lower coil piece is connected to the $44^{th}$ upper coil piece, and the $44^{th}$ coil piece is connected to the neutral terminal 23 through the lead-out connection conductor 21.

The structure of this embodiment is different from that described in the patent document 3 in a point that a jumper wire used to connect coil pieces in one phase belt is not present in the same phase belt to which a lead-out portion is connected, and the jumper wire connects coil pieces other than those at the end of the phase belt.

Next, a potential difference between adjacent coil pieces is explained.

Table 1 shows the potentials of upper and lower coil pieces at the connection side coil end in the first embodiment, particularly for the first phase belt. Table 2 shows the potentials of upper and lower coil pieces at the connection side coil end in the first embodiment, particularly for the second phase belt.

TABLE 1

Potentials of upper and lower coil pieces at the connection side
coil end in the first embodiment (First phase belt)

| | | | | | | | | | | | | |
|---|---|---|---|---|---|---|---|---|---|---|---|---|
| Upper coil | U-phase slot No. | #45 | #46 | #47 | #48 | #49 | #50 | #51 | #52 | #53 | #54 | #55 |
| | V-phase slot No. | #1 | #2 | #3 | #4 | #5 | #6 | #7 | #8 | #9 | #10 | #11 |
| | W-phase slot No. | #23 | #24 | #25 | #26 | #27 | #28 | #29 | #30 | #31 | #32 | #33 |
| | Connection side potential [PU] | 1/11 | 1 | 10/11 | 9/11 | 8/11 | 7/11 | 6/11 | 5/11 | 4/11 | 3/11 | 2/11 |
| Lower coil | Connection side potential [PU] | 0 | 10/11 | 9/11 | 8/11 | 7/11 | 6/11 | 5/11 | 4/11 | 3/11 | 2/11 | 1/11 |
| | U-phase slot No. | #6 | #7 | #8 | #9 | #10 | #11 | #12 | #13 | #14 | #15 | #16 |
| | V-phase slot No. | #28 | #29 | #30 | #31 | #32 | #33 | #34 | #35 | #36 | #37 | #38 |
| | W-phase slot No. | #50 | #51 | #52 | #53 | #54 | #55 | #56 | #57 | #58 | #59 | #60 |

TABLE 2

Potentials of upper and lower coil pieces at the connection side
coil end in the first embodiment (Second phase belt)

| | | | | | | | | | | | | |
|---|---|---|---|---|---|---|---|---|---|---|---|---|
| Upper coil | U-phase slot No. | #12 | #13 | #14 | #15 | #16 | #17 | #18 | #9 | #20 | #21 | #22 |
| | V-phase slot No. | #34 | #35 | #36 | #37 | #38 | #39 | #40 | #41 | #42 | #43 | #44 |
| | W-phase slot No. | #56 | #57 | #58 | #59 | #60 | #61 | #62 | #63 | #64 | #65 | #66 |
| | Connection side potential [PU] | 1/11 | 2/11 | 3/11 | 4/11 | 5/11 | 6/11 | 7/11 | 8/11 | 9/11 | 10/11 | 0 |
| Lower coil | Connection side potential [PU] | 2/11 | 3/11 | 4/11 | 5/11 | 6/11 | 7/11 | 8/11 | 9/11 | 10/11 | 1 | 1/11 |
| | U-phase slot No. | #39 | #40 | #41 | #42 | #43 | #44 | #45 | #46 | #47 | #48 | #49 |
| | V-phase slot No. | #61 | #62 | #63 | #64 | #65 | #66 | #1 | #2 | #3 | #4 | #5 |
| | W-phase slot No. | #17 | #18 | #19 | #20 | #21 | #22 | #23 | #24 | #25 | #26 | #27 |

Regarding the coil pieces at the end of a phase belt in FIG. 2, the potential of the upper coil placed in the $23^{rd}$ slot for example (the $23^{rd}$ upper coil piece) is 1/11 [PU] at the connection side end, and the potential of the upper coil piece placed in the adjacent $22^{nd}$ slot (the $22^{nd}$ upper coil piece) is 0 [PU].

Figure 3:
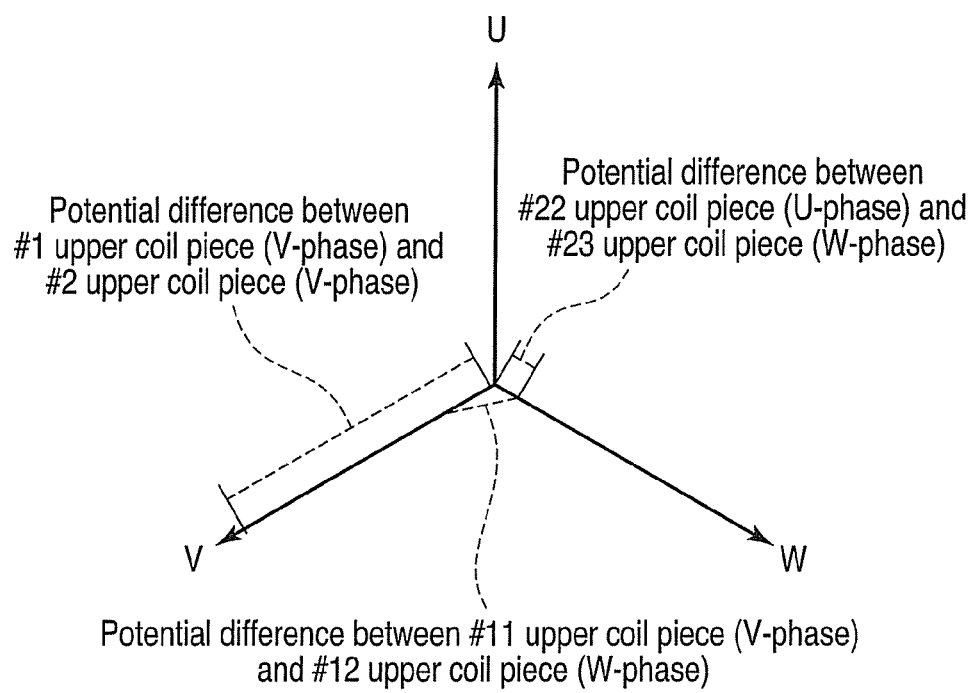
FIG. 3 shows a vector indicating a potential difference between adjacent coil pieces in the same embodiment.

FIG. 3 shows a vector indicating an example of a potential difference between adjacent coil pieces in the first embodiment.

Figure 34:
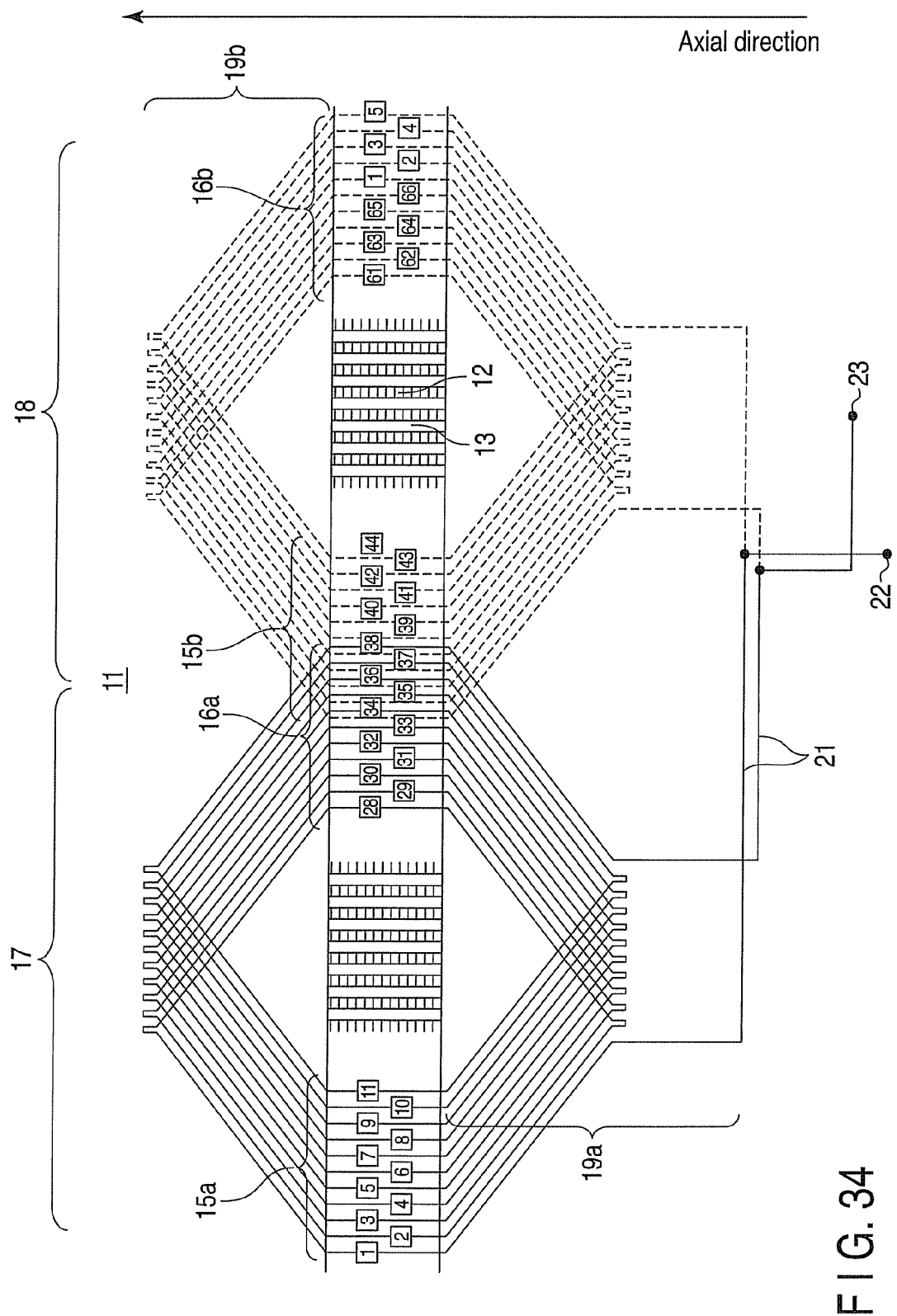
FIG. 34 is a perspective view of one phase of a first example of an armature winding of a conventional rotating electrical machine.
Figure 35:
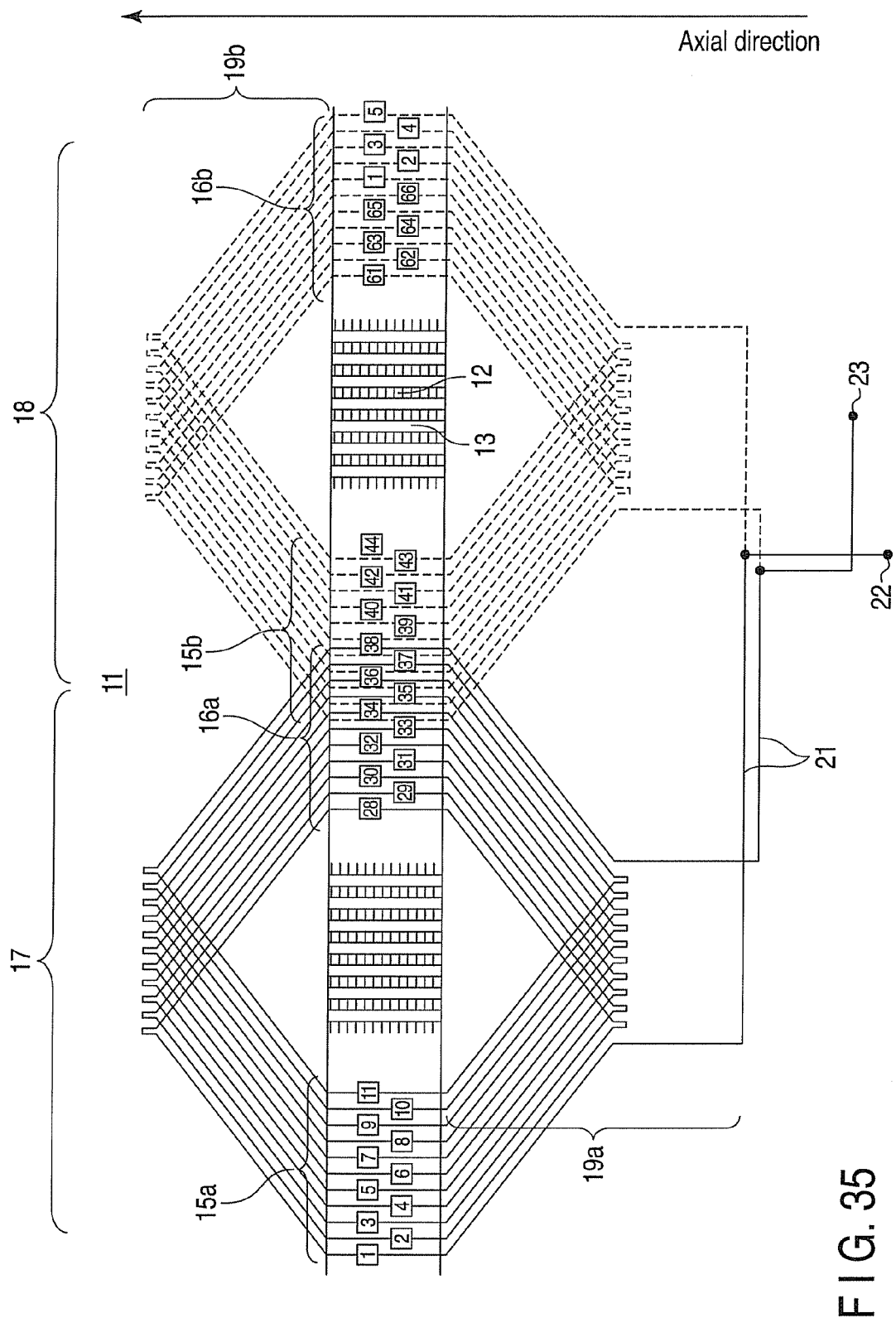
FIG. 35 is a perspective view of three phases of the first example.
Figure 36:
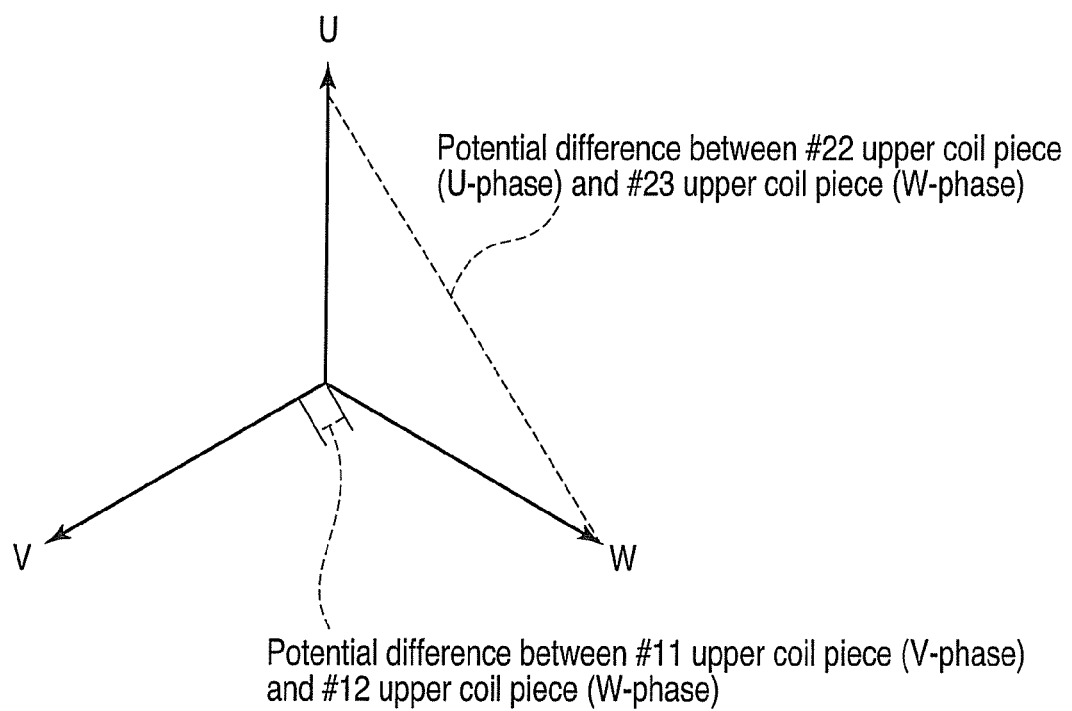
FIG. 36 shows a vector indicating a potential difference between adjacent coil pieces in the first example.
Figure 37:
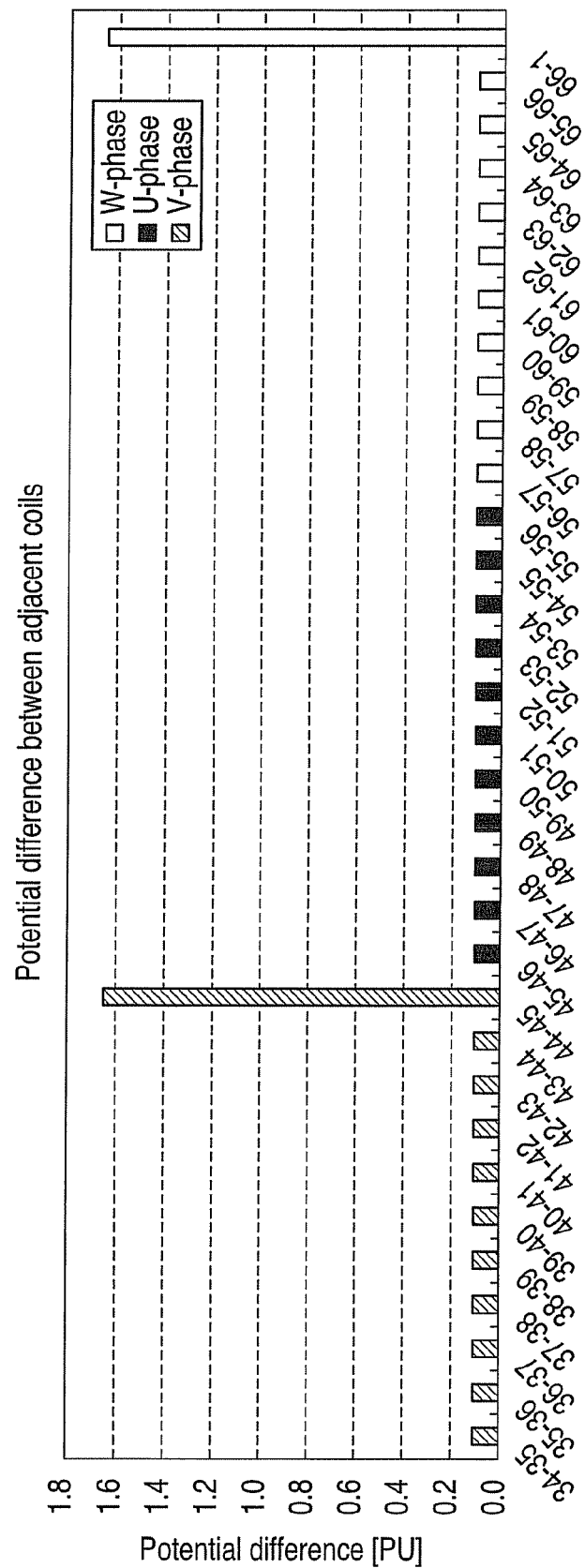
FIG. 37 is a graph showing a distribution of a potential difference between adjacent coil pieces in the first example.

As seen from the vector, the potential difference between the $23^{rd}$ upper coil piece and $22^{nd}$ upper coil piece is 1/11=0.091 [PU], and the potential difference between adjacent coil pieces is greatly decreased at the end of a phase belt, compared with an example of a conventional armature winding shown in FIG. 34.

The potential of the upper coil placed in the $12^{th}$ slot (the $12^{th}$ upper coil piece) is 1/11 [PU] at the connection side end, and the potential of the upper coil piece placed in the adjacent $11^{th}$ slot (the $11^{th}$ upper coil piece) is 2/11 [PU]. Considering a phase difference of 120° in the vector shown in FIG. 3, the potential difference between the $12^{th}$ upper coil piece and $11^{th}$ upper coil piece is 0.241 [PU], thus the potential difference between adjacent coil pieces at the phase belt end can be greatly reduced compared with conventional examples.

On the other hand, between coil pieces in the same phase, for example in the same W-phase, the potential of the $24^{th}$ upper coil piece is 1 [PU], and the potential of the $23^{rd}$ upper coil piece is 1/11 [PU].

Therefore, the potential difference between these coil pieces is 10/11=0.909 [PU].

Figure 4:
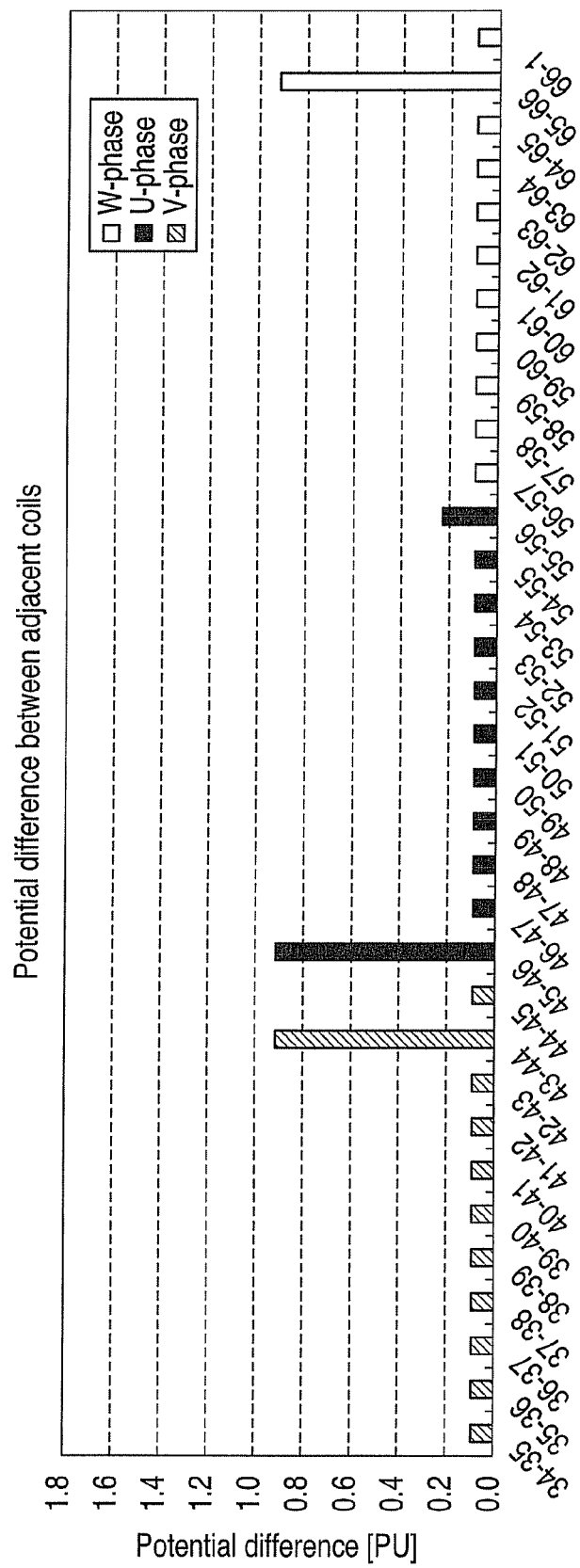
FIG. 4 is a graph showing the distribution of potential differences between adjacent coil pieces in the same embodiment.

FIG. 4 shows the potential differences between adjacent coil pieces, particularly upper coil pieces, at the connection side coil end obtained as described above.

As shown in the drawing, in the armature winding of the first embodiment, a maximum potential difference between adjacent coil pieces is 0.909 [PU], which is greatly reduced to about 55% of 1.654 [PU] of conventional examples, and prevents generation of corona discharge.

Modification of the First Embodiment

Next, a modification of the first embodiment will be explained by referring to FIGS. 5 and 6.

Figure 5:
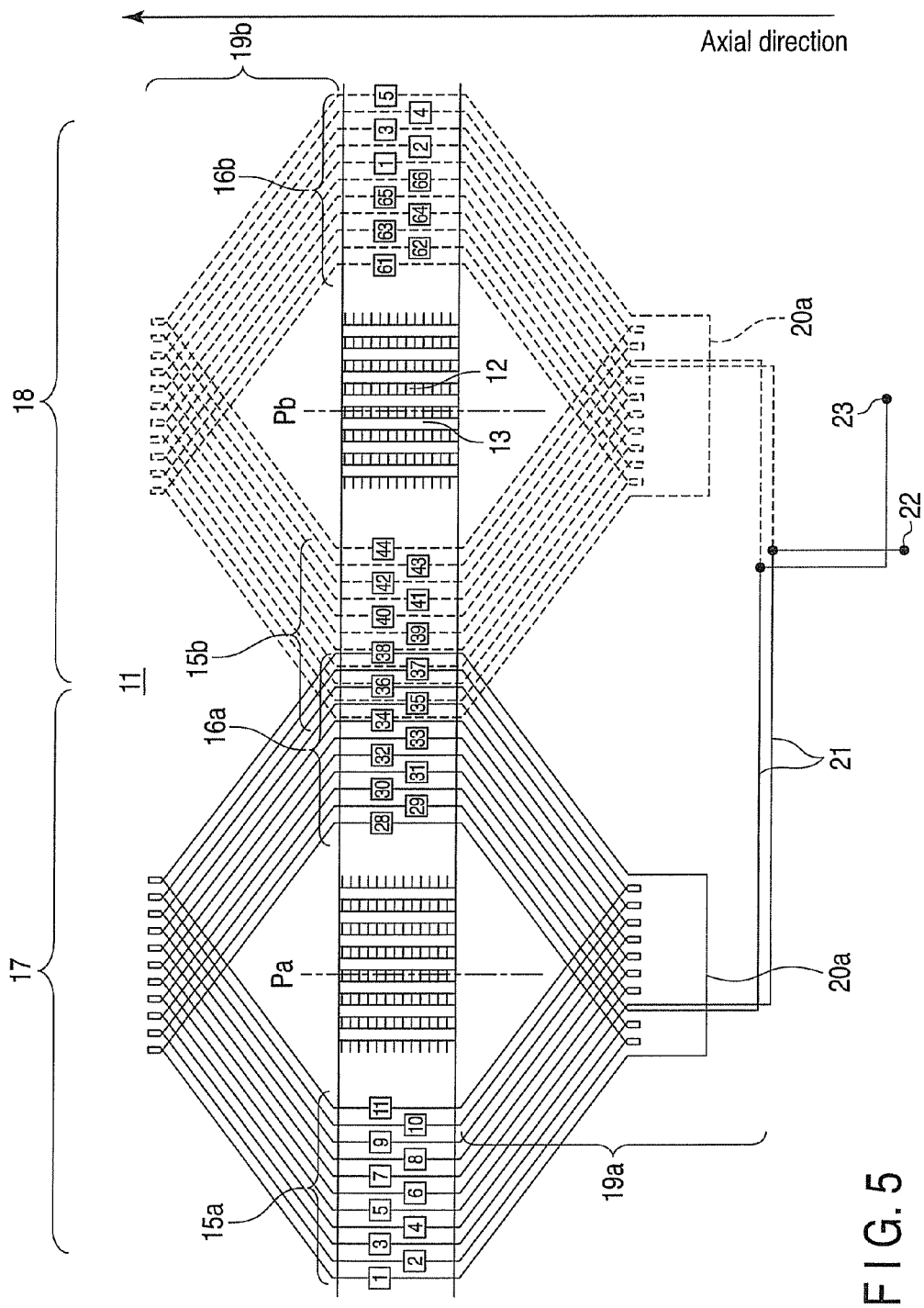
FIG. 5 is a developed perspective view of one phase of a modification of the first embodiment.

FIG. 5 is a developed perspective view of one phase of a modification of the first embodiment. FIG. 6 is a developed perspective view of three phases of the same modification.

In the first embodiment shown in FIG. 2, at a take-out position at the connection side coil end 19a, the lead-out connection conductors 21 connected to adjacent three upper coil pieces and three lower coil pieces are closely arranged as shown by an area 21x where lead-out connection conductors interfere with each other.

The closely arranged connection conductors cause such problems as an electromagnetic force between currents flowing in the conductors, and an increase in eddy-current loss in adjacent conductors caused by currents flowing in the conductors. Further, the insulating tape wound around the conductors may deteriorate, leading to insufficient insulation of the conductors.

To solve the above problems, in the modification 1 of the first embodiment, the coil piece housed in the $4^{th}$ slot from a phase belt end is connected to a lead-out portion. In other words, in FIGS. 5 and 6, at the connection side coil end 19a of the first phase belt 17, the lead-out connection conductor 21 connected to the output terminal 22 is connected to the $4^{th}$ upper coil piece 15a, and the $30^{th}$ lower coil piece 16a is connected to the lead-out connection conductor 21, and further connected to' the neutral terminal 23.

Further, the first upper coil piece 15a positioned at the phase belt end far from the magnetic pole center of the first phase belt 17 is connected to the $38^{th}$ lower coil piece 16a positioned at the phase belt end far from the magnetic pole center of the first phase belt 17, by the jumper wire 20a.

In the second phase belt 18, at the connection side coil end 19a, the lead-out connection conductor 21 connected to the output terminal 22 is connected to the $2^{nd}$ upper coil piece 16a, and the $32^{nd}$ lower coil piece 15a is connected to the neutral terminal 23 through the lead-out connection conductor 21.

Further, the $34^{th}$ upper coil piece 15a positioned at the phase belt end far from the magnetic pole center of the second phase belt 18 is connected to the $5^{th}$ lower coil piece 16a positioned at the phase belt end far from the magnetic pole center of the second phase belt 18, by the jumper wire 20a.

In the armature winding 14, coil pieces are sequentially wound so that upper coil pieces are positioned close to the magnetic pole center, in the first phase belt 17, and coil pieces are sequentially wound so that lower coil pieces are positioned close to the magnetic pole center, in the second phase belt 18.

Figure 6:
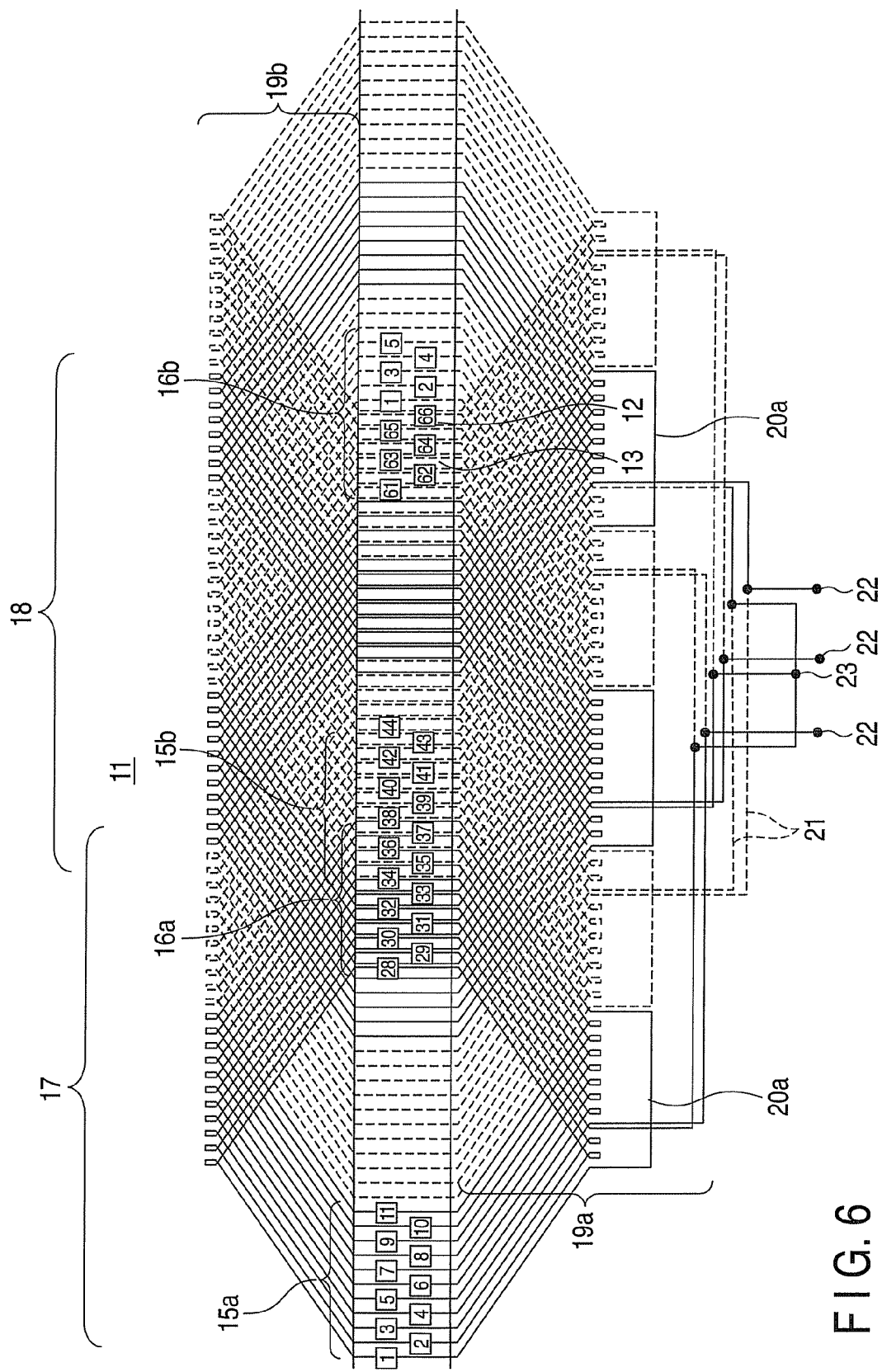
FIG. 6 is a developed perspective view of three phases of a modification of the armature winding in the same embodiment.

In the above configuration, as shown in FIG. 6, the distance between the connecting portions of the coil piece and lead-out connection conductor 21 at the connection side coil end 19a can be increased as compared with the case of FIG. 2.

As for the potential difference between adjacent coil pieces, regarding the coil pieces at the phase belt end in FIG. 6, the potential of the upper coil piece positioned in the $23^{rd}$ slot (the $23^{rd}$ upper coil piece) is 3/11 [PU] at the connection side end, and the potential of the upper coil piece positioned in the adjacent $22^{nd}$ slot (the $22^{nd}$ upper coil piece) is 2/11 [PU]. The potential of the upper coil positioned in the $12^{th}$ slot (the $12^{th}$ upper coil piece) is 3/11 [PU] at the connection side end, and the potential of the upper coil piece positioned in the adjacent $11^{th}$ slot (the $11^{th}$ upper coil piece) is 4/11 [PU]. The potential difference between the $12^{th}$ upper coil piece and $11^{th}$ upper coil piece is 0.553 [PU]. The potential difference between adjacent coil pieces at the phase belt end is larger than that in the first embodiment, and can be greatly decreased as compared with conventional examples.

As for the potential difference between coil pieces in the same phase, for example the W-phase, the potential of the $26^{th}$ upper coil piece is 1 [PU], and the potential of the $25^{th}$ upper coil piece is 1/11 [PU]. The potential difference between these two coil pieces is 10/11=0.909 [PU], which is the same value as in the first embodiment.

Figure 7:
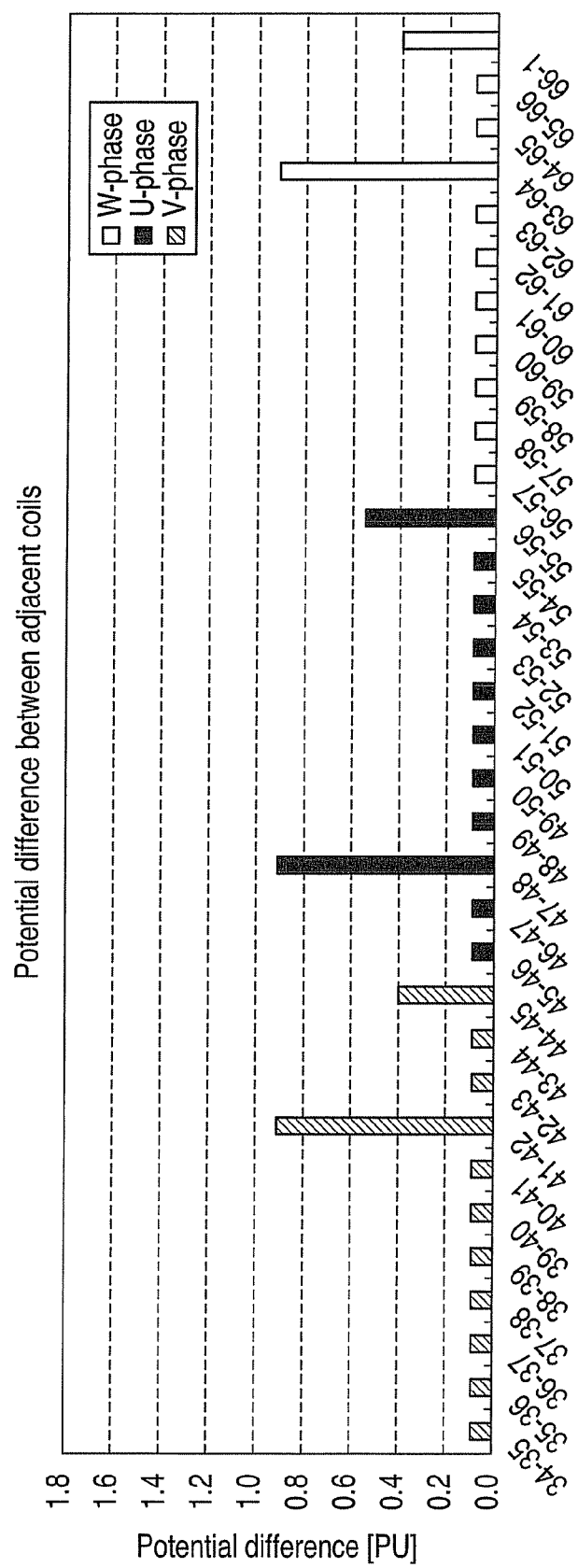
FIG. 7 is a graph showing the distribution of potential differences between adjacent coil pieces in the same modification.

FIG. 7 shows the potential differences between adjacent upper coil pieces at the connection side coil end obtained as described above, as in FIG. 4.

In the armature winding in the modification of the first embodiment, a maximum potential difference between adjacent coil pieces is 0.909 [PU], which is greatly reduced to about 55% of 1.654 [PU] of conventional examples, as in the first embodiment, and prevents generation of corona discharge.

As described above, in the modification of the first embodiment, the potential difference between adjacent coil pieces is decreased to below that in conventional examples, such problems as an electromagnetic force between currents flowing in the conductors caused by closely arranged connection conductors, an increase in eddy-current loss in adjacent conductors caused by currents flowing in the conductors, and poor insulation caused by deteriorated insulating tape wound around the conductor are solved, and a reliable armature of a rotating electrical machine can be provided.

In this embodiment, the coil pieces housed in the $2^{nd}$ and $4^{th}$ slots from a phase belt end are connected to a lead-out portion. Which coil piece in which slot, except at a phase belt end, is to be connected to a lead-out portion can be appropriately determined. However, as a slot to house an upper coil piece connected to a lead-out portion of an outer terminal is positioned close to a magnetic pole center Pa, a potential difference between phase belts is increased.

Figure 8:
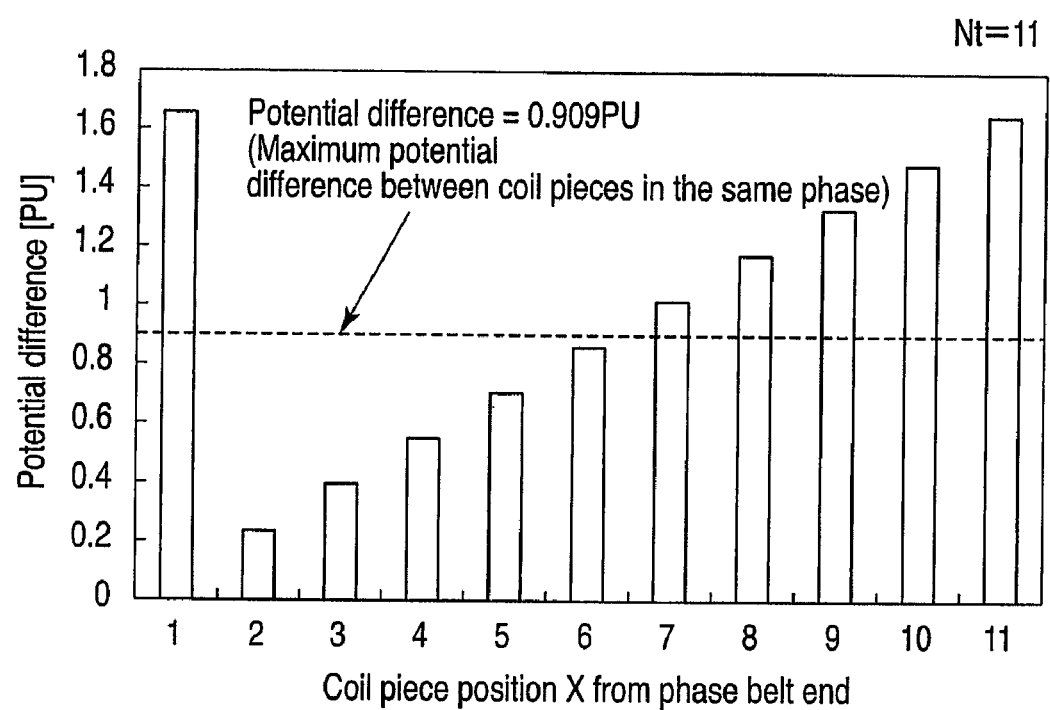
FIG. 8 is a graph showing the relationship between a slot position to place a coil piece connected to a lead-out portion and a maximum potential difference between coils in a first embodiment of the invention.

FIG. 8 shows a relationship between a potential difference between phase belts and a slot position X to house a coil piece connected to a lead-out portion in the 2-pole 3-phase 66-slot rotating electrical machine described in this embodiment. In the drawing, a broken line indicates a maximum potential difference between coil pieces in a phase belt. As shown in the drawing, when X≦6, a maximum potential difference in the armature winding is equal to a maximum potential difference between coil pieces in a phase belt, and is constant. But, when X>6, a potential difference between phase belts exceeds a maximum potential difference between coil pieces in a phase belt, and a potential difference between phase belts becomes a maximum potential difference in an armature winding. In other words, in the rotating electrical machine described in this embodiment, a slot position X to house a coil piece connected to a lead-out portion is desirably X≦6.

Generally, assuming the number of slots per one phase belt to be $N_t$, the potential of a coil piece in the boundary of phase belts is expressed by $X/N_t$[PU] and $(X-1)/N_t$[PU], and a condition in which a potential difference between phase belts does not exceed a maximum potential difference between coil pieces in a phase belt is expressed by the following formula, which is arranged from a relation in which a vector difference in these potentials whose phase is difference by 120° is smaller than a maximum potential difference $(N_t-1)/N_t$ between coil pieces in a phase belt:

$$3X(X-1)>N_t^2-2N_t$$

By setting X to meet the above condition, it is possible to reduce the interference between connection conductors without increasing a maximum potential difference between coil pieces.

In the above example, the position of a coil piece connected to a lead-out connection conductor from a phase belt end is the same in the first and second phase belts. The position of a coil piece connected to a lead-out connection conductor from a phase belt end may be different in the first and second phase belts.

For example, if the $4^{th}$ upper coil piece from the end of a phase belt is connected to a lead-out connection conductor in the first phase belt, as in the modification of the first embodiment (FIG. 1), and the $2^{nd}$ lower coil piece from the end of a phase belt is connected to a lead-out connection conductor in the second phase belt, as in the first embodiment (FIG. 5), a total of four lead-out connection conductors are adjacent in upper and lower sides, and the interference between the lead-out connection conductors can be reduced as compared with that in the case of FIG. 1. Therefore, such problems as an electromagnetic force between currents flowing in the conductors caused by closely arranged connection conductors, an increase in eddy-current loss in adjacent conductors caused by currents flowing in the conductors, and poor insulation caused by deteriorated insulating tape wound around the conductor are solved. Therefore, a reliable armature of a rotating electrical machine can be provided.

In the above first embodiment, the number of parallel circuits in each phase belt of a winding is equal to the number of magnetic poles. The invention may be embodied as described above even if the number of parallel circuits in each phase belt of each winding is less than the number of magnetic poles, for example, as in a 2-pole 1-parallel-circuit or 4-pole 2-parallel-circuit winding, or if the number of parallel circuits in each phase belt is 1.5 times the number of magnetic poles, for example, as in a 2-pole 3-parallel-circuit or 4-pole 6-parallel circuit winding.

Embodiment 2

Figure 9:
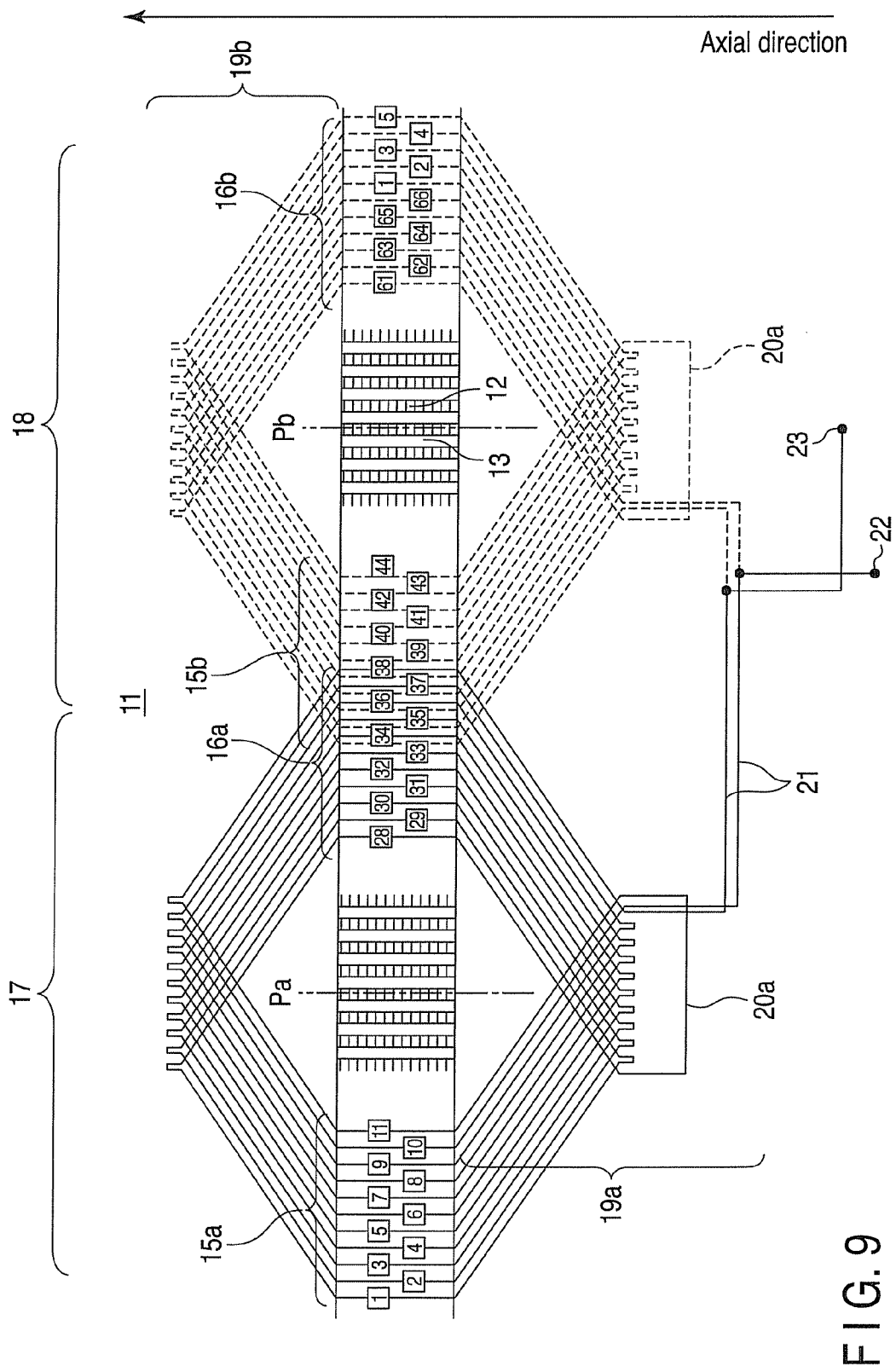
FIG. 9 is a developed perspective view of one phase of a second embodiment of an armature winding of a rotating electrical machine according to the invention.

FIG. 9 is a developed perspective view of one phase of a second embodiment of an armature winding of a rotating electrical machine according to the invention. The other two phases are configured by shifting the electric angle by 120° and 240°. An explanation of the same configuration as in FIG. 1 is omitted.

As shown in FIG. 9, an armature 11 of a rotating electrical machine has sixty-six slots 13 in an armature core 12 comprising a laminated iron core. In the slots 13, a 2-pole 3-phase 2-parallel-circuit armature winding 14 is housed in two layers.

In the second embodiment, the coil pitch at the connection side coil end 19a is 28, one higher than the winding pitch, and the coil pitch at the counter-connection side coil end 19b is 27, equal to the winding pitch.

In the second embodiment, as shown in FIG. 9, at the connection side coil end 19a of the first phase belt 17, the lead-out connection conductor 21 connected to the output terminal 22 is connected to the $10^{th}$ upper coil piece 15a, and sequentially wound from the $10^{th}$ upper coil piece to $37^{th}$ lower coil piece, $9^{th}$ upper coil piece, and $36^{th}$ lower coil piece, so that the upper coil pieces are positioned away from the magnetic pole center, and the $28^{th}$ lower coil piece that is the phase belt end of the lower coil piece close to the magnetic pole center of the first phase belt 17 is connected to the $11^{th}$ upper coil piece that is the phase belt end of the upper coil piece close to the magnetic pole center, by the jumper wire 20a.

The $11^{th}$ upper coil piece is connected to the $38^{th}$ lower coil piece at the phase belt end of a lower coil piece far from the magnetic pole center, and further connected to the lead-out connection conductor 21, and connected to the neutral terminal 23.

At the connection side coil end 19a of the second phase belt 18, the lead-out connection conductor 21 connected to the output terminal 22 is connected to the $62^{nd}$ lower coil piece 15a, and sequentially wound from the $62^{nd}$ lower coil piece to $35^{th}$ upper coil piece, $63^{rd}$ lower coil piece, and $36^{th}$ upper coil piece, so that the lower coil pieces are positioned away from the magnetic pole center, and the $44^{th}$ upper coil piece that is the phase belt end of the upper coil piece close to the magnetic pole center is connected to the $61^{st}$ lower coil piece that is the phase belt end of the lower coil piece close to the magnetic pole center, by the jumper wire 20a.

The $61^{st}$ lower coil piece is connected to the $34^{th}$ upper coil piece at the phase belt end of an upper coil piece far from the magnetic pole center, and further connected to the lead-out connection conductor 21, and connected to the neutral terminal 23.

As for the potential difference between adjacent coil pieces, regarding the coil pieces at the phase belt end in FIG. 2, the potential of the first upper coil piece is 2/11 [PU] at the connection side end, and the potential of the not-shown adjacent $66^{th}$ upper coil piece is 2/11 [PU]. The potential difference between the $1^{st}$ upper coil piece and $66^{th}$ upper coil piece is 0.315 [PU].

As for the potential difference between coil pieces in the same phase, for example the W-phase, the potential of the $32^{nd}$ upper coil piece is 1 [PU], and the potential of the $33^{rd}$ upper coil piece is 1/11 [PU]. The potential difference between these two coil pieces is 10/11=0.909 [PU].

As described above, in the armature winding of the second embodiment, a maximum potential difference between adjacent coil pieces is 0.909 [PU], which is greatly reduced to about 55% of 1.654 [PU] of conventional examples, and prevents generation of corona discharge.

Embodiment 3

Figure 10:
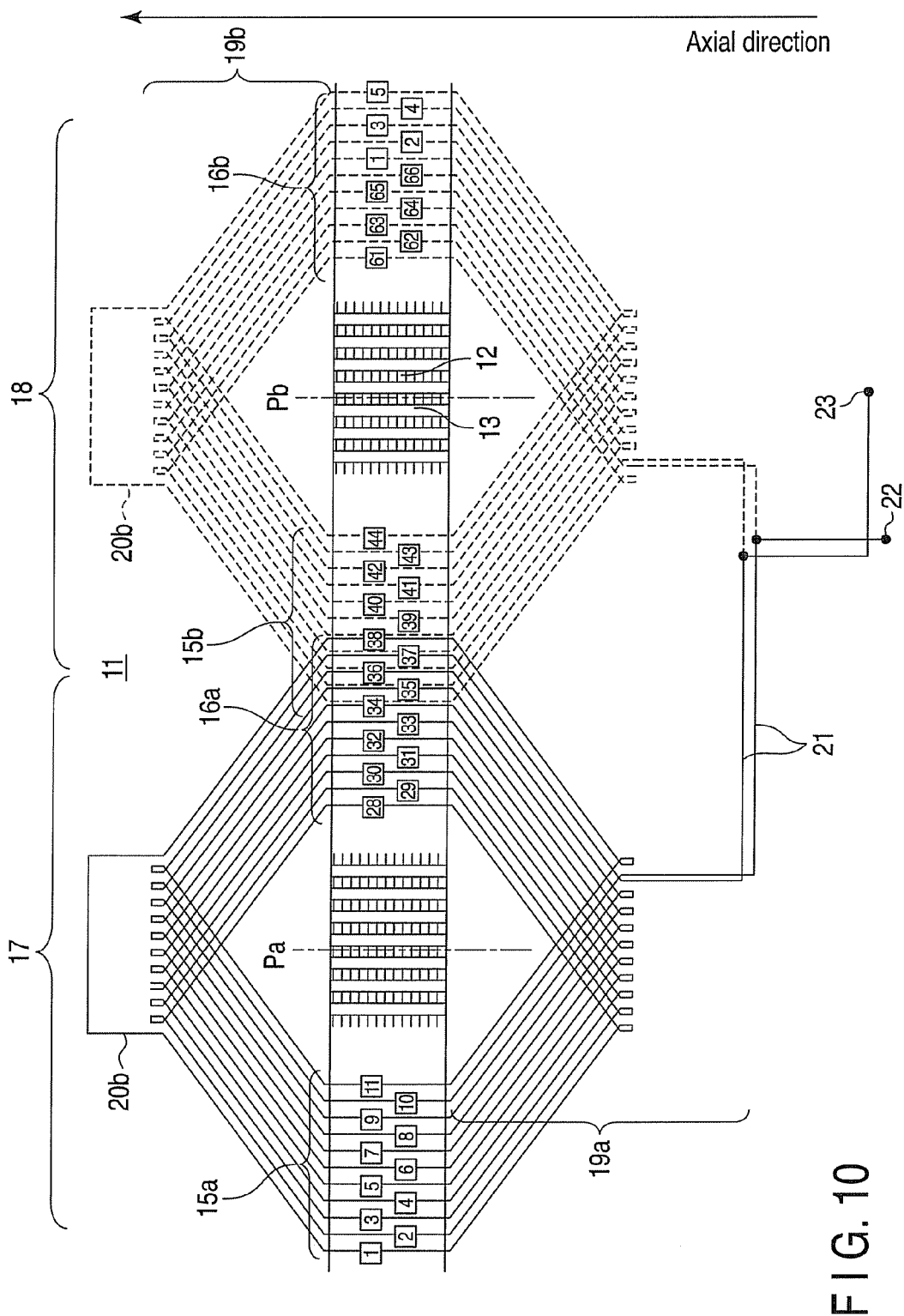
FIG. 10 is a developed perspective view of one phase of a third embodiment of an armature winding of a rotating electrical machine according to the invention.

FIG. 10 is a developed perspective view of one phase of a third embodiment of an armature winding of a rotating electrical machine according to the invention. This is a 2-pole 3-phase 2-parallel-circuit armature winding having 66 slots in an armature core. The other two phases are configured by shifting the electric angle by 120° and 240°. An explanation of the same configuration as in FIG. 1 is omitted.

In the drawing, the $1^{st}$ upper coil piece and $28^{th}$ lower coil piece are connected in the connection side, and the coil pitch is 27, equal to the winding pitch. On the other hand, in the counter-connection side, the $2^{nd}$ upper coil piece and $28^{th}$ lower coil piece are connected, and the coil pitch is 26, one less than the winding pitch.

In the this embodiment, as shown in FIG. 10, at the connection side coil end 19a of the first phase belt 17, the lead-out connection conductor 21 connected to the output terminal 22 is connected to the $10^{th}$ upper coil piece 15a, and sequentially wound from the $10^{th}$ upper coil piece to $36^{th}$ lower coil piece, $9^{th}$ upper coil piece, and $35^{th}$ lower coil piece, so that the upper coil pieces are positioned away from the magnetic pole center, and the $1^{st}$ upper coil piece 15a positioned at the phase belt end far from the magnetic pole center is connected to the $38^{th}$ lower coil piece 16a positioned at the phase belt end far from the magnetic pole center, by the counter-connection side jumper wire 20b.

The $38^{th}$ lower coil piece is sequentially connected to the $11^{th}$ upper coil piece and $37^{th}$ lower coil piece positioned at the phase belt end of an upper coil piece close to the magnetic pole center, and further connected to the lead-out connection conductor 21, and connected to the neutral terminal 23.

At the connection side coil end 19a of the second phase belt 18, the lead-out connection conductor 21 connected to the output terminal 22 is connected to the $62^{nd}$ lower coil piece 16b, and sequentially wound from the $62^{nd}$ lower coil piece to $36^{th}$ upper coil piece, $63^{rd}$ lower coil piece, and $37^{th}$ upper coil piece, so that the lower coil pieces are positioned away from the magnetic pole center, and the $1^{st}$ upper coil piece 15a positioned at the phase belt end far from the magnetic pole and the $5^{th}$ lower coil piece 16a positioned at the phase belt end far from the magnetic pole are connected to the $34^{th}$ upper coil piece positioned at the phase belt end far from the magnetic pole center, by the counter-connection side jumper wire 20b.

The $34^{th}$ upper coil piece is sequentially connected to the $61^{st}$ upper coil piece and $35^{th}$ upper coil piece positioned at the phase belt end of the lower coil piece close to the magnetic pole, and further connected to the lead-out connection conductor 21, and connected to the neutral terminal 23.

As for the potential difference between adjacent coil pieces, regarding the coil pieces at the phase belt end in FIG. 10, the potential of the first upper coil piece is 2/11 [PU] at the connection side end, and the potential of the not-shown adjacent $66^{th}$ upper coil piece is 2/11 [PU]. The potential difference between the $1^{st}$ upper coil piece and $66^{th}$ upper coil piece is 0.315 [PU] considering a phase difference.

As for the potential difference between coil pieces in the same phase, for example the W-phase, the potential of the $32^{nd}$ upper coil piece is 1 [PU], and the potential of the $33^{rd}$ upper coil piece is 1/11 [PU]. The potential difference between these two coil pieces is 10/11=0.909 [PU].

As described above, in the armature winding of the third embodiment, a maximum potential difference between adjacent coil pieces is 0.909 [PU], which is greatly reduced to about 55% of 1.654 [PU] of conventional examples, and prevents generation of corona discharge.

In this embodiment, the jumper wire to connect the coil pieces in a phase belt can be placed on the counter-connection side, and the interference between the lead-out connection conductors can be reduced. Therefore, such problems as an electromagnetic force between currents flowing in the conductors caused by closely arranged connection conductors, an increase in eddy-current loss in adjacent conductors caused by currents flowing in the conductors, and poor insulation caused by deteriorated insulating tape wound around the conductor are solved. Therefore, a reliable armature of a rotating electrical machine can be provided.

Embodiment 4

Figure 11:
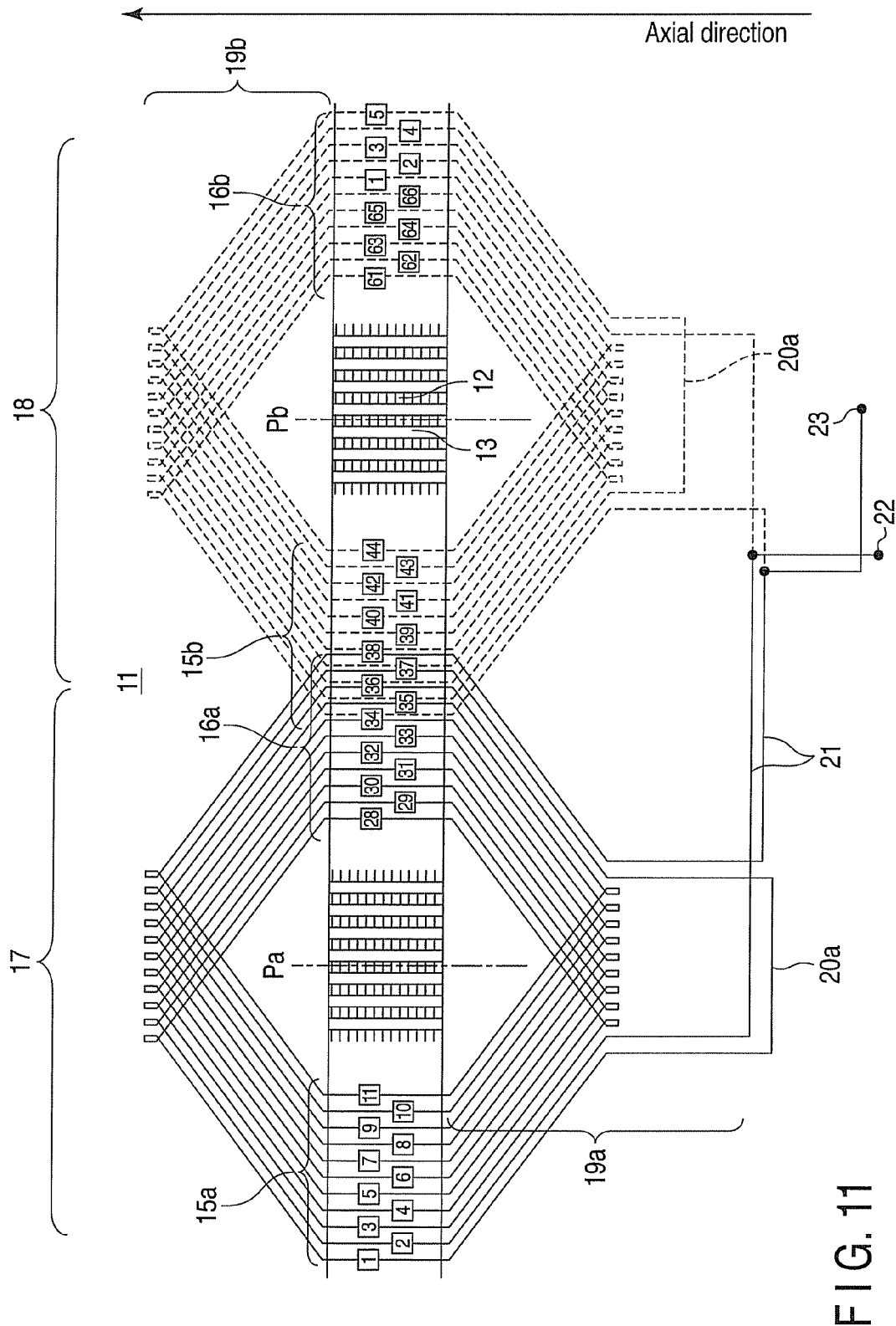
FIG. 11 is a developed perspective view of one phase of a 2-pole 3-phase 2-parallel-circuit armature winding, as a fourth embodiment of an armature winding of a rotating electrical machine according to the invention.

FIG. 11 is a developed perspective view of one phase of a 2-pole 3-phase 2-parallel-circuit armature winding, as a fourth embodiment of an armature winding of a rotating electrical machine according to the invention. The number of slots is 66. The other two phases are configured by shifting the electric angle by 120° and 240°. An explanation of the same configuration as in FIG. 1 is omitted.

In this embodiment, an odd number of series coils is wound in one phase of the winding, the coil pitch at the connection side coil end is 25, two less than the winding pitch, and the coil pitch at the counter-connection side coil end is 27, equal to the winding pitch.

As shown in FIG. 11, at the connection side coil end 19a of the first phase belt 17, the second upper coil piece 15a is connected to the lead-out connection conductor 21 connected to the output terminal 22, and sequentially wound to the $29^{th}$ lower coil piece, $4^{th}$ upper coil piece, and $31^{st}$ lower coil piece with the above coil pitch, and the $37^{th}$ lower coil piece 16a is connected to the $1^{st}$ upper coil piece by the connection side jumper wire 20a. The $1^{st}$ upper coil piece is $3^{rd}$ sequentially wound to the $28^{th}$ lower coil piece, upper coil piece, and $30^{th}$ lower coil piece with the above pitch, and the $38^{th}$ lower coil piece is connected to the lead-out connection conductor 21, and further connected to the neutral terminal 23.

At the connection side coil end 19a of the second phase belt 18, the $4^{th}$ lower coil piece 16b is connected to the lead-out connection conductor 21 connected to the output terminal 22, and sequentially wound to the $43^{rd}$ upper coil piece, $2^{nd}$ lower coil piece, and $41^{st}$ upper coil piece with the above coil pitch, and the $35^{th}$ upper coil piece 16a is connected to the $5^{th}$ lower coil piece by the connection side jumper wire 20a. The $5^{th}$ lower coil piece is sequentially wound to the $44^{th}$ upper coil piece, $3^{rd}$ lower coil piece, and $42^{nd}$ upper coil piece with the above pitch, and the $34^{th}$ upper coil piece is connected to the lead-out connection conductor 21, and further connected to the neutral terminal 23.

As described above, in the first to third embodiments, a jumper wire in a phase belt connects the coil pieces at the phase end. On the other hand, in the fourth embodiment, a jumper wire connects between a coil piece at one phase end and a coil piece at the second from the other phase belt end.

As for the potential difference between adjacent coil pieces, regarding the coil pieces at the phase belt end in FIG. 11, the potential of the $1^{st}$ upper coil piece is 6/11 [PU] at the connection side end, and the potential of the not-shown adjacent $66^{th}$ upper coil piece is 5/11 [PU]. The potential difference between the $1^{st}$ upper coil piece and $66^{th}$ upper coil piece is 0.867 [PU] considering a phase difference.

In this embodiment, the potential difference between coil pieces in the same phase is different from the first to third embodiments. For example, in the W-phase, the potential of the $31^{st}$ upper coil piece is 2/11 [PU], the potential of the $32^{nd}$ upper coil piece is 7/11 [PU], and the potential of the $33^{rd}$ upper coil piece is 1/11 [PU]. Therefore, the potential difference among these three coil pieces is 5/11=0.455 [PU], and 6/11=0.545 [PU], respectively.

Further, in this embodiment, the potential difference between coil pieces in the same phase is one of the above potential differences.

As described above, in the armature winding of the fourth embodiment, a maximum potential difference between adjacent coil pieces is 0.867 [PU], the value between coil pieces of different phases, which is smaller than 1.654 [PU] in conventional examples and any value in the armature windings explained in the first to third embodiments. This is very effective to prevent generation of corona discharge.

Figure 12:
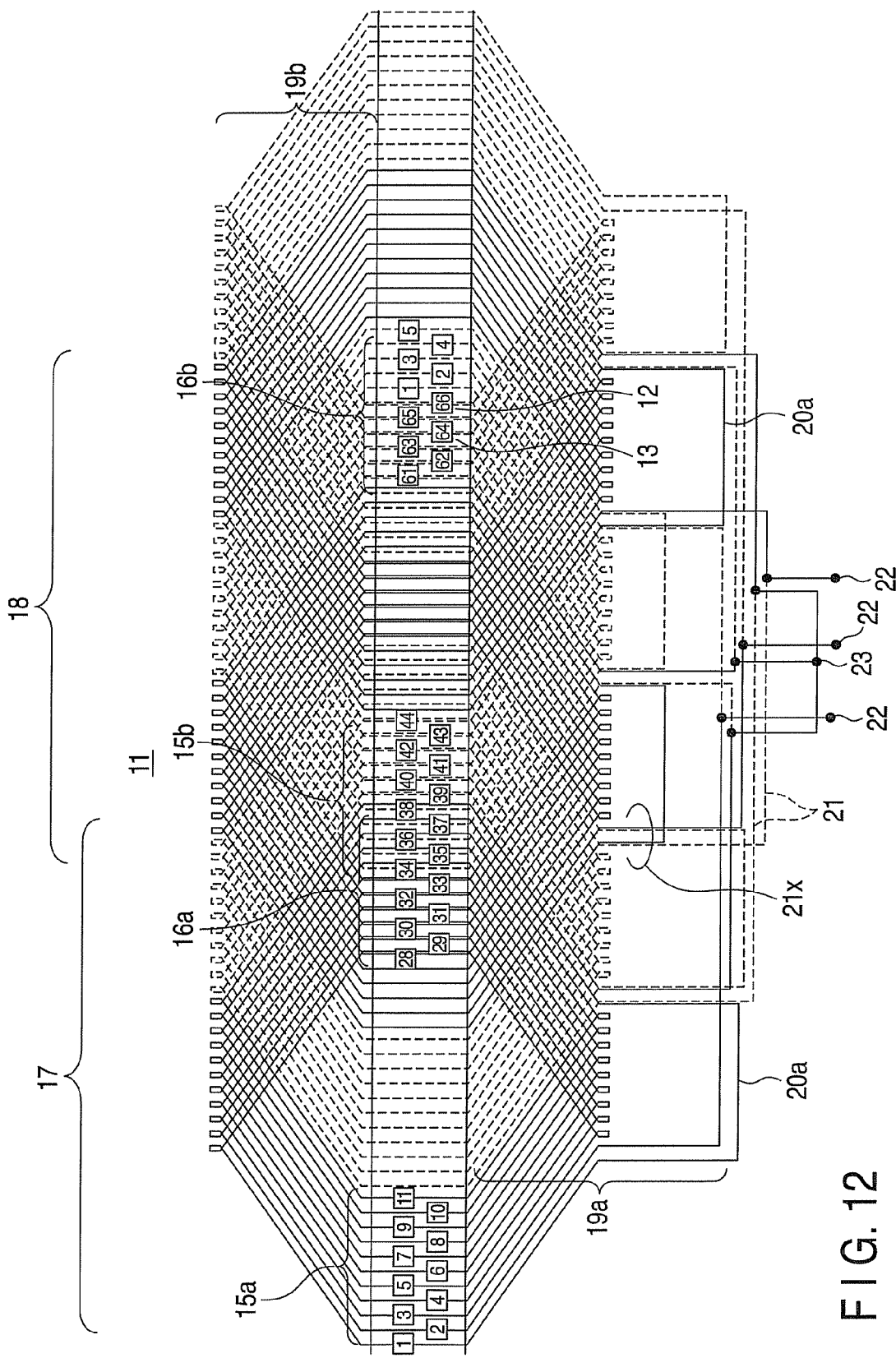
FIG. 12 is a developed perspective view of three phases of the same embodiment.

FIG. 12 is a developed perspective view of three phases of the armature winding of the fourth embodiment.

By arranging the lead-out connection, conductor 21 and connection side jumper wire 20a as shown in the drawing, the winding may be composed of six rows of connection rings, which is only one line more than in conventional examples. When compared with seven rows in the first to three embodiments, the space to install the connection rings can be reduced, and the size of a rotating electrical machine can be reduced. Further, as the pitch at the connection side coil end is two less than the winding pitch, the length of the connection side coil end can be reduced.

Modification of Embodiment 4

Figure 13:
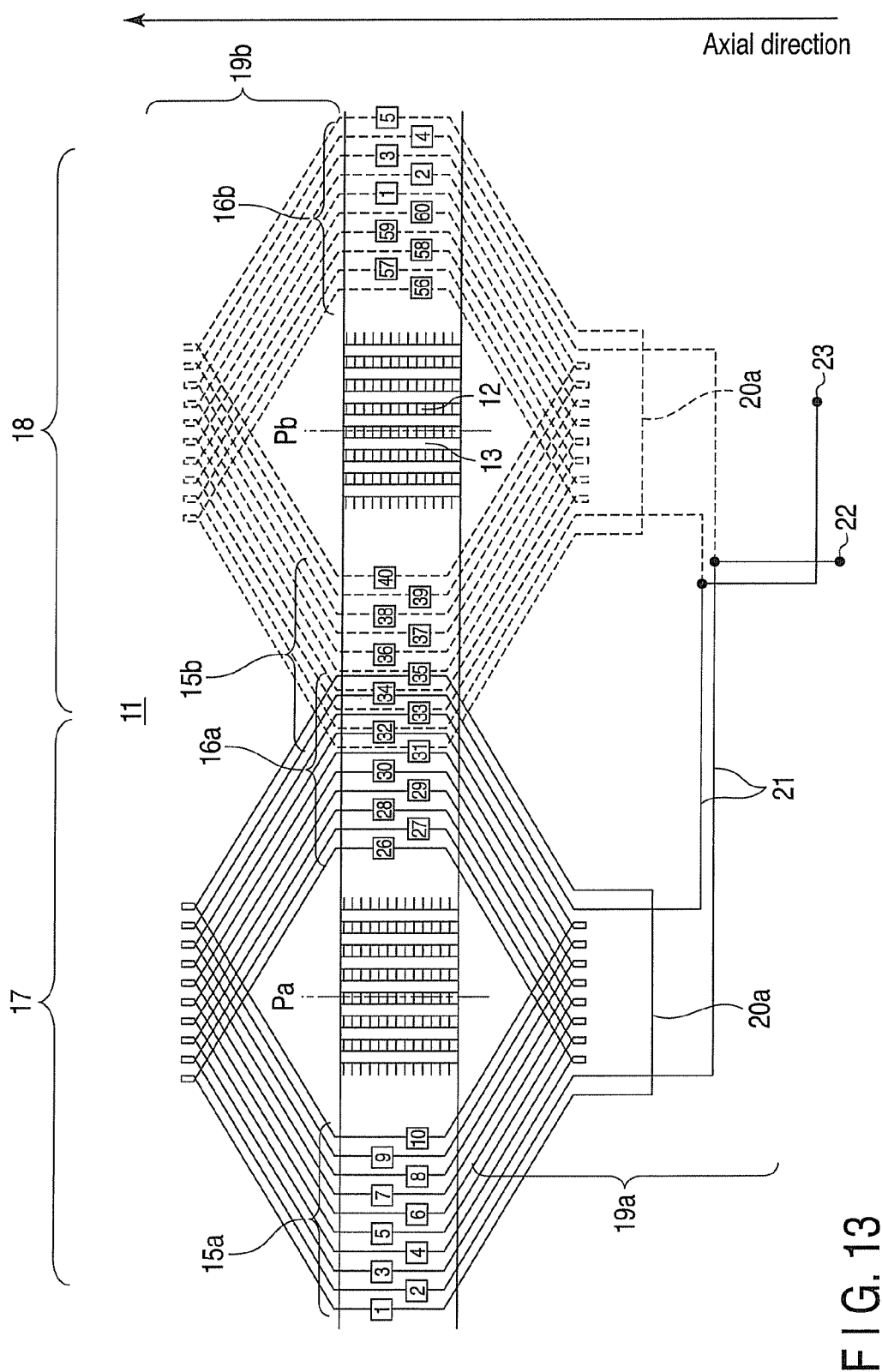
FIG. 13 is a developed perspective view of one phase of a modification of the fourth embodiment.

FIG. 13 is a developed perspective view of one phase of a 2-pole 3-phase 2-parallel-circuit armature winding as a modification of the fourth embodiment. Unlike the fourth embodiment shown in FIG. 11, the number of slots is 60, and the number of series coils is 10. An explanation of the same configuration as in the embodiment shown in FIG. 1 is omitted.

In this embodiment, the winding pitch is 25, the coil pitch at the connection side coil end is 23, two less than the winding pitch, and the coil pitch at the counter-connection side coil end is 25, equal to the winding pitch.

As shown in FIG. 13, at the connection side coil end 19a of the first phase belt 17, the second upper coil piece 15a is connected to the lead-out connection conductor 21 connected to the output terminal 22, and sequentially wound to the $27^{th}$ lower coil piece, $4^{th}$ upper coil piece, and $29^{th}$ lower coil piece with the above coil pitch, and the $35^{th}$ lower coil piece 16a positioned at the phase belt end is connected to the $1^{st}$ upper coil piece positioned at the other phase coil end, by the connection side jumper wire 20a.

The $1^{st}$ upper coil piece is sequentially wound to the $26^{th}$ lower coil piece, $3^{rd}$ upper coil piece, and $28^{th}$ lower coil piece with the above pitch, and the $34^{th}$ lower coil piece is connected to the lead-out connection conductor 21, and further connected to the neutral terminal 23.

At the connection side coil end 19a of the second phase belt 18, the $4^{th}$ lower coil piece 16b is connected to the lead-out connection conductor 21 connected to the output terminal 22, and sequentially wound to the $39^{th}$ upper coil piece, $2^{nd}$ lower coil piece, and $37^{th}$ upper coil piece with the above coil pitch, and the $31^{st}$ upper coil piece 16a positioned at the phase belt end is connected to the $5^{th}$ lower coil piece positioned at the other phase belt end, by the connection side jumper wire 20a. The $5^{th}$ lower coil piece is sequentially wound to the $40^{th}$ upper coil piece, $3^{rd}$ lower coil piece, and $38^{th}$ upper coil piece with the above pitch, and the $31^{st}$ upper coil piece is connected to the lead-out connection conductor 21, and further connected to the neutral terminal 23.

As described above, in this modification, the number of series coils per one phase is an even number, unlike the fourth embodiment (FIG. 11) in which the number of series coils per one phase is an odd number, and a jumper wire connects between a coil piece at one phase belt end and a coil piece at the second from the other phase belt end.

As for the potential difference between adjacent coil pieces, regarding the coil pieces at the phase belt end in FIG. 13, the potential of the $1^{st}$ upper coil piece is 5/10 [PU] at the connection side end, and the potential of the not-shown adjacent $60^{th}$ upper coil piece is 4/10 [PU]. The potential difference between the $1^{st}$ upper coil piece and $66^{th}$ upper coil piece is 0.781 [PU] considering a phase difference.

On the other hand, the potential of the $10^{th}$ upper coil piece is 6/10 [PU] at the connection side end, and the potential of the not-shown adjacent $11^{th}$ upper coil piece is 5/10 [PU]. The potential difference between the $10^{th}$ upper coil piece and $11^{th}$ upper coil piece is 0.954 [PU] considering a phase difference.

In a 60-slot winding equivalent to this modification, a maximum potential difference between adjacent coil pieces is calculated with respect to a winding similar to those described in the first to third embodiments. The calculated maximum potential difference is 0.9 [PU], which is smaller than the potential difference in this modification.

As for the potential difference between coil pieces in the same phase, for example the V-phase, the potential of the $8^{th}$ upper coil piece is 7/10 [PU], the potential of the $9^{th}$ upper coil piece is 1/10 [PU], and the potential of the $10^{th}$ upper coil piece is 6/10 [PU]. Therefore, the potential difference among these three coil pieces is 6/10=0.6 [PU] and 5/10=0.5 [PU], respectively.

Further, in this embodiment, the potential difference between coil pieces in the same phase is one of the above potential differences.

As described above, in the armature winding of the fourth embodiment, a maximum potential difference between adjacent coil pieces is 0.954 [PU], the value between coil pieces of different phases.

In a conventional 60-slot example equivalent to this modification, a maximum potential difference between adjacent coil pieces is 1.646 [PU], based on a similar calculation. Compared with this, this modification is very effective to prevent generation of corona discharge. Further, as the pitch at the connection side coil end is two less than the winding pitch, the length of the connection side coil end can be reduced.

Embodiment 5

Figure 14:
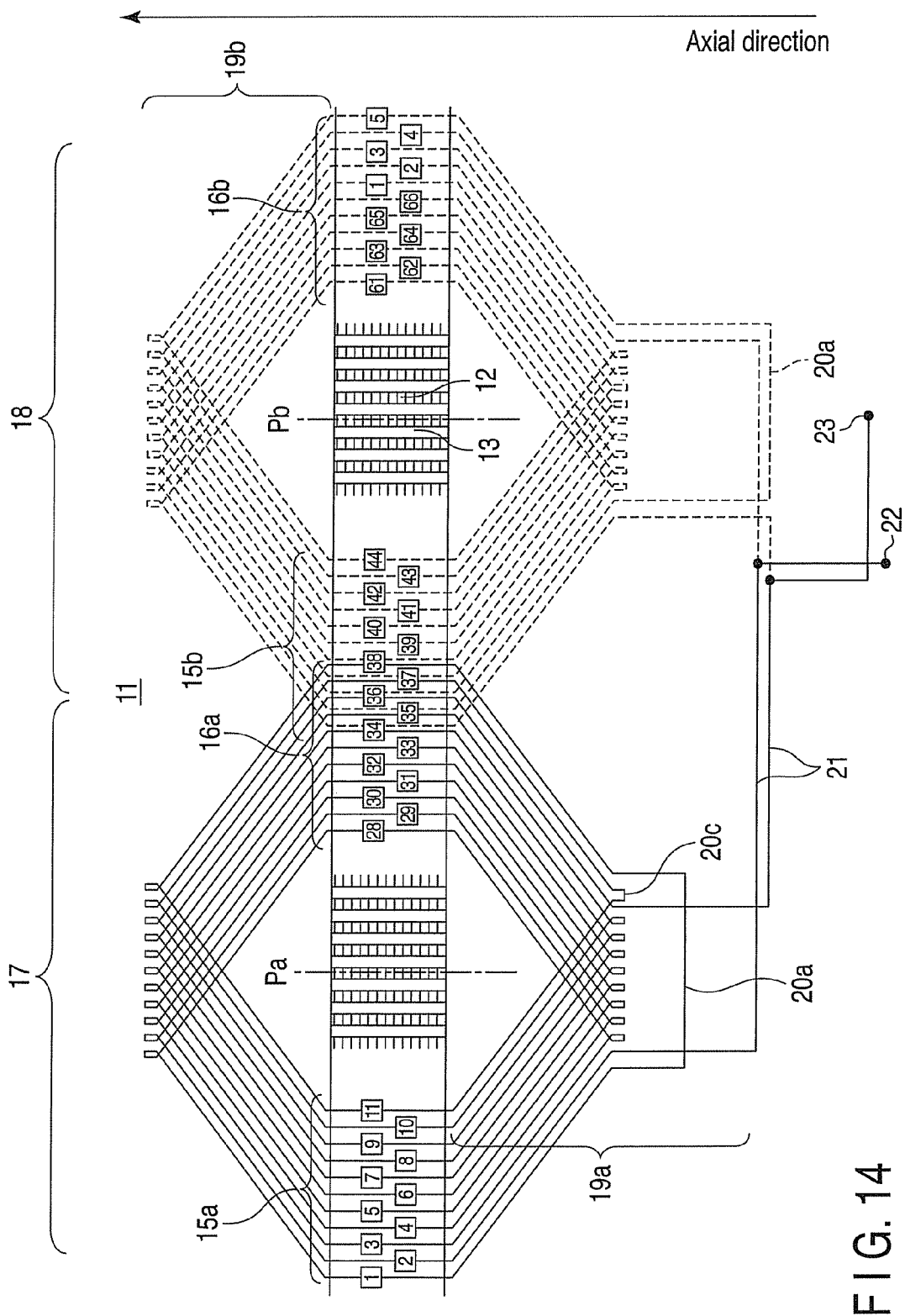
FIG. 14 is a developed perspective view of one phase of a 2-pole 3-phase 2-parallel-circuit armature winding, as a fifth embodiment of an armature winding of a rotating electrical machine according to the invention.

FIG. 14 is a developed perspective view of one phase of a 2-pole 3-phase 2-parallel-circuit armature winding as a fifth embodiment of an armature winding of a rotating electrical machine according to the invention. The number of slots is 66. The other two phases are configured by shifting the electric angle by 120° and 240°. An explanation of the same configuration as the embodiment in FIG. 1 is omitted.

In this embodiment, similarly to the fourth embodiment, the coil pitch at the connection side coil end is 25, two less than the winding pitch, and the coil pitch at the counter-connection side coil end is 27, equal to the winding pitch.

As shown in FIG. 14, at the connection side coil end 19a of the first phase belt 17, the second upper coil piece 15a is connected to the lead-out connection conductor 21 connected to the output terminal 22, and sequentially wound to the $29^{th}$ lower coil piece, $4^{th}$ upper coil piece, and $31^{st}$ lower coil piece, up to the $37^{th}$ lower coil piece, with the above coil pitch, and the $37^{th}$ lower coil piece 16a is connected to the $11^{th}$ upper coil piece by the connection side jumper wire 20c equivalent to one coil pitch. The $11^{th}$ upper coil piece is connected to the $38^{th}$ lower coil piece, and the $38^{th}$ lower coil piece that is the phase belt end is connected to the $1^{st}$ upper coil piece that is the other phase end by the connection side jumper wire 20a equivalent to 10 coil pitches.

The $1^{st}$ upper coil piece is sequentially wound to the $28^{th}$ lower coil piece, $3^{rd}$ upper coil piece, and $30^{th}$ lower coil piece with the above pitch, and the $36^{th}$ lower coil piece is connected to the lead-out connection conductor 21, and further connected to the neutral terminal 23.

In the second phase belt 18, the coil pieces are connected as in the fourth embodiment.

As for the potential difference between adjacent coil pieces, regarding the coil pieces at the phase belt end shown in FIG. 11, the potential of the first upper coil piece is 5/11 [PU] at the connection side end, and the potential of the not-shown adjacent $66^{th}$ upper coil piece is 5/11 [PU]. The potential difference between the $1^{st}$ upper coil piece and $66^{th}$ upper coil piece is 0.787 [PU] considering a phase difference.

As for the potential difference between coil pieces in the same phase, for example the V-phase, the potential of the $8^{th}$ upper coil piece is 8/11 [PU], the potential of the $9^{th}$ upper coil piece is 1/11 [PU], and the potential of the $10^{th}$ upper coil piece is 7/11 [PU]. Therefore, the potential difference among these three coil pieces is 7/11=0.636 [PU] and 6/11=0.545 [PU], respectively.

Further, the potential difference between coil pieces in the same phase is one of the above potential differences.

As described above, in the fifth embodiment, a maximum potential difference between adjacent coil pieces is 0.787 [PU], the value between coil pieces of different phases, which is smaller than 1.654 [PU] of conventional examples and any value in the armature windings explained in the first to fourth embodiments. This is very effective to prevent generation of corona discharge.

As described above, in this embodiment, the potential difference between coil pieces of different phases can be decreased by changing the potentials of coil pieces at a phase belt end by using a connection side jumper wire equivalent to one coil pitch in the first phase belt in the fourth embodiment.

Embodiment 6

Figure 15:
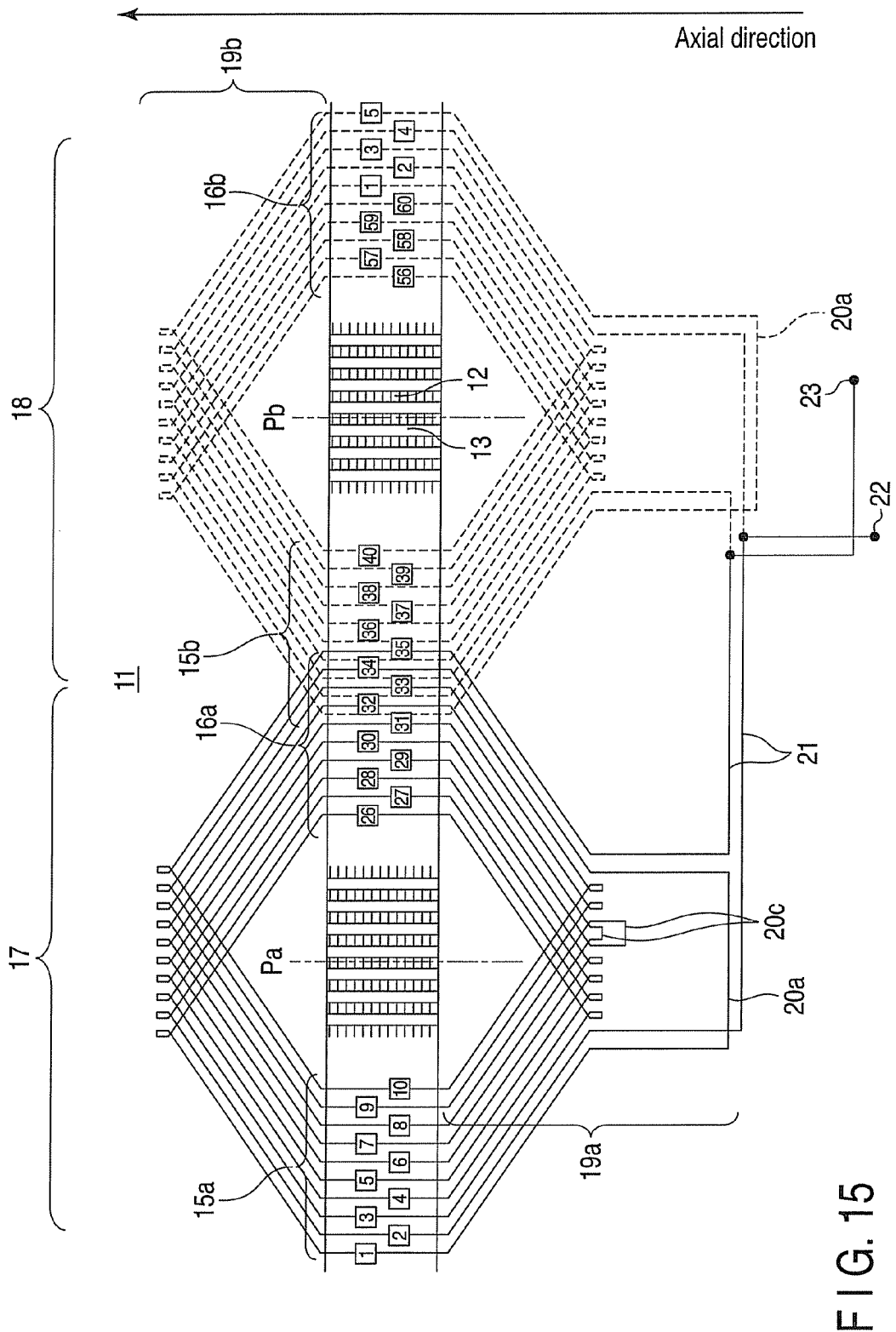
FIG. 15 is a developed perspective view of one phase of a 2-pole 3-phase 2-parallel-circuit armature winding, as a sixth embodiment of an armature winding of a rotating electrical machine according to the invention.

FIG. 15 is a developed perspective view of one phase of a 2-pole 3-phase 2-parallel-circuit armature winding as a sixth embodiment of an armature winding of a rotating electrical machine according to the invention. The number of slots is 60 as in the modification of the fourth embodiment.

In this embodiment, as in the modification of the fourth embodiment, the coil pitch is 25, the coil pitch at the connection side coil end is 23, two less than the winding pitch, and the coil pitch at the counter-connection side coil end is 25, equal to the winding pitch.

As shown in FIG. 15, at the connection side coil end 19a of the first phase belt 17, the $2^{nd}$ upper coil piece 15a is connected to the lead-out connection conductor 21 connected to the output terminal 22, and sequentially wound to the $27^{th}$ lower coil piece, $4^{th}$ upper coil piece, and $29^{th}$ lower coil piece with the above coil pitch. After being connected to the next $6^{th}$ upper coil piece and $31^{st}$ lower coil piece, the $31^{st}$ lower coil piece 16a is connected to the $7^{th}$ upper coil piece by the connection side jumper wire 20c equivalent to one coil pitch. The $7^{th}$ upper coil piece is connected to the $32^{nd}$ lower coil piece with the above same coil pitch, and further connected to the 9$^{th}$ upper coil piece and 34$^{th}$ lower coil piece.

The 34$^{th}$ lower coil piece is connected to the 1$^{st}$ upper coil piece positioned at the phase end with the jumper wire 20a equivalent to 10 coil pitches. The 1$^{st}$ upper coil piece is sequentially wound to the 26$^{th}$ lower coil piece, 3$^{rd}$ upper coil piece, 28$^{th}$ lower coil piece, 5$^{th}$ upper coil piece, and 30$^{th}$ lower coil piece with the above same coil pitch. However, the 30$^{th}$ lower coil piece is connected to the 8$^{th}$ upper coil piece by the connection side jumper wire 20c equivalent to one coil pitch. The 8$^{th}$ upper coil piece is connected to the 33$^{rd}$ lower coil piece with the above same coil pitch, and further connected to the 10$^{th}$ upper coil piece, and 35$^{th}$ lower coil piece. The 35$^{th}$ lower coil piece is connected to the lead-out connection conductor 21, and further connected to the neutral terminal 23.

In the second phase belt 18, the coil pieces are connected as in the modification of the fourth embodiment.

As described above, in this modification, two jumper wires, each equivalent to one coil pitch, are used, unlike the fourth embodiment (FIG. 14) in which the number of series coils per one phase is an odd number.

As for the potential difference between adjacent coil pieces, regarding the coil pieces at the phase belt end shown in FIG. 15, the potential of the 1$^{st}$ upper coil piece is 5/10 [PU] at the connection side end, and the potential of the not-shown adjacent 60$^{th}$ upper coil piece is 4/10 [PU]. The potential difference between the 1$^{st}$ upper coil piece and 66$^{th}$ upper coil piece is 0.781 [PU] considering a phase difference, as in the modification of the fourth embodiment. On the other hand, the potential of the 10$^{th}$ upper coil piece is 1/10 [PU] at the connection side end, and the potential of the not-shown adjacent 11$^{th}$ upper coil piece is 5/10 [PU]. The potential difference between the 10$^{th}$ upper coil piece and 11$^{th}$ upper coil piece is 0.557 [PU] considering a phase difference.

As described above, in this embodiment, a maximum potential difference between adjacent coil pieces, in a 60-slot winding, is smaller than 0.9 [PU] in the winding similar to those described in the first to third embodiments, and 0.954 [PU] in the modification 1 of the fourth embodiment.

Since a maximum potential difference between adjacent coil pieces in the same phase is 0.6 [PU], finally, in the armature winding of the fourth embodiment, a maximum potential difference between adjacent coil pieces is 0.781 [PU], the value between coil pieces of different phases. When the number of series coils per one phase of the winding is an even number, a maximum potential difference between adjacent coil pieces is the smallest in the above embodiments, and is very effective to prevent generation of corona discharge.

Further, the positions of two connection jumper wires, each equivalent to one coil pitch, described in this embodiment are not limited to those shown in FIG. 15, and the jumper wires are desirably placed apart away from the lead-out connection conductor 21 from the viewpoint of reducing the interference.

Embodiment 7

Figure 16:
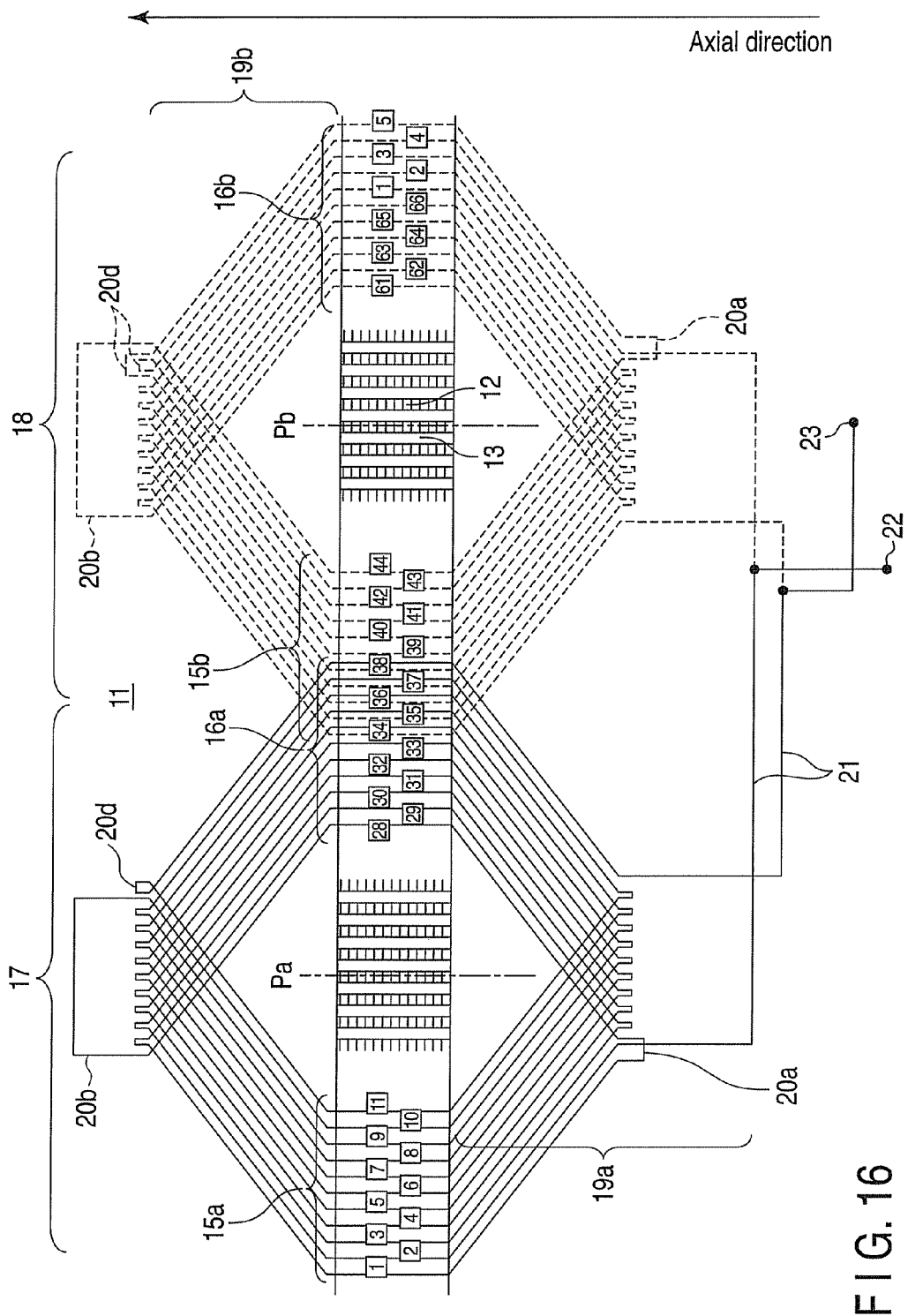
FIG. 16 is a developed perspective view of one phase of a 2-pole 3-phase 2-parallel-circuit armature winding, as a seventh embodiment of an armature winding of a rotating electrical machine according to the invention.

FIG. 16 is a developed perspective view of one phase of a 2-pole 3-phase 2-parallel-circuit armature winding as a seventh embodiment of an armature winding of a rotating electrical machine according to the invention. The number of slots is 66.

In this embodiment, the coil pitch at the connection side coil end is 26, one less than the winding pitch, and the coil pitch at the counter-connection side coil end is 28, one higher than the winding pitch.

As shown in FIG. 16, at the connection side coil end 19a of the first phase belt 17, the 2$^{nd}$ upper coil piece 15a is connected to the lead-out connection conductor 21 connected to the output terminal 22, and sequentially wound to the 30$^{th}$ lower coil piece, 4$^{th}$ upper coil piece, and 32$^{nd}$ lower coil piece, up to the 10$^{th}$ upper coil piece, with the above coil pitch. The 10$^{th}$ upper coil piece 15a that is second from the phase belt end is connected to the 28$^{th}$ lower coil piece at the other phase end, by the counter-connection side jumper wire 20b equivalent to 10 coil pitches.

The 28$^{th}$ lower coil piece is connected to the 1$^{st}$ upper coil piece on the connection side by the connection side jumper wire 20c equivalent to one coil pitch. The 1$^{st}$ upper coil piece is connected to the 29$^{th}$ lower coil piece, and sequentially wound to the 3$^{rd}$ upper coil piece, and 31$^{st}$ lower coil piece with the above coil pitch. The 38$^{th}$ lower coil piece is connected to the 11$^{th}$ upper coil piece on the counter-connection side by the counter-connection side jumper wire 20d equivalent to one coil pitch in the counter-connection side, and further connected to the lead-out connection conductor 21, and connected to the neutral terminal 23.

In the second phase belt 18, the 4$^{th}$ lower coil piece 16b is connected to the lead-out connection conductor 21 connected to the output terminal 22, at the connection side coil end 19a, and connected to the 43$^{rd}$ upper coil piece on the connection side by the connection side jumper wire 20c equivalent to one coil pitch. Then, the 3$^{rd}$ lower coil piece, 41$^{st}$ upper coil piece, 1$^{st}$ lower coil piece, and 39$^{th}$ upper coil piece are sequentially wound with the above coil pitch, up to the 61$^{st}$ lower coil piece. The 61$^{st}$ lower coil piece at the phase belt end is connected to the 44$^{th}$ upper coil piece positioned at the other phase belt end, by the counter-connection side jumper wire 20b equivalent to 11 coil pitches.

The 44$^{th}$ upper coil piece is connected to the 5$^{th}$ lower coil piece by the connection side jumper wire 20c equivalent to one coil pitch in the connection side, the 5$^{th}$ lower/upper coil piece is connected to the 42$^{nd}$ upper coil piece on the counter-connection side by the counter-connection side jumper wire 20d equivalent to one coil pitch in the counter connection side, and sequentially wound to the 2$^{nd}$ lower coil piece, and 40$^{th}$ upper coil piece with the above coil pitch, and the 34$^{th}$ upper coil piece is connected to the lead-out connection conductor 21, and further connected to the neutral terminal 23.

As for the potential difference between adjacent coil pieces, regarding the coil pieces at the phase belt end shown in FIG. 11, the potential of the 1$^{st}$ upper coil piece is 6/11 [PU] at the connection side end, and the potential of the not-shown adjacent 66$^{th}$ upper coil piece is 5/11 [PU]. The potential difference between the 1$^{st}$ upper coil piece and 66$^{th}$ upper coil piece is 0.867 [PU] considering a phase difference.

As for the potential difference between coil pieces in the same phase, for example the V-phase, the potential of the 8$^{th}$ upper coil piece is 2/11 [PU], the potential of the 9$^{th}$ upper coil piece is 7/11 [PU], and the potential of the 10$^{th}$ upper coil piece is 1/11 [PU]. Therefore, the potential difference among these three coil pieces is 6/11=0.545 [PU], and 5/11=0.455 [PU], respectively.

Further, the potential difference between coil pieces in the same phase is one of the above potential differences.

As described above, in the seventh embodiment, a maximum potential difference between adjacent coil pieces is 0.867 [PU], the value between coil pieces of different phases, which is smaller than 1.654 [PU] of conventional examples. This is very effective to prevent generation of corona discharge, and a stable armature of a rotating electrical machine can be provided.

Figure 17:
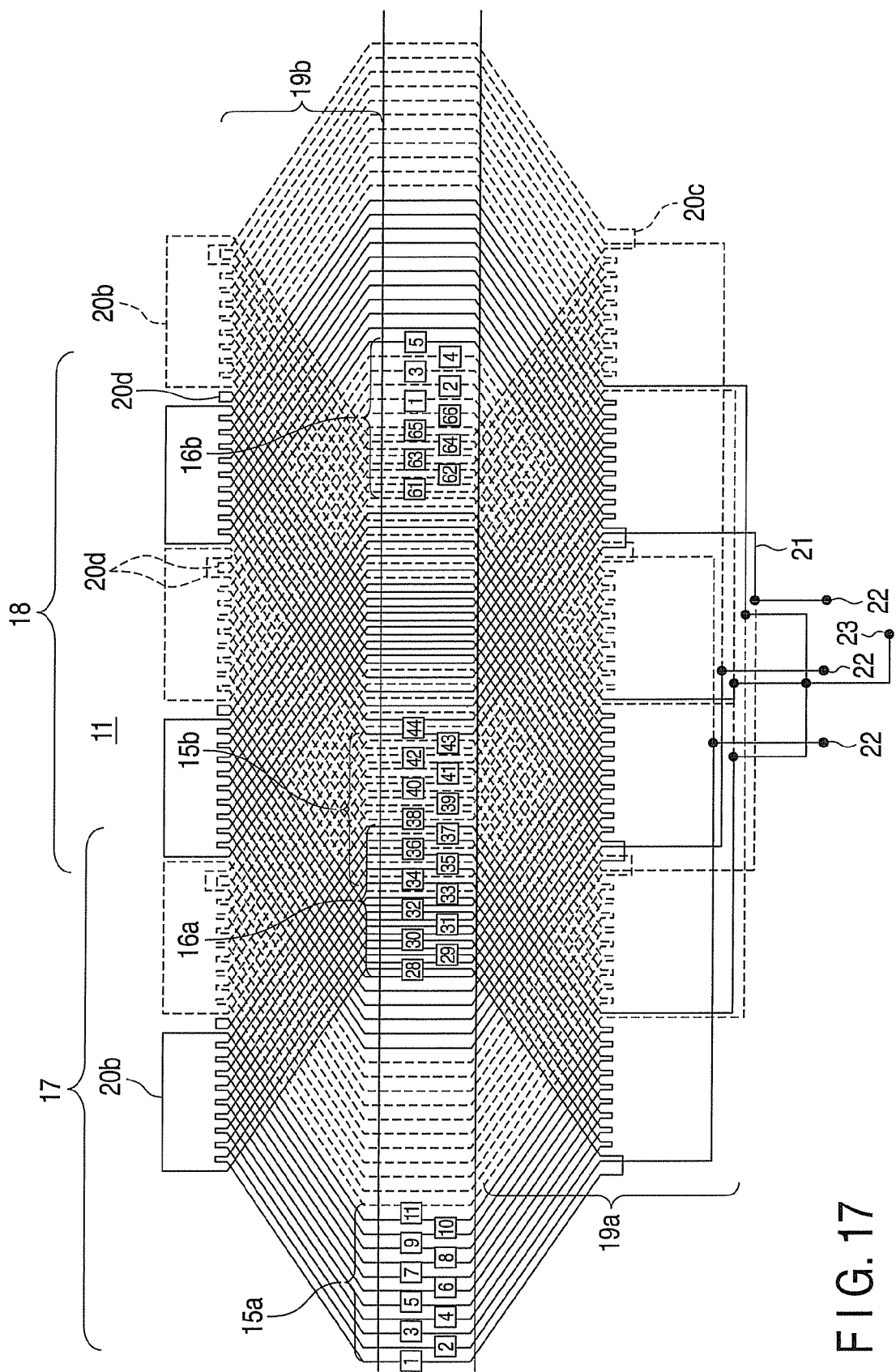
FIG. 17 is a developed perspective view of three phases of the same embodiment.

FIG. 17 is a developed perspective view of three phases of an armature winding of a rotating electrical machine of this embodiment.

By arranging the lead-out connection conductor 21 and connection side jumper wire 20a as shown in the drawing, the winding may be composed of five rows of connection rings, which is the same number as in conventional examples.

One row of rings is necessary in the counter connection side. Concerning at least the connection side, compared with the above described embodiments, the connection ring placing space can be reduced, and the size of a rotating electrical machine can be reduced.

Embodiment 8

Figure 18:
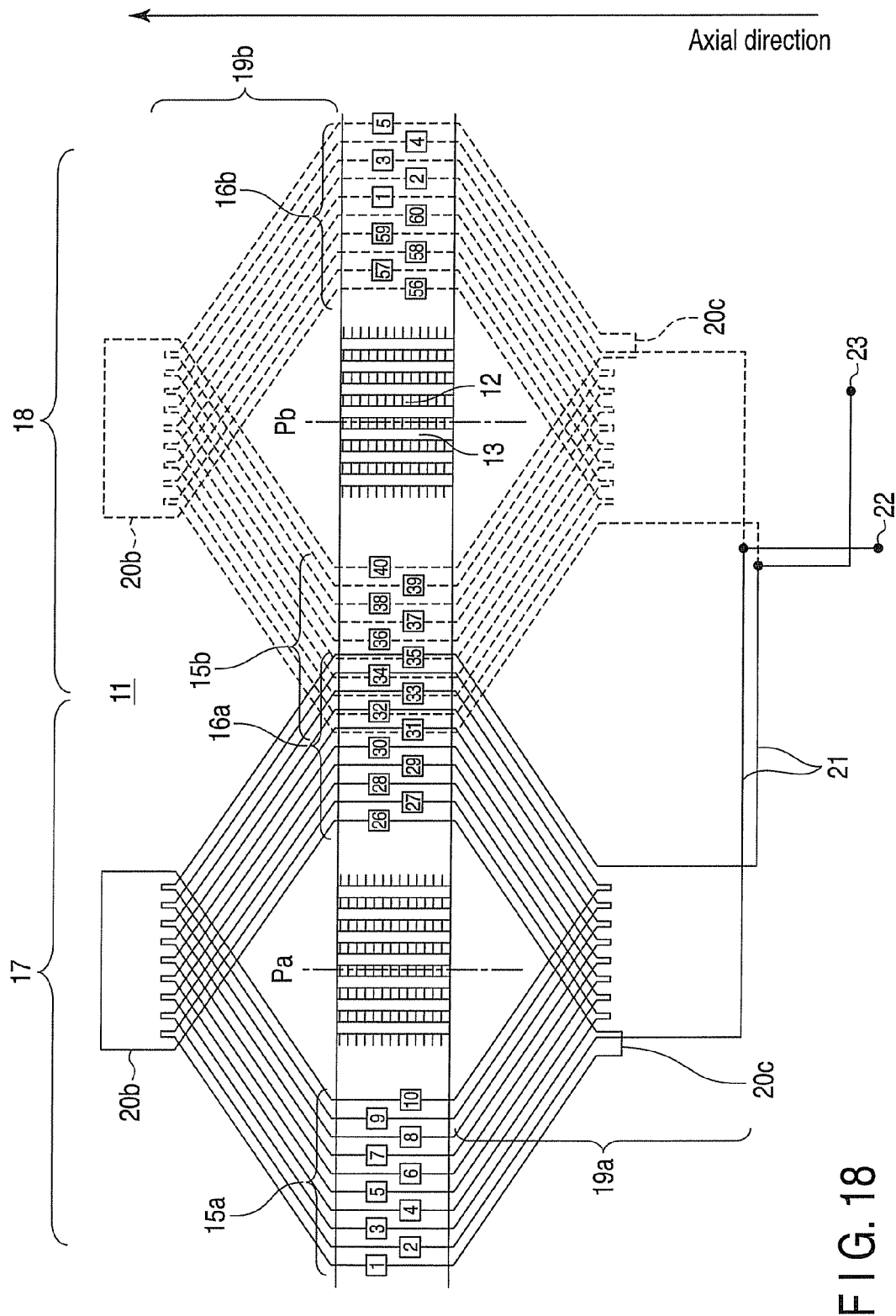
FIG. 18 is a developed perspective view of one phase of a 2-pole 3-phase 2-parallel-circuit armature winding, as an eighth embodiment of an armature winding of a rotating electrical machine according to the invention.

FIG. 18 is a developed perspective view of one phase of a 2-pole 3-phase 2-parallel-circuit armature winding as an eighth embodiment of an armature winding of a rotating electrical machine according to the invention. The number of slots is 60. As the number of series coils per one phase of the winding is an even number, 10, the configuration is basically the same as the seventh embodiment, except for some parts.

In this embodiment, the coil pitch at the connection side coil end is 24, one less than the winding pitch, and the coil pitch at the counter-connection side coil end is 26, one higher than the winding pitch.

As shown in FIG. 18, at the connection side coil end 19a of the first phase belt 17, the $2^{nd}$ upper coil piece 15a is connected to the lead-out connection conductor 21 connected to the output terminal 22, and sequentially wound to the $28^{th}$ lower coil piece, $4^{th}$ upper coil piece, $30^{th}$ lower coil piece with the above coil pitch, and connected to the $10^{th}$ upper coil piece at the phase belt end, and then connected to the $26^{th}$ lower/upper coil piece by the counter-connection side jumper wire 20b equivalent to 10 coil pitches.

The $26^{th}$ lower coil piece is connected to the $1^{st}$ upper coil piece by the connection side jumper wire 20c equivalent to one coil pitch, and sequentially $3^{rd}$ upper coil piece, and $29^{th}$ lower coil piece with the above same coil pitch. The $35^{th}$ lower coil piece is connected to the lead-out connection conductor 21, and further connected to the neutral terminal 23.

Similarly, in the second phase belt 18, coil pieces are connected with the same coil pitch by using the connection side jumper wire 20c equivalent to one oil pitch and the counter-connection side jumper wire 20b equivalent to 10 coil pitches.

As described above, in this embodiment, the number of jumper wires is decreased, unlike the seventh embodiment (FIG. 16) in which the number of series coils per one phase is an odd number.

As for the potential difference between adjacent coil pieces, regarding the coil pieces at the phase belt end shown in FIG. 18, the potential of the $1^{st}$ upper coil piece is 5/10 [PU] at the connection side end, and the potential of the not-shown adjacent $60^{th}$ upper coil piece is 5/10 [PU]. The potential difference between the $1^{st}$ upper coil piece and $60^{th}$ upper coil piece is 0.866 [PU] considering a phase difference.

A maximum potential difference between adjacent coils in the same phase is 0.6 [PU]. In the armature winding of the eighth embodiment, a maximum potential difference between adjacent coil pieces is 0.866 [PU], the value between coil pieces of different phases, which is smaller than a maximum potential difference of 1.646 [PU] in conventional examples, and is very effective to prevent generation of corona discharge.

Figure 19:
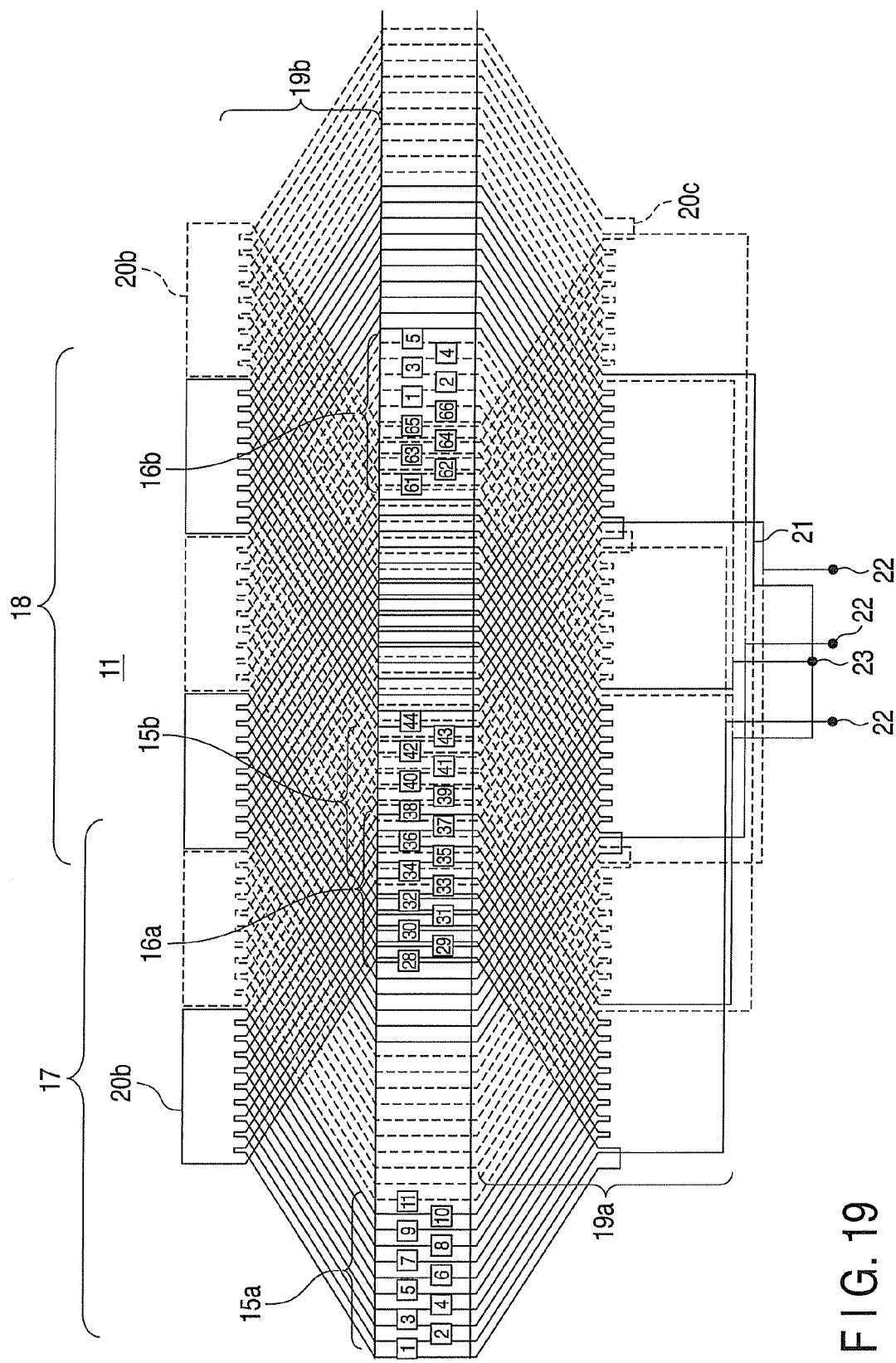
FIG. 19 is a developed perspective view of three phases of the same embodiment.

FIG. 19 is a developed perspective view of three phases of an armature winding of a rotating electrical machine of this embodiment.

By arranging the lead-out connection conductor 21 and connection side jumper wire 20c as shown in the drawing, the winding may be composed of five rows of connection rings on the connection side, which is the same number of rows as in conventional examples.

One row of rings is necessary on the counter connection side. Concerning at least the connection side, compared with the above described embodiments, the connection ring placing space can be reduced, and the size of a rotating electrical machine can be reduced.

Embodiment 9

Figure 20:
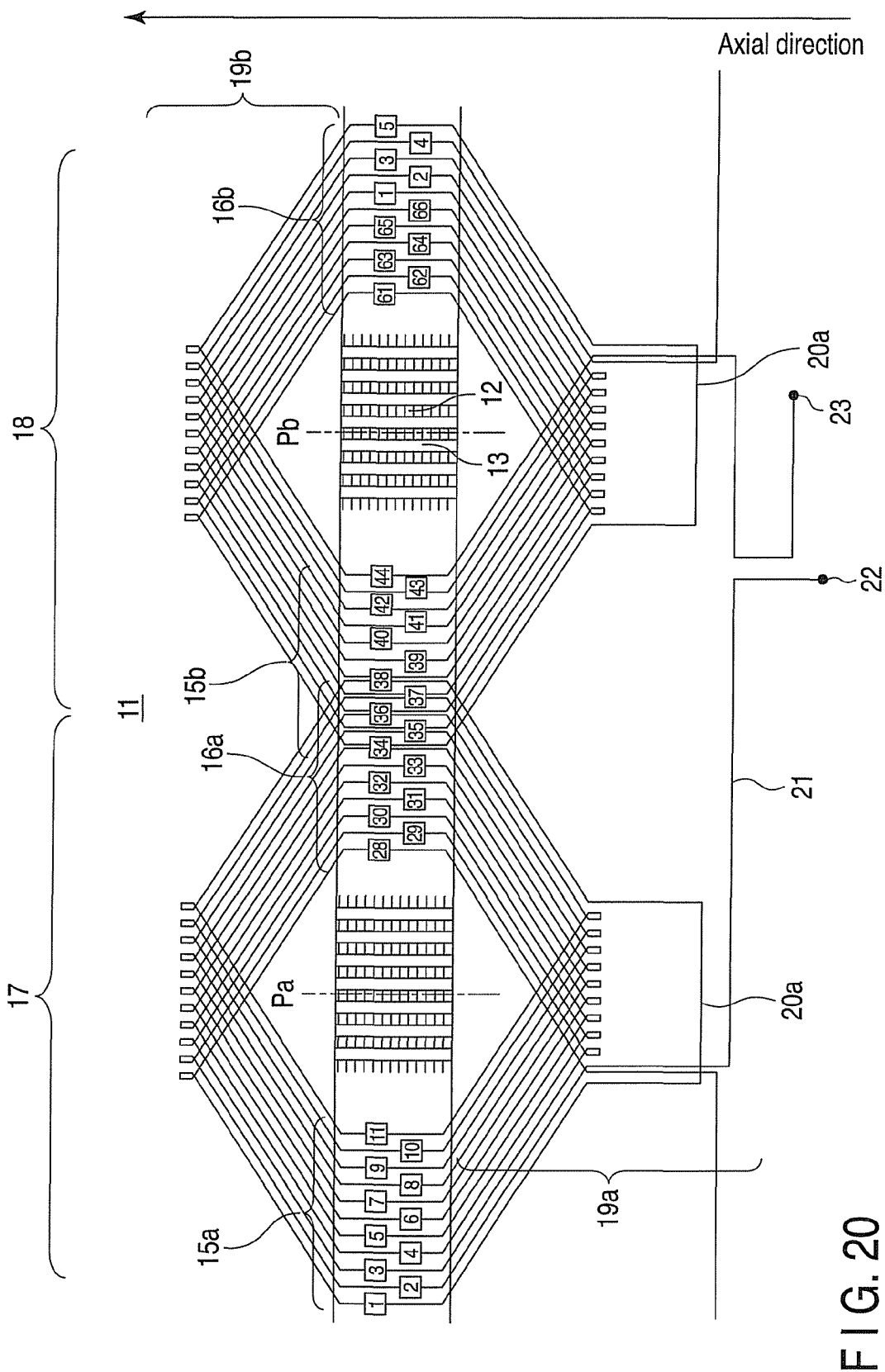
FIG. 20 is a developed perspective view of one phase of a 2-pole 3-phase 1-parallel-circuit armature winding, as a ninth embodiment of an armature winding of a rotating electrical machine according to the invention.

FIG. 20 is a developed perspective view of one phase of a 2-pole 3-phase 1-parallel-circuit (no parallel circuits) armature winding as a ninth embodiment of an armature winding of a rotating electrical machine according to the invention. The number of slots is 66.

In this embodiment, the coil pitch at the connection side coil end is 26, one less than the winding pitch, and the coil pitch at the counter-connection side coil end is 27, equal to the winding pitch.

As shown in FIG. 20, at the connection side coil end 19a of the first phase belt 17, the $2^{nd}$ upper coil piece 15a is connected to the lead-out connection conductor 21 connected to the output terminal 22, and sequentially wound to the $29^{th}$ lower coil piece, $3^{rd}$ upper coil piece, $30^{th}$ lower coil piece with the above coil pitch, and connected to the $38^{th}$ lower coil piece at the phase belt end, and then connected to the $1^{st}$ upper coil piece at the other phase end by the connection side jumper wire 20a equivalent to 11 coil pitches. The $28^{th}$ lower coil piece is connected to the $4^{th}$ lower coil piece of the second phase belt 18, by the lead-out connection conductor 21 connecting the phase belts.

In the second phase belt 18, coil pieces are wound symmetrical to the first phase belt 17 and magnetic pole center, and the $4^{th}$ lower coil piece, $43^{rd}$ upper coil piece, and $3^{rd}$ lower coil piece are sequentially connected. The $34^{th}$ upper coil piece is connected to the $5^{th}$ lower coil piece by the connection side jumper wire 20a equivalent to 11 coil pitches, and the $44^{th}$ upper coil piece is connected to the neutral terminal 23 through the lead-out connection conductor 21.

As for the potential difference between adjacent coil pieces, regarding the coil pieces at the phase belt end shown in FIG. 18, the potential of the $1^{st}$ upper coil piece is 12/22 [PU] at the connection side end, and the potential of the not-shown adjacent $66^{th}$ upper coil piece is 0 [PU]. The potential difference between the $1^{st}$ upper coil piece and $66^{th}$ upper coil piece is 0.546 [PU] considering a phase difference.

Further, the potential of the $11^{th}$ upper coil piece at the connection side end is 13/22 [PU], and the not-shown adjacent $12^{th}$ upper coil piece is 1/22 [PU]. Therefore, the potential difference between the $11^{th}$ upper coil piece and $12^{th}$ upper coil piece is 0.615 [PU] considering a phase difference.

As for the potential difference between coil pieces in the same phase, for example the V-phase, the potential of the $1^{st}$ upper coil piece is 12/22 [PU], the potential of the $2^{nd}$ upper coil piece is 1 [PU], and the potential of the $3^{rd}$ upper coil piece is 21/22 [PU]. Therefore, the potential difference among these three coil pieces is 10/22=0.455 [PU], and 1/22=0.045 [PU], respectively.

Further, the potential difference between coil pieces in the same phase is one of the above potential differences.

As described above, in the armature winding of the ninth embodiment, a maximum potential difference between adjacent coil pieces is 0.615 [PU], which is smaller than 1.289 [PU] of conventional examples, and is very effective to prevent generation of corona discharge. Therefore, a stable armature of a rotating electrical machine can be provided.

Figure 21:
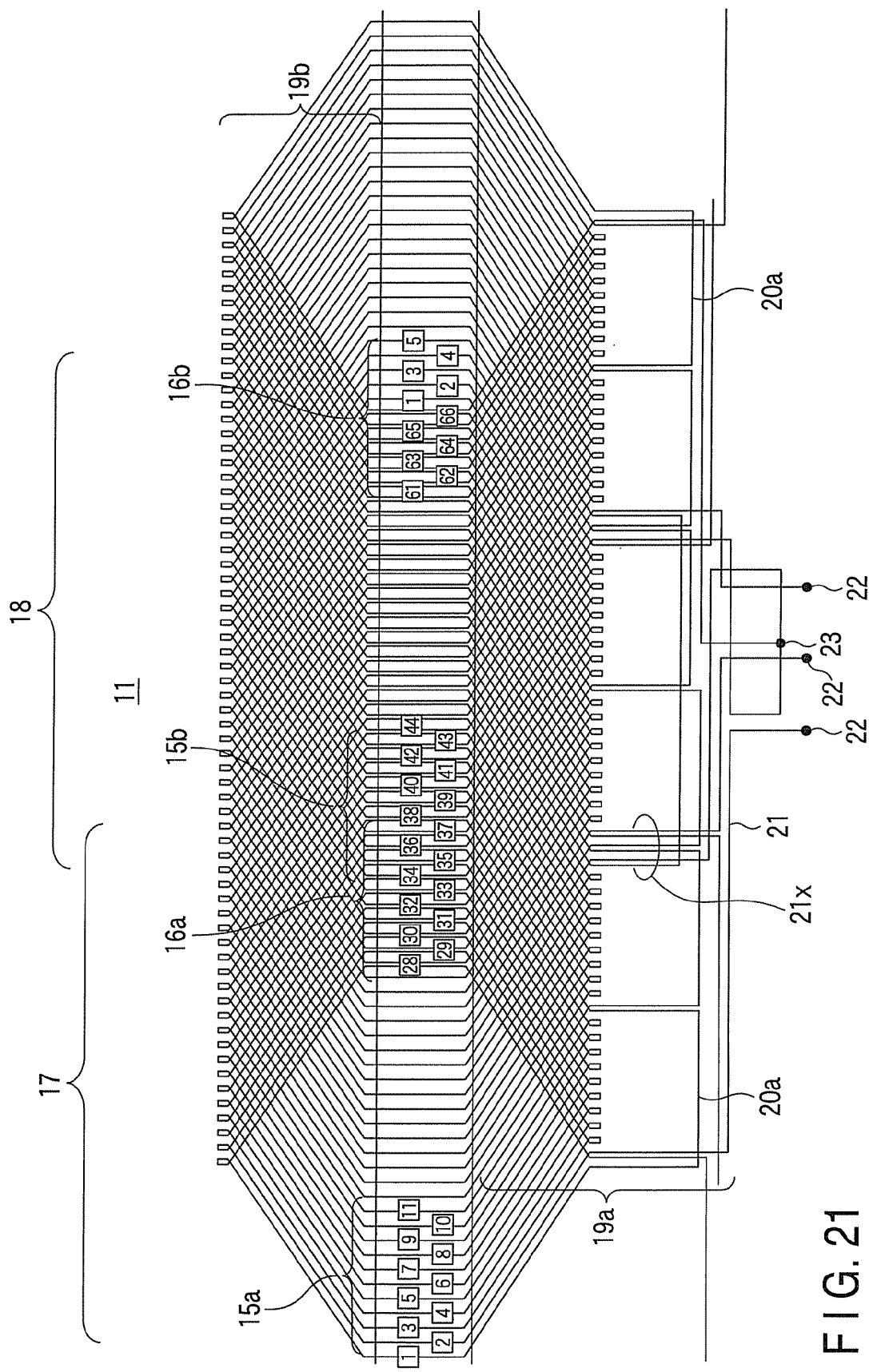
FIG. 21 is a developed perspective view of three phases of the same embodiment.

FIG. 21 is a developed perspective view of three phases of an armature winding of a rotating electrical machine of this embodiment.

As shown in the drawing, at a take-out position at the connection side coil end 19a, the lead-out connection conductors 21 connected to adjacent three upper coil pieces and three lower coil pieces are closely arranged as shown by an area 21x where the lead-out connection conductors interfere with each other.

The closely arranged connection conductors cause such problems as an electromagnetic force between currents flowing in the conductors, and an increase in eddy-current loss in adjacent conductors caused by currents flowing in the conductors. Further, the insulating tape wound around the conductor is deteriorated, and the insulation may become insufficient. Thus, care should be taken when determining the shape of the lead-out connection conductor 21 and when assembling the lead-out connection conductor 21.

Modification 1 of Embodiment 9

Figure 22:
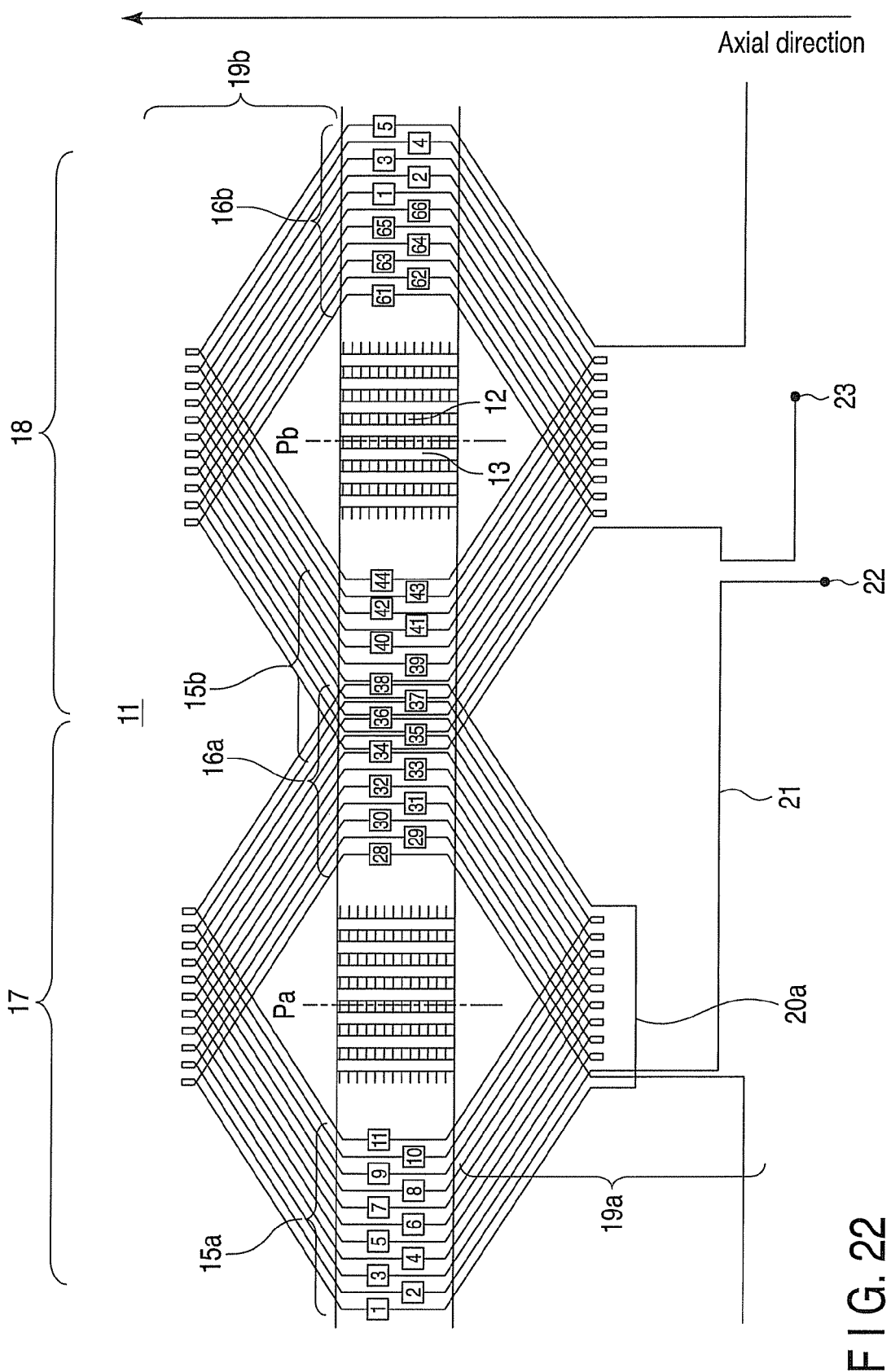
FIG. 22 is a developed perspective view of one phase of a modification 1 of the armature winding in the ninth embodiment.
Figure 23:
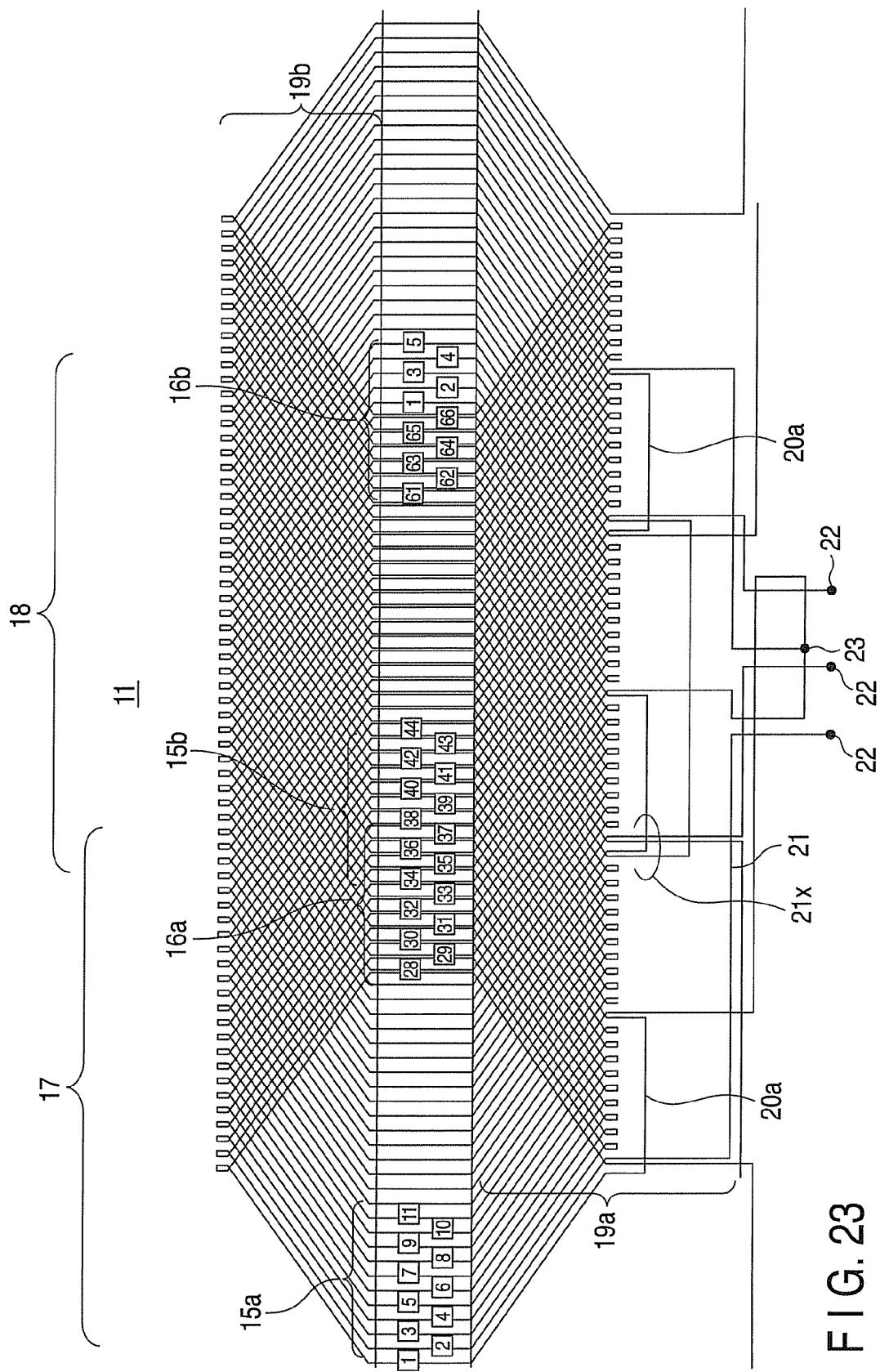
FIG. 23 is a developed perspective view of three phases of the same modification 1.

FIG. 22 is a developed perspective view of one phase of an armature winding as a ninth embodiment. FIG. 23 is a developed perspective view of three phases of the same modification.

Figure 38:
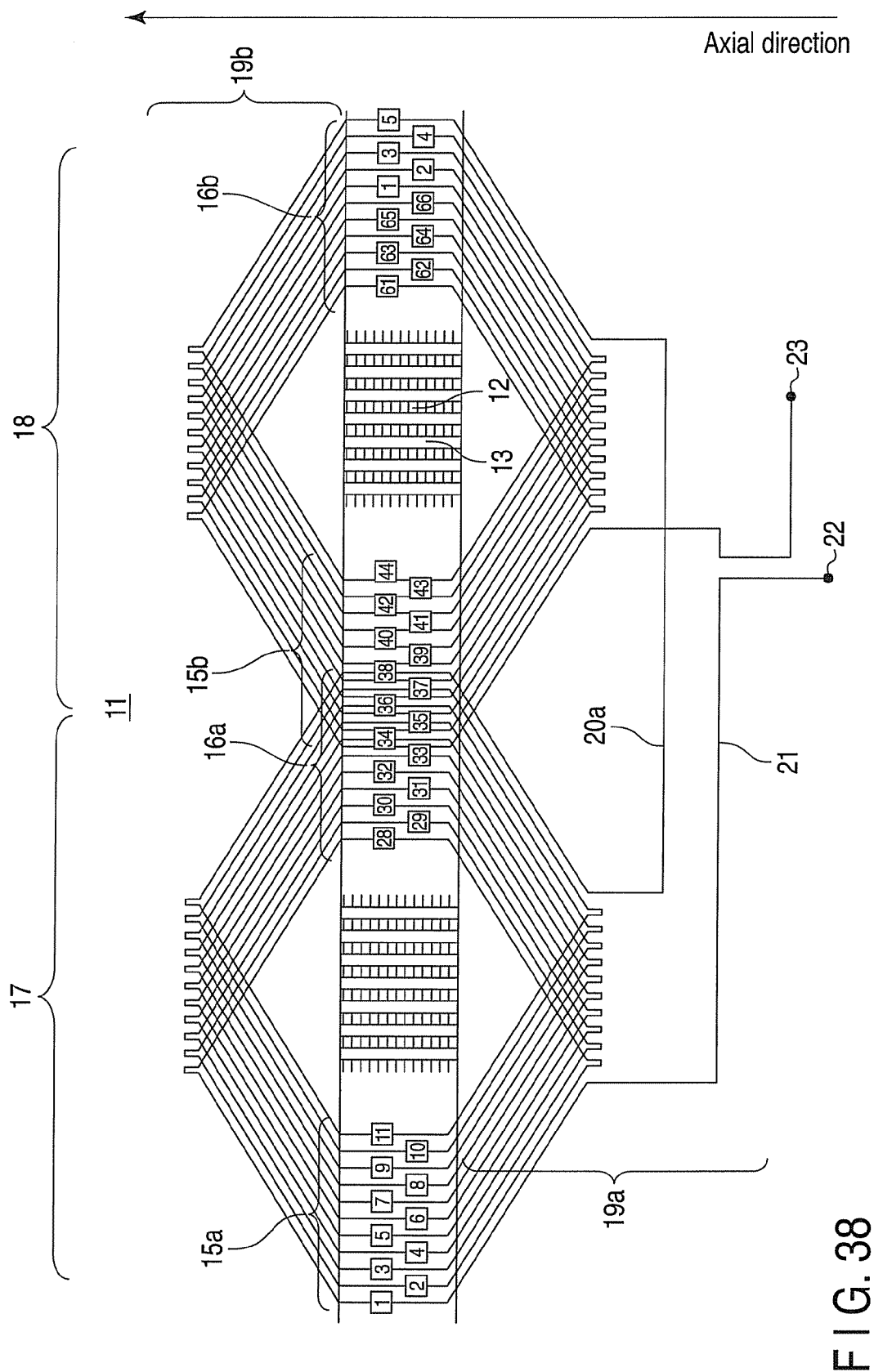
FIG. 38 is a perspective view of one phase of a second example of an armature winding of a conventional rotating electrical machine.
Figure 39:
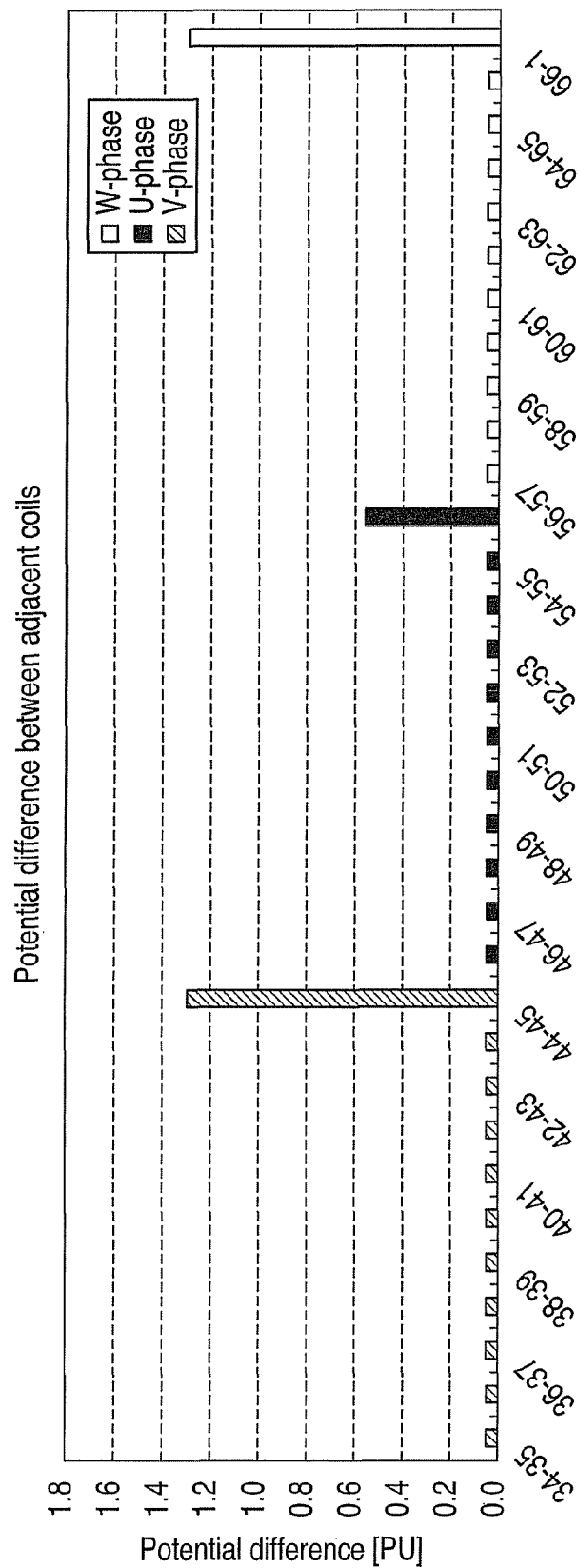
FIG. 39 is a graph showing a distribution of a potential difference between adjacent coil pieces in the second example.
Figure 40:
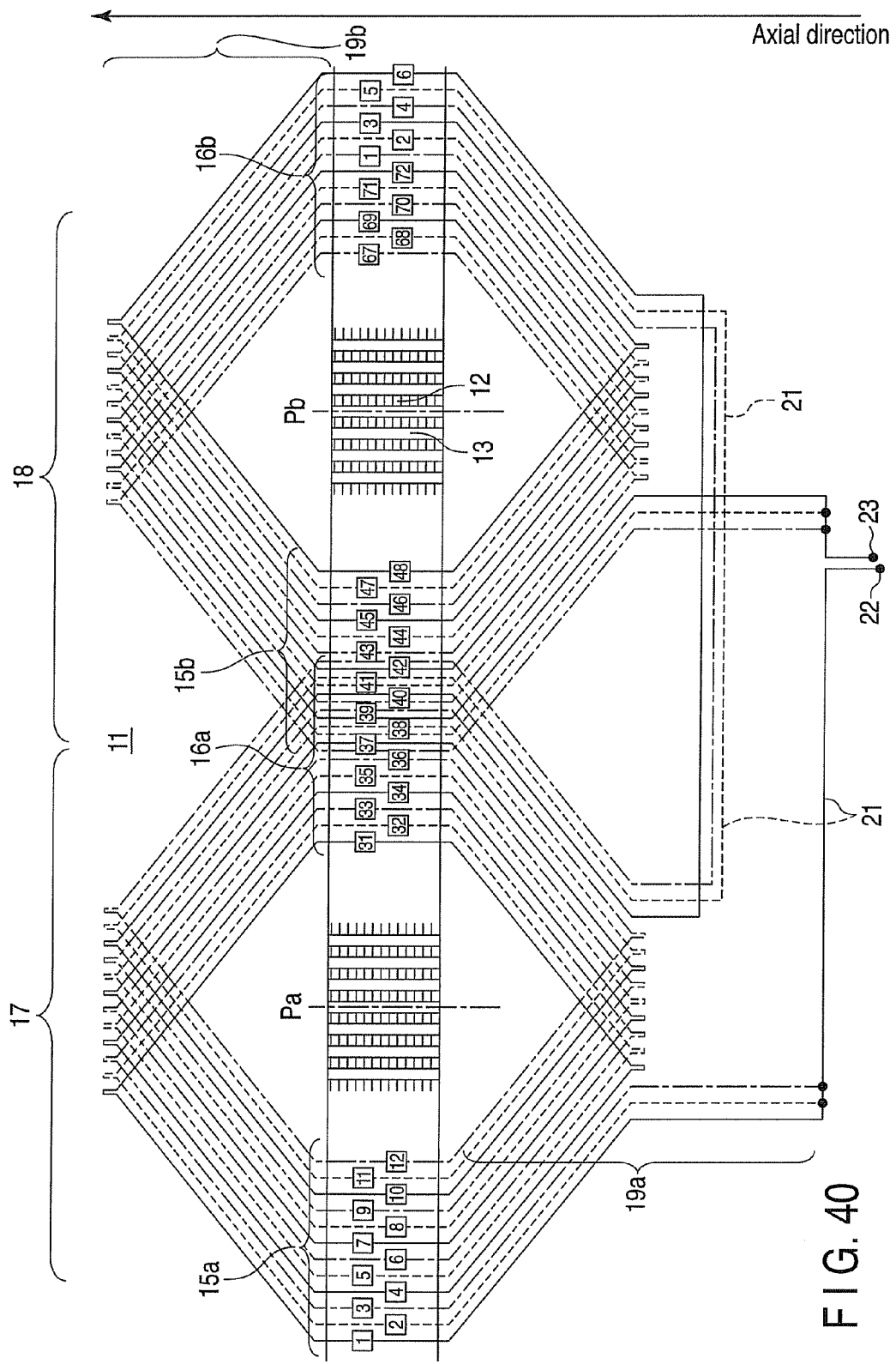
FIG. 40 is a perspective view of one phase of a third example of an armature winding of a conventional rotating electrical machine.
Figure 41:
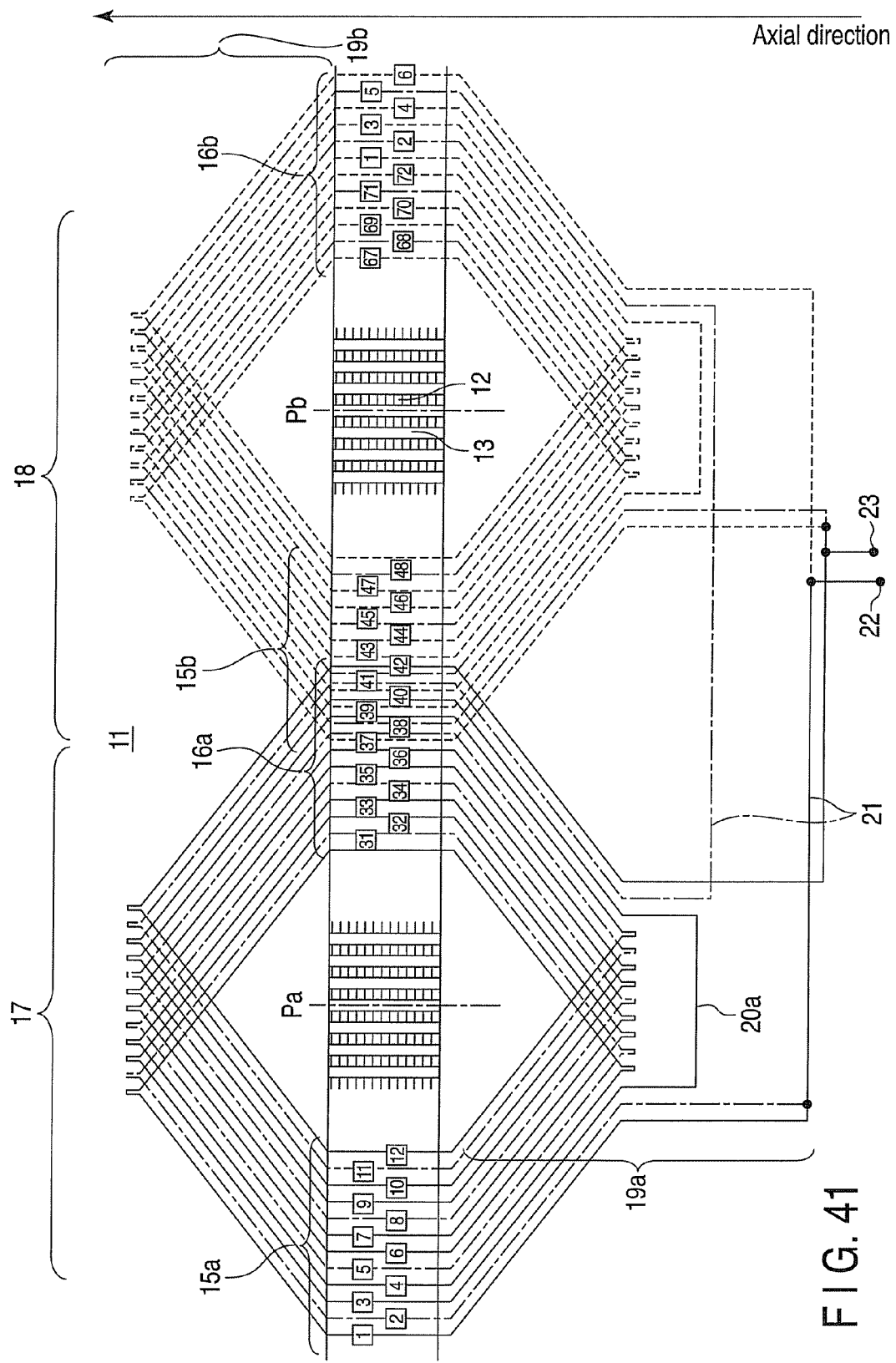
FIG. 41 is a perspective view of one phase of a fourth example of an armature winding of a conventional rotating electrical machine.

As shown in the drawing, in the first phase belt in this modification, the $2^{nd}$ coil piece from the phase belt end is connected to the lead-out portion, as in the ninth embodiment shown in FIGS. 20 and 21. In the second phase belt, the coil piece at the phase belt end in the conventional example shown in FIG. 38 is connected to the lead-out portion.

In the above configuration, two upper coils and two lower coils are adjacent in the part of the connection side coil end 19a, where the coil piece and lead-out connection conductor 21 are closely arranged, in FIG. 21, but two upper coil pieces and two lower coil pieces are adjacent in FIG. 23. This reduces the interference between the coil piece and lead-out connection conductor 21 as shown in FIG. 23, compared with FIG. 21.

As for the potential difference between adjacent coil pieces, regarding the coil pieces at the phase belt end shown in FIG. 22, the potential of the $1^{st}$ upper coil piece is 12/22 [PU] at the connection side end, and the potential of the not-shown adjacent $66^{th}$ upper coil piece is 10/22 [PU]. The potential difference between the $1^{st}$ upper coil piece and $66^{th}$ upper coil piece is 0.867 [PU] considering a phase difference.

Further, the potential of the $11^{th}$ upper coil piece at the connection side end is 13/22 [PU], and the not-shown adjacent $12^{th}$ upper coil piece is 0 [PU]. Therefore, the potential difference between the $11^{th}$ upper coil piece and $12^{th}$ upper coil piece is 0.591 [PU] considering a phase difference.

The potential difference between coil pieces in the same phase is 0.455 [PU] at maximum. Therefore, in the modification 1 of the ninth embodiment, a maximum potential difference between adjacent coil pieces is 0.867 [PU], the value between coil pieces of difference phases, which is increased from 0.615 [PU] of the ninth embodiment, but greatly improved from 1.289 [PU] of conventional examples.

In the configuration of this modification, it is possible to prevent corona discharge caused by a potential difference between coil pieces of different phases. Such problems as an electromagnetic force between currents flowing in the conductors, an increase in eddy-current loss in adjacent conductors caused by currents flowing in the conductors, and poor insulation caused by deteriorated insulating tape wound around the conductor are solved. Therefore, a reliable armature of a rotating electrical machine can be provided.

Modification 2 of Embodiment 9

Figure 24:
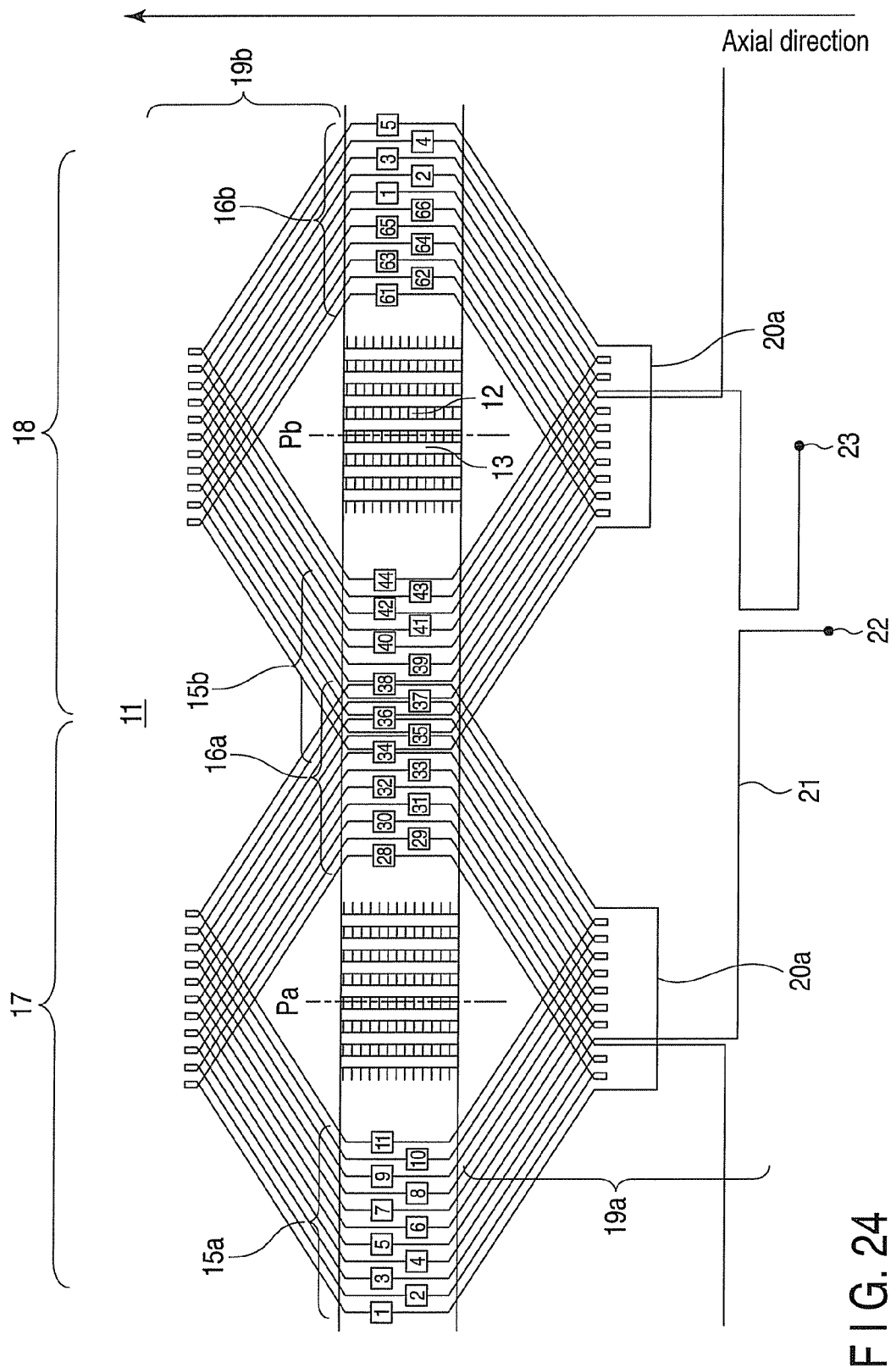
FIG. 24 is a developed perspective view of one phase of a modification 2 of the armature winding in the ninth embodiment.
Figure 25:
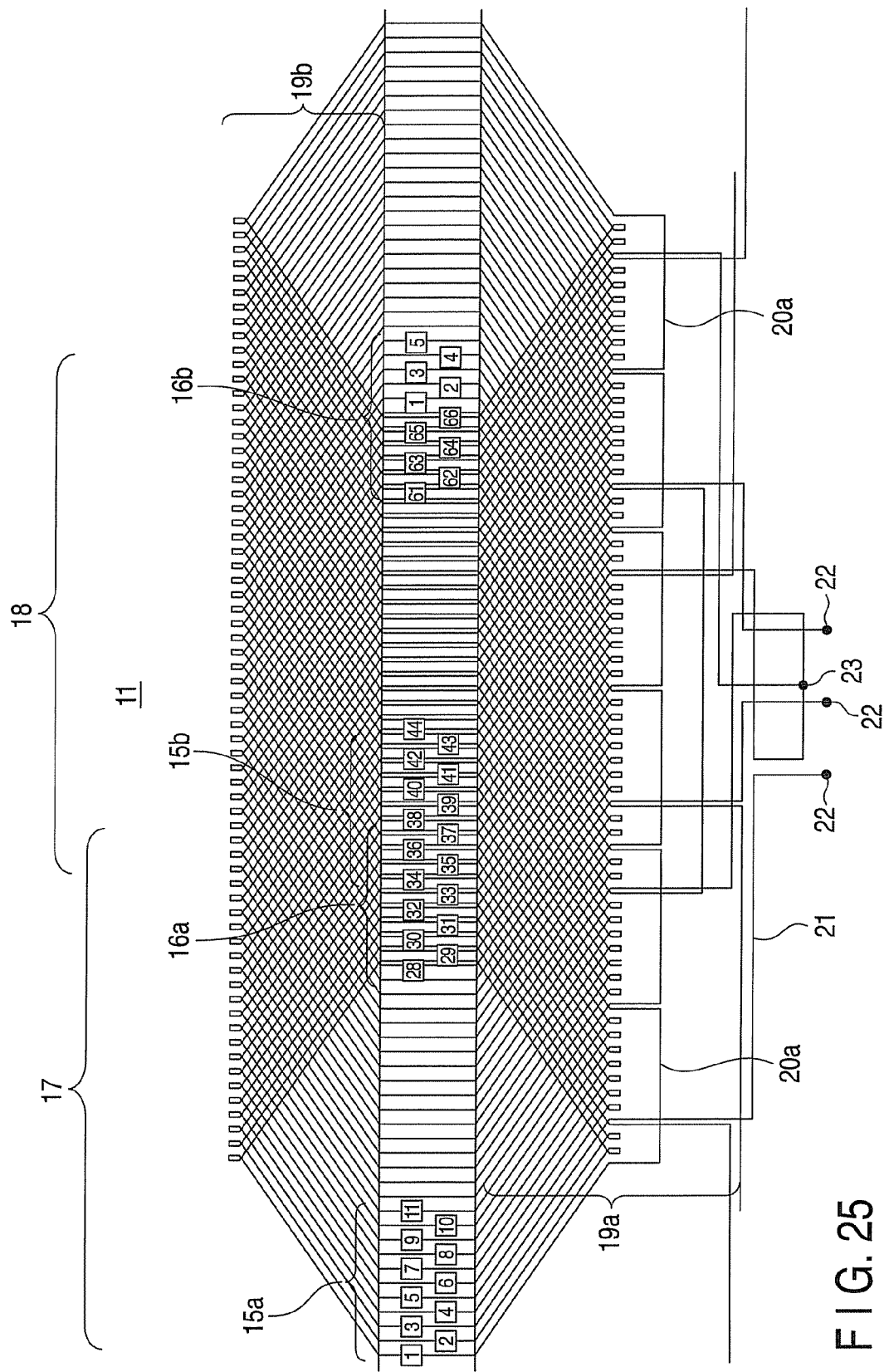
FIG. 25 is a developed perspective view of three phases of the same modification 2.

FIG. 24 is a developed perspective view of one phase of a modification 2 of the armature winding of the ninth embodiment. FIG. 25 is a developed perspective view of three phases of the same modification.

As shown in the drawing, in this modification 2, the $2^{nd}$ coil piece from the phase belt end is connected to the lead-out portion, as in the ninth embodiment shown in FIGS. 20 and 21, and the $4^{th}$ coil piece from the phase belt end is connected to the lead-out portion in FIGS. 24 and 25.

In FIG. 21, the coil piece and lead-out connection conductor 21 are closely arranged at the connection side coil end 19a, but in the above configuration, the interference between the closely arranged coil piece and connection conductor can be reduced in the modification 2.

As for the potential difference between adjacent coil pieces, regarding the coil pieces at the phase belt end shown in FIG. 22, the potential of the $1^{st}$ upper coil piece is 14/22 [PU] at the connection side end, and the potential of the not-shown adjacent $66^{th}$ upper coil piece is 2/22 [PU]. The potential difference between the $1^{st}$ upper coil piece and $66^{th}$ upper coil piece is 0.686 [PU] considering a phase difference. Further, the potential of the $11^{th}$ upper coil piece at the connection side end is 15/22 [PU], and the not-shown adjacent $12^{th}$ upper coil piece is 3/22 [PU]. Therefore, the potential difference between the $1^{st}$ upper coil piece and $66^{th}$ upper coil piece is 0.759 [PU] considering a phase difference.

The potential difference between coil pieces in the same phase is 0.455 [PU] maximum. Therefore, in the modification 2 of the ninth embodiment, a maximum potential difference between adjacent coil pieces is 0.759 [PU], the value between coil pieces of difference phases, which is increased from 0.615 [PU] of the ninth embodiment, but greatly improved from 1.289 [PU] of conventional examples and 0.867 [PU] of the modification 1 of the ninth embodiment.

In the configuration of the modification 2, it is possible to prevent corona discharge caused by a potential difference between coil pieces of different phases. Such problems as an electromagnetic force between currents flowing in the conductors, an increase in eddy-current loss in adjacent conductors caused by currents flowing in the conductors, and poor insulation caused by deteriorated insulating tape wound around the conductor are solved. Therefore, a reliable armature of a rotating electrical machine can be provided.

Figure 26:
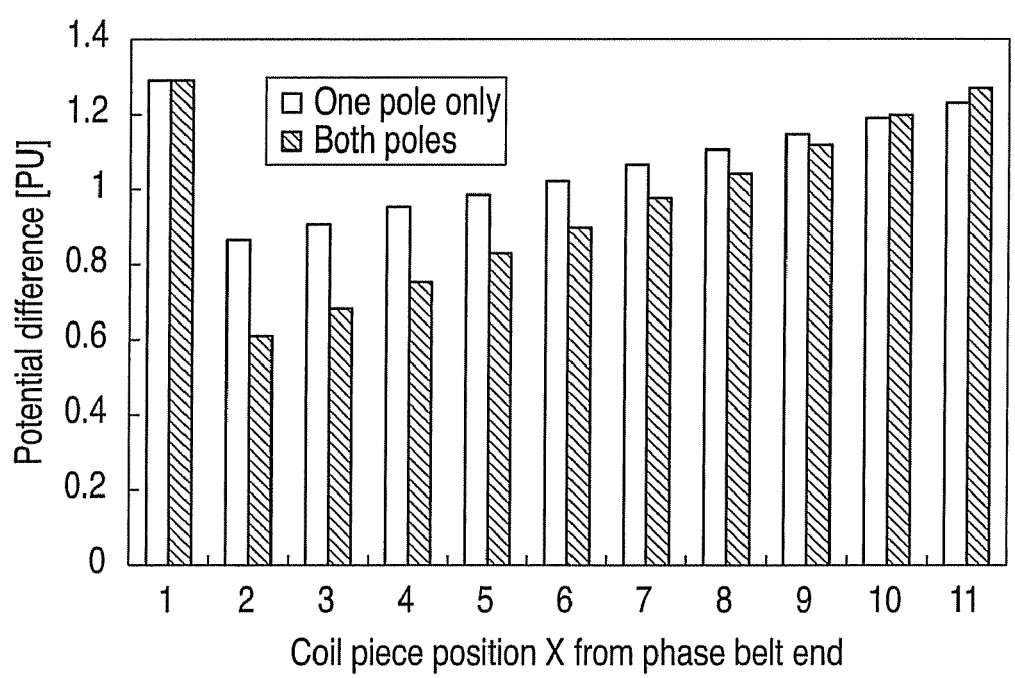
FIG. 26 is a graph showing the relationship between a slot position to place a coil piece connected to a lead-out portion and a maximum potential difference between coils in the rotating electrical machine of the ninth embodiment.

FIG. 26 shows the relationship between the slot position X to place a coil piece connected to a lead portion and a maximum potential difference between coil pieces, in the 2-pole 3-phase 66-slot 1-parallel-circuit rotating electric machine described in the ninth embodiment. The white bar indicates that a lead-out connection conductor is connected to coil pieces other than those at the phase belt end, only in the first phase belt, and the hatched bar indicates that a lead-out connection conductor is connected to coil pieces other than those at the phase belt end, in both first and second phase belts. In the drawing, X=1 indicates a maximum potential difference between coil pieces in conventional examples. X≧2 indicates that as X is increased, a maximum potential difference in the corresponding armature winding is increased.

In the ninth embodiment, as the number of series coils per one phase is 11, X=6 corresponds to the center of a phase belt. Therefore, $3 \leq X \leq 6$ is desirable to reduce a potential difference between coil pieces, while reducing the interference between the coil piece and lead-out connection conductor at a phase belt end.

Modification 3 of Embodiment 9

Figure 27:
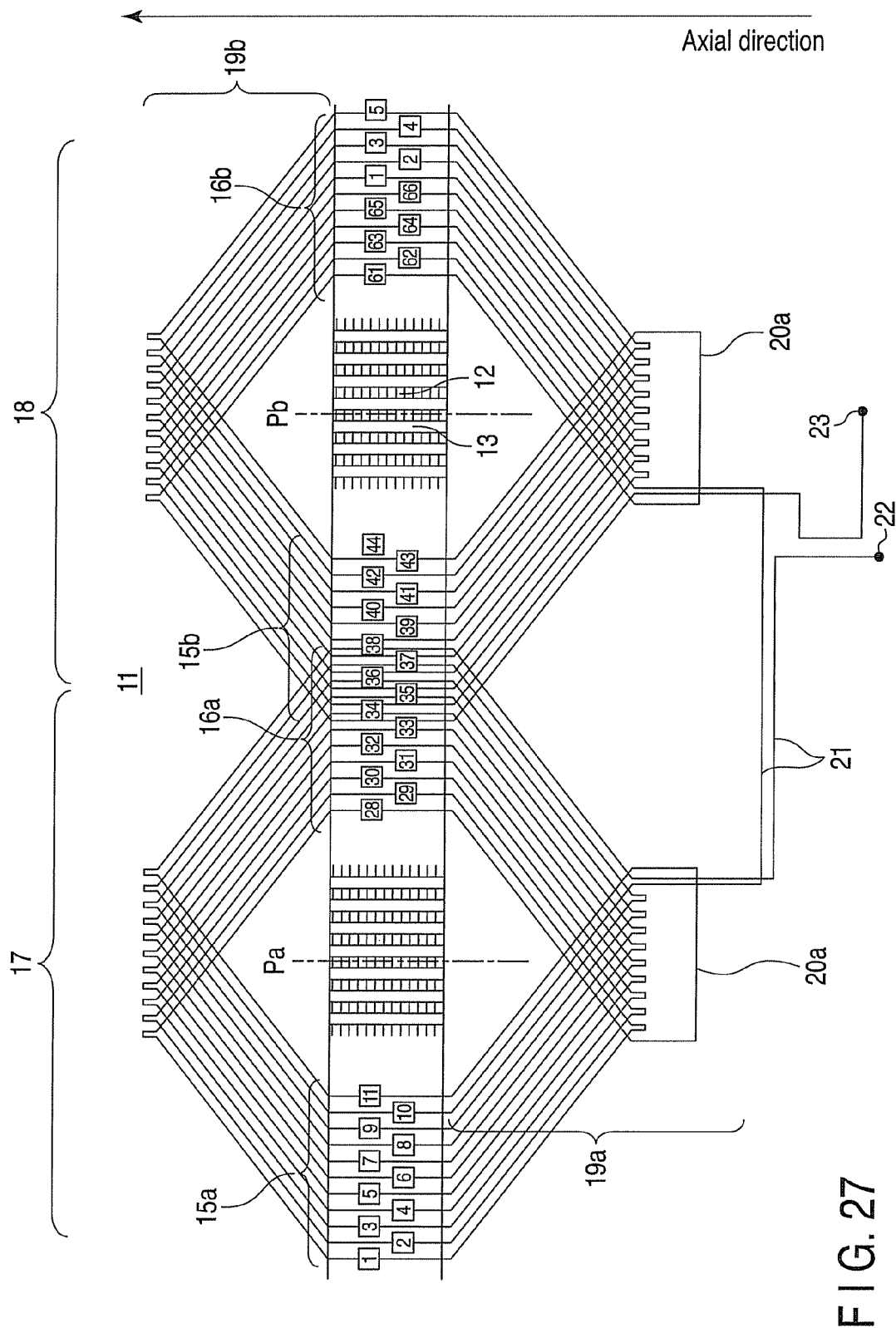
FIG. 27 is a developed perspective view of one phase of a third modification 3 of the armature winding in the ninth embodiment.

FIG. 27 is a developed perspective view of one phase of a 2-pole 3-phase 1-parallel-circuit 66-slot armature winding as a modification 3 of the ninth embodiment.

In the modification 3, the coil pitch at the connection side coil end is 28, one higher than the winding pitch, and the coil pitch at the counter-connection side coil end is 27, equivalent to the winding pitch.

In the ninth embodiment and modifications 1 and 2 of the ninth embodiment, coil pieces are connected in ascending numeric order in the first phase belt, but in modification 3, coil pieces are connected in descending numeric order in the first phase belt.

As shown in FIG. 27, at the connection side coil end 19a of the first phase belt 17, the $10^{th}$ upper coil piece 15a that is second from the phase belt end close to the phase belt center is connected to the lead-out connection conductor 21 connected to the output terminal 22, and sequentially wound to the $37^{th}$ lower coil piece, $9^{th}$ upper coil piece, and $36^{th}$ lower coil piece with the above coil pitch, and connected to the $28^{th}$ lower coil piece at the phase belt end, and further connected to the $11^{th}$ upper coil piece at the other phase belt end by the connection jumper wire 20a equivalent to 11 coil pitches. Then, the coil piece is connected to the $38^{th}$ lower coil piece, and the $38^{th}$ lower coil piece is connected to the $62^{nd}$ lower coil piece of the second phase belt 18 by the lead-out connection conductor 21 connecting the phase belts.

In the second phase belt 18, coil pieces are wound symmetrical to the first phase belt 17 and magnetic pole center, and sequentially connected to the $62^{nd}$ lower coil piece, $35^{th}$ upper coil piece, and $63^{rd}$ lower coil piece. The $44^{th}$ upper coil piece is connected to the $61^{st}$ lower coil piece by the connection side jumper wire 20a equivalent to 11 coil pitches, and the $34^{th}$ upper coil piece is connected to the neutral terminal 23 through the lead-out connection conductor 21.

As for the potential difference between adjacent coil pieces, regarding the coil pieces at the phase belt end shown in FIG. 27, the potential of the $1^{st}$ upper coil piece is 13/22 [PU] at the connection side end, and the potential of the not-shown adjacent $66^{th}$ upper coil piece is 1/22 [PU]. The potential difference between the $1^{st}$ upper coil piece and $66^{th}$ upper coil piece is 0.615 [PU] considering a phase difference.

Further, the potential of the $11^{th}$ upper coil piece at the connection side end is 12/22 [PU], and that of the not-shown adjacent $12^{th}$ upper coil piece is 0 [PU]. Therefore, the potential difference between the $11^{th}$ upper coil piece and $12^{th}$ upper coil piece is 0.546 [PU] considering a phase difference.

In the winding of modification 3, the potential of the $5^{th}$ lower coil piece at the connection side end is 2/22 [PU], and the adjacent not-shown $6^{th}$ lower coil piece is 13/22 [PU]. Therefore, the potential difference between the $1^{st}$ upper coil piece and $66^{th}$ upper coil piece is 0.641 [PU] considering a phase difference.

The potential difference between coil pieces in the same phase is one of 0.455 [PU] and 0.045 [PU]. Finally, in the armature winding of this modification, a maximum potential difference between adjacent coil pieces is 0.641 [PU], the value between coils of different phases, which is smaller than 1.289 [PU] of conventional examples. Therefore corona discharge can be prevented, and a stable armature of a rotating electrical machine can be provided.

This modification is characterized in that a maximum potential difference between coil pieces appears in the lower coils.

Embodiment 10

Figure 28:
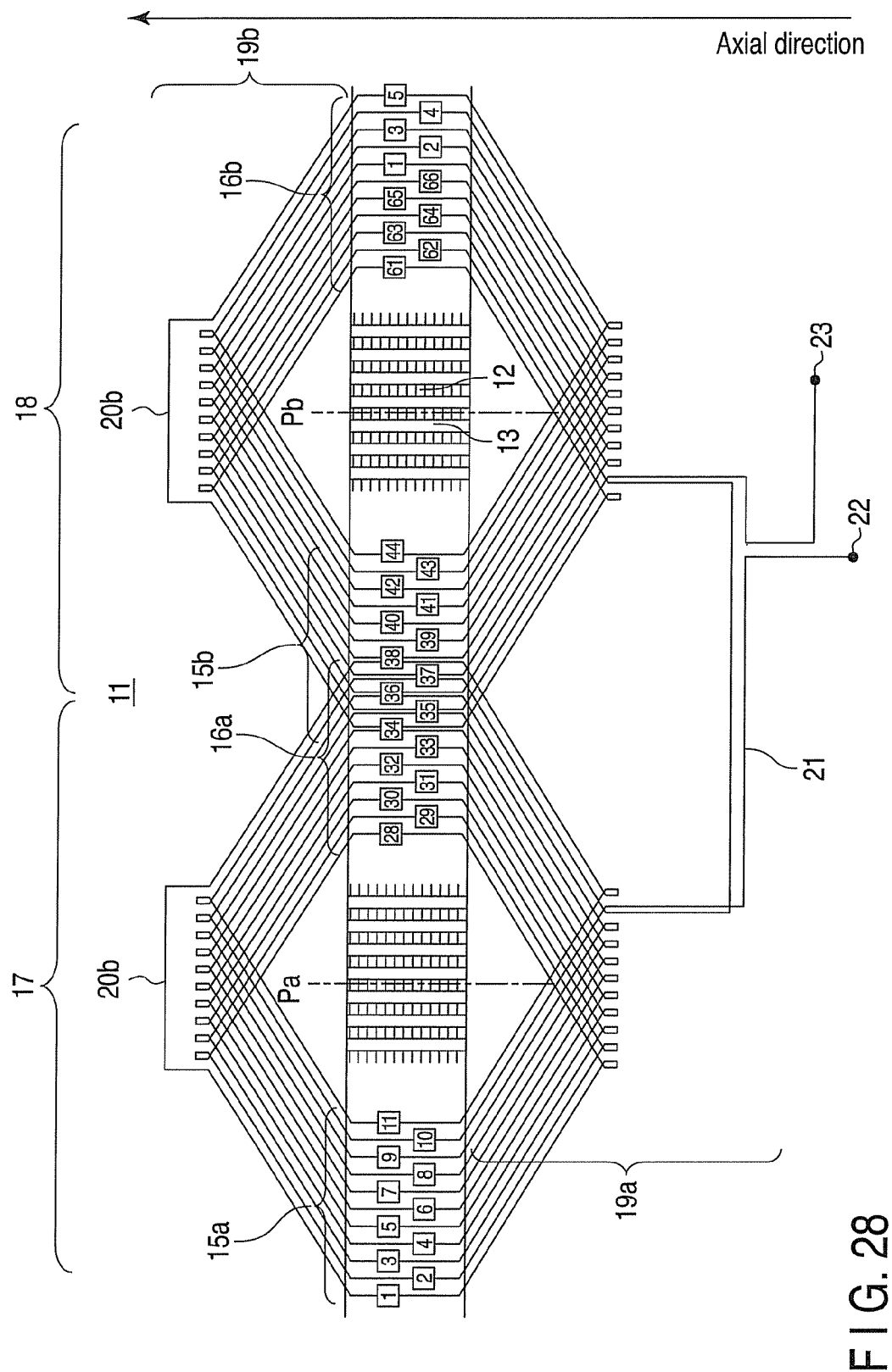
FIG. 28 is a developed perspective view of one phase of a 2-pole 3-phase 1-parallel-circuit armature winding, as a tenth embodiment of an armature winding of a rotating electrical machine according to the invention.

FIG. 28 is a developed perspective view of one phase of a 2-pole 3-phase 1-parallel-circuit (no parallel circuits) armature winding as a tenth embodiment of an armature winding of a rotating electrical machine according to the invention. The number of slots is 66.

In this embodiment, the coil pitch at the connection side coil end is 27, equivalent to the winding pitch, and the coil pitch at the counter-connection side coil end is 26, one less than the winding pitch.

As shown in FIG. 28, at the connection side coil end 19a of the first phase belt 17, the $10^{th}$ upper coil piece 15a that is second from the end close to the center of a phase belt is connected to the lead-out connection conductor 21 connected to the output terminal 22, and sequentially wound to the $36^{th}$ lower coil piece, $9^{th}$ upper coil piece, and $35^{th}$ lower coil piece with the above coil pitch, and connected to the $1^{st}$ upper coil piece at the phase belt end, and then connected to the $38^{th}$ lower coil piece at the other phase end by the counter-connection side jumper wire 20b equivalent to 11 coil pitches.

Then, the coil piece is connected to the $11^{th}$ upper coil piece, and $37^{th}$ lower coil piece. The $37^{th}$ lower coil piece is connected to the $62^{nd}$ lower coil piece of the second phase belt 18 by the lead-out connection conductor 21 connecting the phase belts.

In the second phase belt 18, the coil pieces are wound symmetrical to the first phase belt 17 and magnetic pole center, and the $62^{nd}$ lower coil piece, $36^{th}$ upper coil piece, and $63^{rd}$ lower coil piece are sequentially connected. The $5^{th}$ lower coil piece is connected to the $34^{th}$ upper coil piece by the counter-connection side jumper wire 20b equivalent to 11 coil pitches, and connected to the $61^{st}$ lower coil piece and $35^{th}$ upper coil piece, and the $35^{th}$ upper coil piece is connected to the neutral terminal 23 through the lead-out connection conductor 21.

As for the potential difference between adjacent coil pieces, regarding the coil pieces at the phase belt end shown in FIG. 28, the potential of the first upper coil piece is 13/22 [PU] at the connection side end, and the potential of the not-shown adjacent $66^{th}$ upper coil piece is 2/22 [PU]. The potential difference between the $1^{st}$ upper coil piece and $66^{th}$ upper coil piece is 0.642 [PU] considering a phase difference.

Further, the potential of the $5^{th}$ lower coil piece at the connection side end is 2/22 [PU], and the not-shown adjacent $6^{th}$ lower coil piece is 13/22 [PU]. Therefore, the potential difference between the $5^{th}$ lower coil piece and $6^{th}$ lower coil piece is 0.642 [PU] considering a phase difference, which is a maximum potential difference between coil pieces in this embodiment.

As described above, in the armature winding of the tenth embodiment, a maximum potential difference between adjacent coils is 0.642 [PU], the value between coil pieces of different phases, which is smaller than 1.289 [PU] of conventional examples. Further, as a jumper wire connecting coil pieces in a phase belt can be placed in the counter-connection side, the number of connection rings in a connecting part can be decreased, and the interference between the connection conductors in the lead-out portion can be reduced. Therefore, it is possible to prevent generation of corona discharge, and solve such problems as an electromagnetic force between currents flowing in conductors, an increase in eddy-current loss in adjacent conductors caused by the electromagnetic force between the currents flowing in the conductors or the current flowing in the conductors, deterioration in the insulating tape wound around the conductor, and insufficient insulation caused thereby. Therefore, a stable armature of a rotating electrical machine can be provided.

Modification of Embodiment 10

Figure 29:
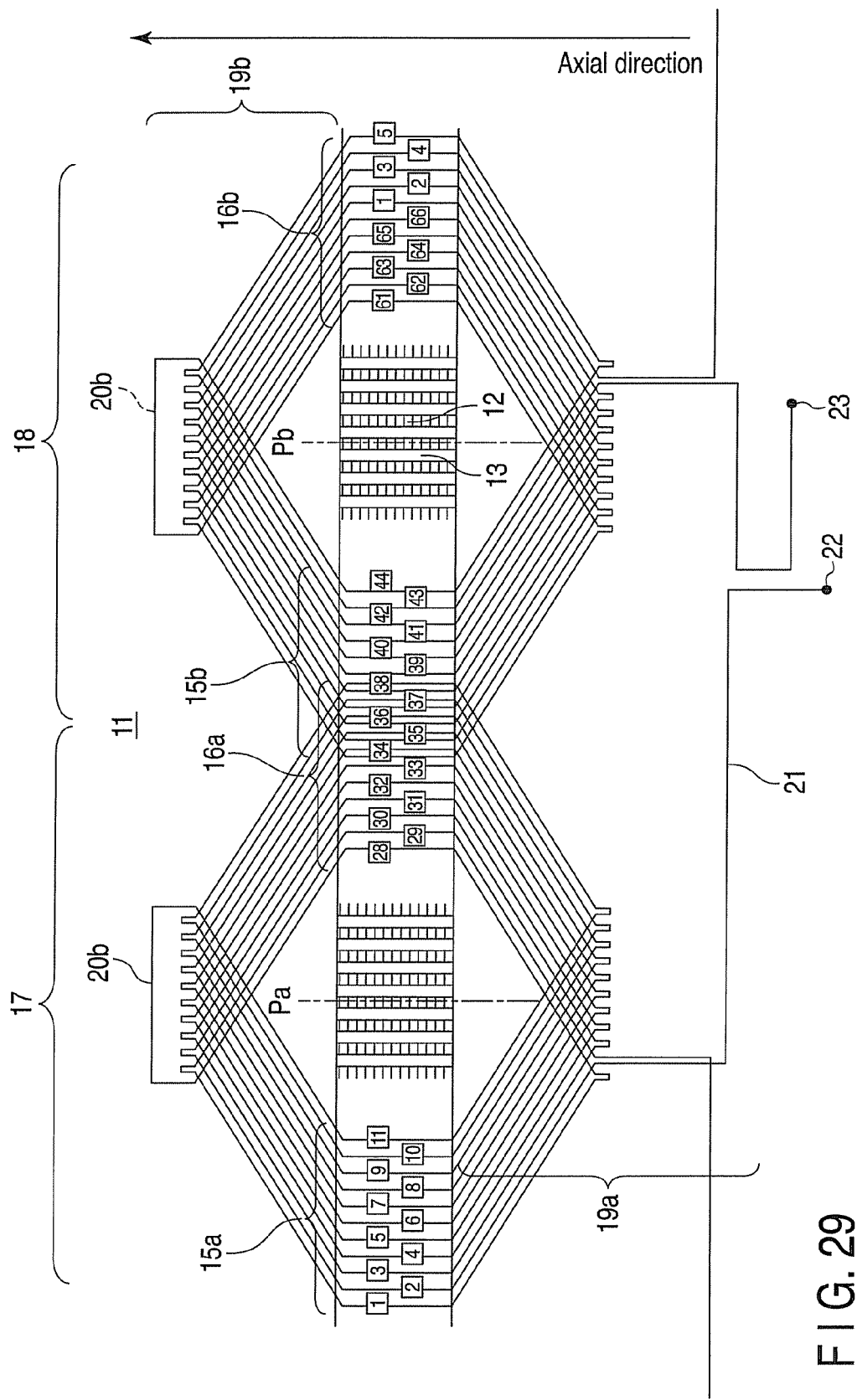
FIG. 29 is a developed perspective view of one phase of a modification of the armature winding in the tenth embodiment.

FIG. 29 is a developed perspective view of one phase of a 2-pole 3-phase 1-parallel-circuit 66-slot armature winding as a modification of the tenth embodiment. The number of slots is 66.

In this modification, the coil pitch at the connection side coil end is 27, equivalent to the winding pitch, and the coil pitch at the counter-connection side coil end is 28, one larger than the winding pitch.

As shown in FIG. 29, at the connection side coil end 19a of the first phase belt 17, the $2^{nd}$ upper coil piece 15a that is second from the phase belt end is connected to the lead-out connection conductor 21 connected to the output terminal 22, and sequentially $3^{rd}$ upper coil piece, and $30^{th}$ lower coil piece with the above coil pitch, and connected to the $11^{th}$ upper coil piece at the phase belt end, and further connected to the $28^{th}$ lower coil piece at the other phase end by the counter-connection side jumper wire 20b equivalent to 11 coil pitches. Then, the coil piece is connected to the $1^{st}$ upper coil piece and $29^{th}$ lower coil piece. The $29^{th}$ lower coil piece is connected to the $4^{th}$ lower coil piece of the second phase belt 18 by the lead-out connection conductor 21 connecting the phase belts.

In the second phase belt 18, the coil pieces are wound symmetrical to the first phase belt 17 and magnetic pole center, and the $4^{th}$ lower coil piece, $42^{nd}$ upper coil piece, and $3^{rd}$ lower coil piece are sequentially connected. The $61^{st}$ lower coil piece is connected to the $44^{th}$ upper coil piece by the counter-connection side jumper wire 20b equivalent to 11 coil pitches, and connected to the $5^{th}$ lower coil piece and $43^{rd}$ upper coil piece, and the $43^{rd}$ upper coil piece is connected to the neutral terminal 23 through the lead-out connection conductor 21.

As for the potential difference between adjacent coil pieces, regarding the coil pieces at the phase belt end shown in FIG. 29, the potential of the $11^{th}$ upper coil piece is 13/22 [PU] at the connection side end, and the potential of the not-shown adjacent $12^{th}$ upper coil piece is 2/22 [PU]. The potential difference between the $1^{st}$ upper coil piece and $66^{th}$ upper coil piece is 0.642 [PU] considering a phase difference. Further, the potential of the $38^{th}$ lower coil piece at the connection side end is 13/22 [PU], and the potential of the not-shown adjacent $39^{th}$ lower coil piece is 2/22 [PU]. Therefore, the potential difference between the $5^{th}$ lower coil piece and $6^{th}$ lower coil piece is 0.642 [PU] considering a phase difference, which is a maximum potential difference between coil pieces in this embodiment.

As described above, in the armature winding of this modification, a maximum potential difference between adjacent coils is 0.642 [PU], the value between coil pieces of different phases, which is smaller than 1.289 [PU] of conventional examples. Further, as a jumper wire connecting coil pieces in a phase belt can be placed in the counter-connection side, the number of connection rings in the connecting part can be decreased, and the interference between the connection conductors in a lead-out portion can be reduced. Therefore, it is possible to prevent generation of corona discharge, and solve such problems as an electromagnetic force between currents flowing in the conductors, an increase in eddy-current loss in adjacent conductors caused by currents flowing in the conductors, and poor insulation caused by deteriorated insulating tape wound around the conductor. Therefore, a reliable armature of a rotating electrical machine can be provided.

Embodiment 11

Figure 30:
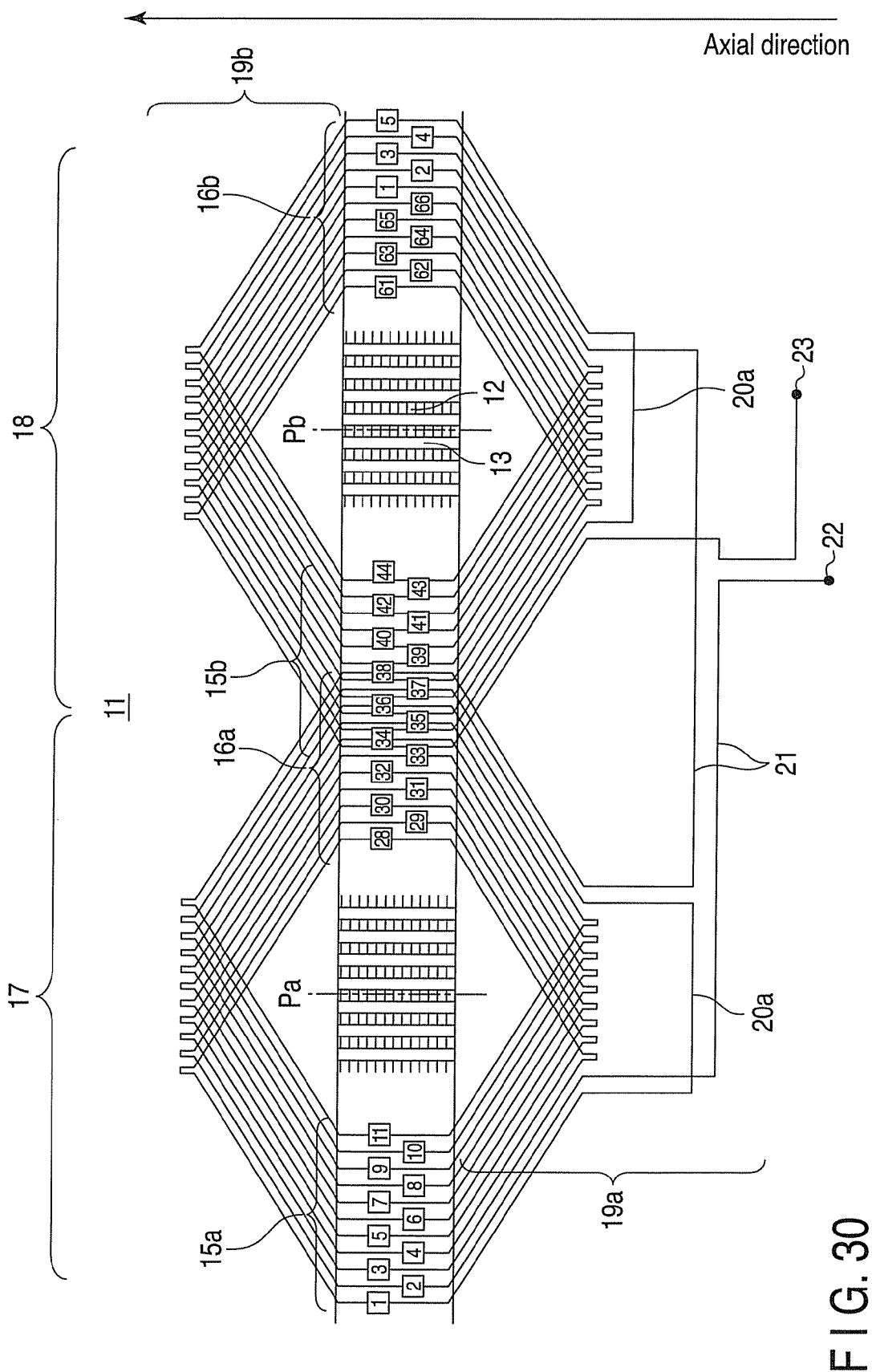
FIG. 30 is a developed perspective view of one phase of a 2-pole 3-phase 1-parallel-circuit armature winding, as an eleventh embodiment of an armature winding of a rotating electrical machine according to the invention.

FIG. 30 is a developed perspective view of one phase of a 2-pole 3-phase 1-parallel-circuit (no parallel circuits) armature winding as an eleventh embodiment of an armature winding of a rotating electrical machine according to the invention. The number of slots is 66.

In this embodiment, the coil pitch at the connection side coil end is 25, two less than the winding pitch, and the coil pitch at the counter-connection side coil end is 27, equal to the winging pitch.

As shown in FIG. 30, at the connection side coil end 19a of the first phase belt 17, the $2^{nd}$ upper coil piece 15a is connected to the lead-out connection conductor 21 connected to the output terminal 22, and sequentially wound to the $29^{th}$ lower coil piece, $4^{th}$ upper coil piece, and $31^{st}$ lower coil piece with the above coil pitch, and connected to the $37^{th}$ lower coil piece at the phase belt end, and further connected to the $1^{st}$ upper coil piece at the other phase end by the connection side jumper wire 20a equivalent to 11 coil pitches. Then, the coil piece is connected to the $28^{th}$ lower coil piece, and sequentially wound to the $28^{th}$ lower coil piece, $3^{rd}$ upper coil piece, and $30^{th}$ lower coil piece with the above coil pitch. The $38^{th}$ lower coil piece is connected to the $4^{th}$ lower coil piece of the second phase belt 18 by the lead-out connection conductor 21 connecting the phase belts.

In the second phase belt 18, coil pieces are wound symmetrical to the first phase belt 17 and magnetic pole center, and the $4^{th}$ lower coil piece, $43^{rd}$ upper coil piece, and $2^{nd}$ lower coil piece are sequentially connected. The $35^{th}$ upper coil piece is connected to the $5^{th}$ lower coil piece by the connection side jumper wire 20a equivalent to 11 coil pitches, and sequentially connected to the $44^{th}$ upper coil piece, $3^{rd}$ lower coil piece, $42^{nd}$ upper coil piece, and $1^{st}$ lower coil piece, and the $34^{th}$ upper coil piece is connected to the neutral terminal 23 through the lead-out connection conductor 21.

As for the potential difference between adjacent coil pieces, regarding the coil pieces at the phase belt end shown in FIG. 30, the potential of the first upper coil piece is 17/22 [PU] at the connection side end, and the potential of the not-shown adjacent $66^{th}$ upper coil piece is 5/22 [PU]. The potential difference between the $1^{st}$ upper coil piece and $66^{th}$ upper coil piece is 0.908 [PU] considering a phase difference, which is a maximum potential difference in this embodiment.

The potential different between coil pieces in the same phase is one of 0.273 [PU] and 0.227 [PU], which is larger than the value in the ninth and tenth embodiments, in which most of the potential difference between the same-phase coil pieces is 1/22=0.045 [PU]. However, the potential difference is not increased to larger than this value, and the value can be decreased to lower than those in the above examples, as a maximum potential difference between the same-phase coil pieces.

As described above, in the armature winding of this embodiment, a maximum potential difference between adjacent coils is 0.908 [PU], the value between coil pieces of different phases, which is smaller than 1.289 [PU] of conventional examples. Therefore, generation of corona discharge can be prevented, and a stable armature winding of a rotating electrical machine can be provided.

In the first to eleventh embodiments described above, as a measure for reducing the interference between connection conductors, X is set to meet $3 \leq X \leq N_{t2}$, assuming that the number of slots per one phase belt is $N_t$, $N_{t2}$ is a minimum integer not smaller than $N_t/2$, and a coil piece connected to a lead-out portion is the x-the coil piece counted from the phase belt end close to the magnetic pole center.

Embodiment 12

Figure 31:
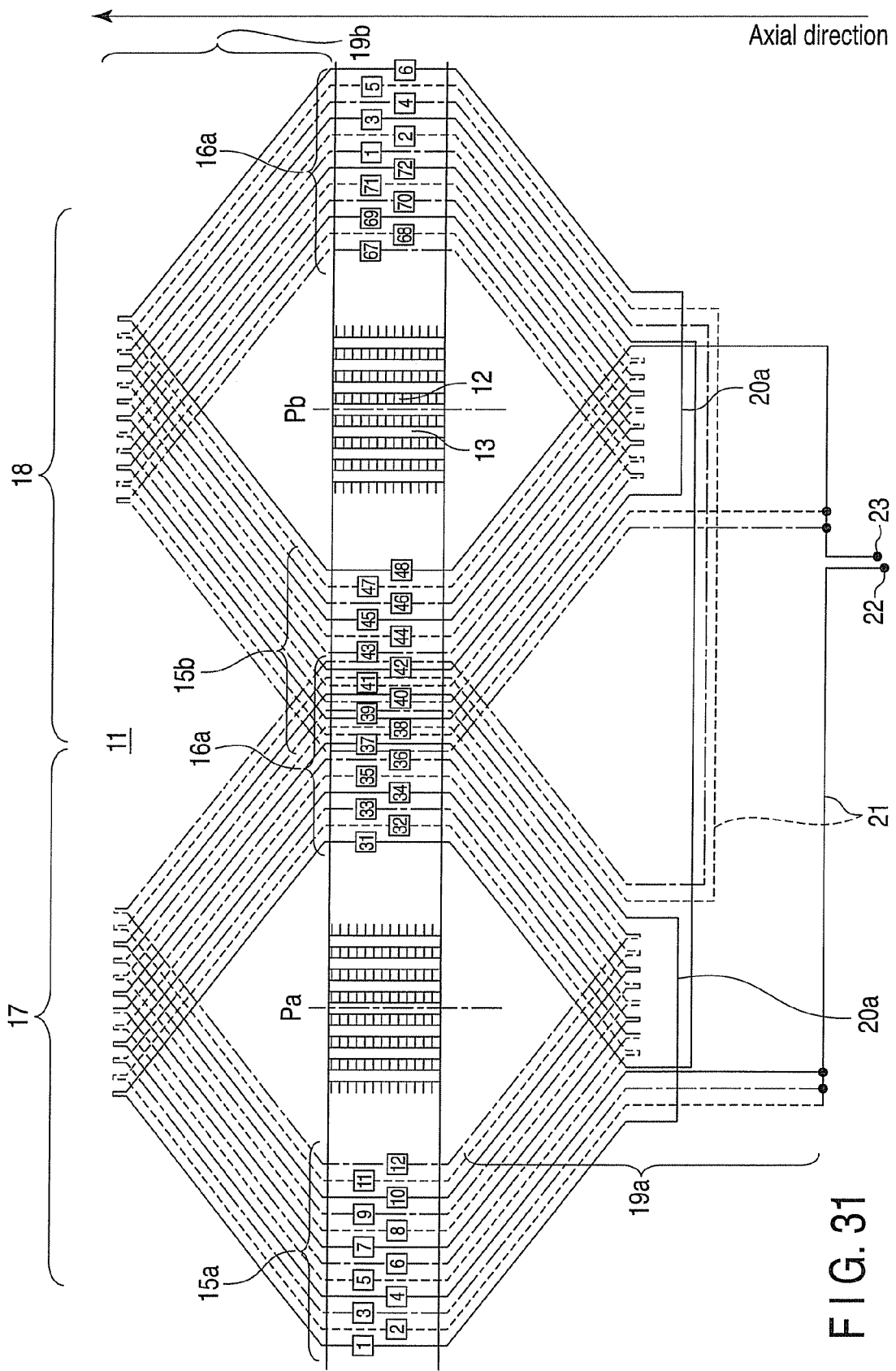
FIG. 31 is a developed perspective view of one phase of a 2-pole 3-phase armature winding, as a twelfth embodiment of an armature winding of a rotating electrical machine according to the invention.

FIG. 31 is a developed perspective view of one phase of a 2-pole 3-phase armature winding as a twelfth embodiment of an armature winding of a rotating electrical machine according to the invention, which is improved from the armature winding of the rotating electrical machine mentioned in the conventional example 3. The number of slots is 72, three parallel circuits are provided, and the number of slots occupied by each of the upper and lower coil pieces per one phase is 12.

In FIG. 31, the armature winding comprises three parallel circuits, 1 to 3, indicated by three kinds of line. The parallel circuits of twelve upper coil pieces 15a and lower coil pieces 16a consisting a first phase belt 17 are numbered 1, 2, 3, 1, 2, 3, 1, 2, 3, 1, 2, 3 sequentially from the left side. Similarly, the parallel circuits of twelve upper coil pieces 15b and lower coil pieces 16b consisting a second phase belt are numbered 3, 2, 1, 3, 2, 1, 3, 2, 1, 3, 2, 1 sequentially from the left side. Thereby, a voltage deviation in each parallel circuit (an absolute value of deviation from an average phase voltage) and a phase deviation in each parallel circuit (deviation of a phase angle of average phase voltage) are decreased.

In the first phase belt in this embodiment, the lead-out connection conductor 21 is connected to the second and third upper coil pieces close to the end of the phase belt in circuits 2 and 3, but the fourth upper coil piece is connected to the lead-out connection conductor 21 in circuit 1.

The $4^{th}$ upper coil piece is sequentially connected to the $34^{th}$ lower coil piece, $7^{th}$ upper coil piece, $37^{th}$ lower coil, $10^{th}$ upper coil piece, and $40^{th}$ lower coil piece. The $40^{th}$ lower coil is connected to the $1^{st}$ upper coil piece by the connection side jumper wire 20a. The connection conductor 21 connecting phase belts connected to the $31^{st}$ lower coil piece is connected to the $3^{rd}$ lower coil piece in the second phase belt.

In the second phase belt 18, in the circuit 1, the $3^{rd}$ lower coil piece, $45^{th}$ upper coil piece, $72^{nd}$ lower coil piece, $42^{nd}$ upper coil piece, $69^{th}$ lower coil piece, and $39^{th}$ upper coil piece are sequentially connected. The $39^{th}$ upper coil piece is connected to the $6^{th}$ lower coil piece by the connection side jumper wire 20a, and the connection conductor 21 connecting phase belts connected to the $36^{th}$ lower coil piece is connected to the neutral terminal 23.

As for the potential difference between adjacent coil pieces, regarding the coil pieces at the phase belt end shown in FIG. 31, the potential of the first upper coil piece is 5/8 [PU] at the connection side end, and the potential of the not-shown adjacent $72^{nd}$ upper coil piece is 0 [PU]. The potential difference between the $1^{st}$ upper coil piece and $72^{nd}$ upper coil piece is 5/8=0.625 [PU].

Further, the potential of the $12^{th}$ upper coil piece is 0 [PU] at the connection side end, and the potential of the not-shown adjacent $13^{th}$ upper coil piece is 5/8 [PU]. Therefore, the potential difference between the $1^{st}$ upper coil piece and $72^{nd}$ upper coil piece is the same as 5/8=0.625 [PU].

The above values are a maximum potential difference between coil pieces in this embodiment, which is reduced to about half of the maximum potential difference of 1.231 [PU] in the conventional example 3.

Embodiment 13

Figure 32:
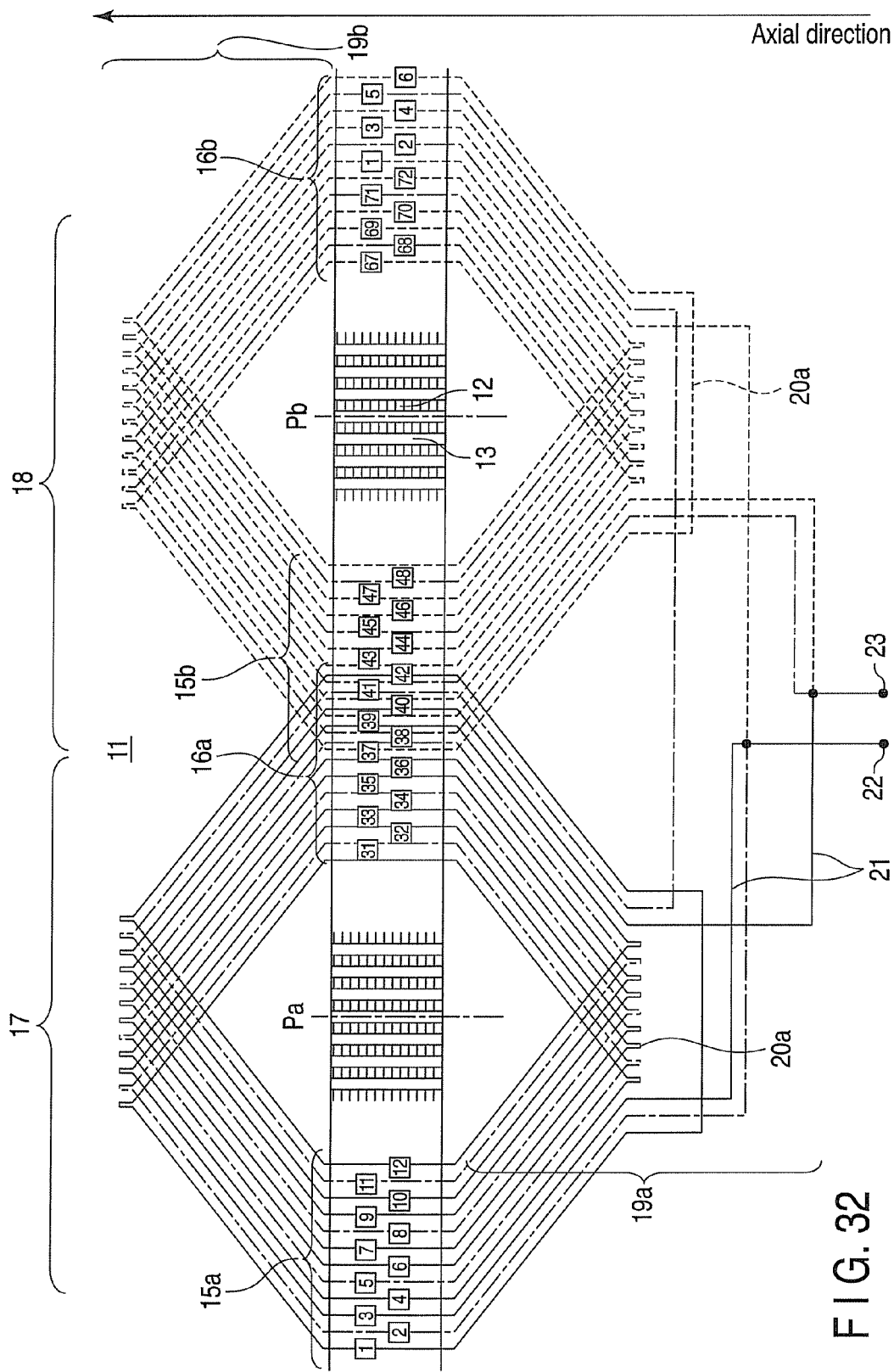
FIG. 32 is a developed perspective view of one phase of a 2-pole 3-phase armature winding, as a thirteenth embodiment of an armature winding of a rotating electrical machine according to the invention.

FIG. 32 is a developed perspective view of one phase of a 2-pole 3-phase armature winding as a thirteenth embodiment of an armature winding of a rotating electrical machine according to the invention, which is improved from the armature winding of the rotating electrical machine described in conventional example 4. The number of slots is 72, three parallel circuits are provided, and the number of slots occupied by each of the upper and lower coil pieces per one phase is 12.

In FIG. 32, the armature winding comprises three parallel circuits, 1 to 3, indicated by three kinds of line. The parallel circuits of twelve upper coil pieces 15a and lower coil pieces 16a forming a first phase belt 17 are numbered 1, 2, 1, 1, 2, 1, 1, 2, 1, 1, 2, 1 sequentially from the left side. Similarly, the parallel circuits of twelve upper coil pieces 15b and lower coil pieces 16b consisting a second phase belt are numbered 3, 2, 3, 3, 2, 3, 3, 2, 3, 3, 2, 3 sequentially from the left side. Thereby, a voltage deviation in each parallel circuit (an absolute value of deviation from an average phase voltage) and a phase deviation in each parallel circuit (deviation of a phase angle of average phase voltage) are decreased.

In this embodiment, in a circuit 2, coil pieces are connected as in the conventional example 4, and the lead-out ends of the first phase 17 and second phase 18 are connected by the lead-out connection conductor 21.

In the first phase belt in this embodiment, in the circuit 1, the $3^{rd}$ upper coil piece is connected to the lead-out connection conductor 21. The $3^{rd}$ upper coil piece is sequentially connected to the $33^{rd}$ lower coil $9^{th}$ piece, $6^{th}$ upper coil piece, $36^{th}$ lower coil piece, upper coil piece, $39^{th}$ lower coil piece, and $12^{th}$ upper coil piece. The $42^{nd}$ lower coil piece is connected to the $1^{st}$ upper coil piece by the connection side jumper wire 20a, and further connected to the $31^{st}$ lower coil piece, and sequentially connected to the $4^{th}$ upper coil piece, $34^{th}$ lower coil piece, $7^{th}$ upper coil piece, $37^{th}$ lower coil piece, $10^{th}$ upper coil piece, and $40^{th}$ lower coil piece. The $40^{th}$ lower coil piece is connected to the neutral terminal 23 by the connection conductor 21 connecting the phase belts.

In the second phase belt 18, in a circuit 3, coil pieces are connected as in the circuit 1, and the $4^{th}$ lower coil piece is connected to the lead-out connection conductor 21. The $4^{th}$ lower coil piece is sequentially connected to the $46^{th}$ upper coil piece, $1^{st}$ lower coil piece, $43^{rd}$ upper coil piece, $70^{th}$ lower coil piece, $40^{th}$ upper coil piece, and $67^{th}$ lower coil piece. The $37^{th}$ upper coil piece is connected to the $6^{th}$ lower coil piece by the connection side jumper wire 20a, and further connected to the $48^{th}$ upper coil piece, and sequentially connected to the $3^{rd}$ lower coil piece, $45^{th}$ upper coil piece, $72^{nd}$ lower coil piece, $42^{nd}$ upper coil piece, $69^{th}$ lower coil piece, and $39^{th}$ upper coil piece. The $39^{th}$ upper coil piece is connected to the neutral terminal 23 by the connection conductor 21 connecting the phase belts.

As for the potential difference between adjacent coil pieces, regarding the coil pieces at the phase belt end shown in FIG. 32, the potential of the $12^{th}$ upper coil piece is 5/8 [PU] at the connection side end, and the potential of the not-shown adjacent $13^{th}$ upper coil piece is 4/8 [PU]. The potential difference between the $12^{th}$ upper coil piece and $13^{th}$ upper coil piece is 0.976 [PU].

Further, the potential of the $42^{nd}$ lower coil piece is 4/8 [PU] at the connection side end, and the potential of the not-shown adjacent $43^{rd}$ lower coil piece is 5/8 [PU]. Therefore, the potential difference between the $42^{nd}$ lower coil piece and $43^{rd}$ lower coil piece is the same 0.976 [PU].

The above values are a maximum potential difference between coil pieces in this embodiment, which is greatly reduced from the maximum potential difference of 1.625 [PU] of the conventional example 4.

The invention is not limited to the embodiments described herein and shown in the drawings. The invention may be embodied in various other forms without departing from the essential characteristics. The embodiments may be appropriately combined. In such a case, the effects of combination may be obtained. Further, the embodiments described herein include various steps of the invention, and the invention may be extracted in various combined forms of the constituent elements disclosed herein. For example, when the invention is extracted by omitting some constituent element from all elements disclosed in the embodiments, the omitted parts may be appropriately compensated by well-known common techniques when the extracted invention is embodied.

Further, by applying any one of the armature windings of the embodiments described herein to an air-cooled rotating electrical machine, the winding and armature core can be effectively cooled by air.

What is claimed is:

1. A 3-phase 2-layer armature winding of a rotating electrical machine, comprising:
    upper coil pieces and lower coil pieces housed in two layers in a plurality of slots provided in a armature core, the upper coil pieces and lower coil pieces being sequentially connected in series at a connection side coil end and a counter-connection side coil end, forming one and the same phase, each phase belt of the winding having n-th parallel circuits (n is an integer larger than 1), and an output terminal lead-out connection conductor connected to an output terminal and a neutral terminal lead-out connection conductor connected to a neutral terminal being connected to the coil pieces at the connection side coil end of said each phase belt,
    wherein the lead-out connection conductor connected to the output terminal is connected to a coil piece positioned at least farther than a first coil piece inside the phase belt counted from the end of said each phase belt, and a coil piece positioned at the end of the phase belt is connected to a coil piece positioned at least farther than the n-th (n is an integer larger than 1) inside the phase belt counted from the other end of the phase belt in the same parallel circuit, by a jumper wire.

2. The armature winding of a rotating electrical machine according to claim 1, wherein the number of parallel circuits in each phase belt of the winding is less than the number of poles.

3. The armature winding of a rotating electrical machine according to claim 2, wherein the number of parallel circuits in each phase belt of the winding is equal to the number of poles.

4. The armature winding of a rotating electrical machine according to claim 2, wherein the number of parallel circuits in each phase belt of the winding is less than the number of poles.

5. The armature winding of a rotating electrical machine according to claim 1, wherein the number of parallel circuits in each phase belt of the winding is 1.5 times higher than the number of poles.

6. The armature winding of a rotating electrical machine according to claim 3, wherein when the number of slots per one phase belt is $N_t$, and the coil piece connected to the lead-out portion is X-th counted from the phase belt end close to the magnetic pole center, X satisfies $3X(X-1)<N_t^2-2N_t$.

7. The armature winding of a rotating electrical machine according to claim 3, wherein a coil pitch at the connection side coil end is one higher than a winding pitch, and a coil pitch at the counter-connection side coil end is equal to the winding pitch.

8. The armature winding of a rotating electrical machine according to claim 3, wherein a coil pitch at the connection side coil end is equal to a winding pitch, and a coil pitch at the counter-connection side coil end is one less than the winding pitch.

9. The armature winding of a rotating electrical machine according to claim 3, wherein a coil pitch at the connection side coil end is two less than a winding pitch, and a coil pitch at the counter-connection side coil end is equal to the winding pitch.

10. The armature winding of a rotating electrical machine according to claim 9, wherein the number of series coils per one phase of the winding is an odd number, and the jumper wire in a phase connects between a coil piece positioned at one phase belt end and a coil piece positioned at the second from the other phase belt.

11. The armature winding of a rotating electrical machine according to claim 9, wherein the number of series coils per one phase of the winding is an even number, and the jumper wire in a phase connects between a coil piece positioned at one phase belt end and a coil piece positioned at the other phase belt end.

12. The armature winding of a rotating electrical machine according to claim 9, wherein:
    the number of series coils per one phase of the winding is an odd number, and the jumper wire in a phase connects between a coil piece positioned at one phase belt end and a coil piece positioned at the other phase belt, and
    a jumper wire equivalent to one coil pitch is provided at one position at the connection side coil end, in at least one phase belt in one phase.

13. The armature winding of a rotating electrical machine according to claim 9, wherein:
    the number of series coils per one phase of the winding is an even number,
    the jumper wire in a phase belt connects between a coil piece positioned at one end of a phase belt and a coil piece positioned at the second from the other end of a phase belt, and
    a jumper wire equivalent to one coil pitch is provided at two positions at the connection side coil end, in at least one phase belt in one phase.

14. The armature winding of a rotating electrical machine according to claim 3, wherein a coil pitch at the connection side coil end is one less than a winding pitch, and a coil pitch at the counter-connection side coil end is one higher than the winding pitch.

15. The armature winding of a rotating electrical machine according to claim 9, wherein:
    the number of series coils per one phase of the winding is an odd number,
    in one phase belt in one phase, the jumper wire in a phase connects between a coil piece positioned at one phase belt end and a coil piece positioned at the second from the other phase belt end, and one jumper wire equivalent to one coil pitch is provided at the connection side coil end and the counter-connection side coil end, and
    in the other phase belt in the phase, the jumper wire in a phase connects a coil piece positioned at one phase belt end to a coil piece positioned at the other phase belt end, and a jumper wire equivalent to one coil pitch is provided at one position at the connection side coil end, and a jumper wire equivalent to one coil pitch is provided at two positions at the counter-connection side coil end.

16. The armature winding of a rotating electrical machine according to claim 9, wherein:
the number of series coils per one phase of the winding is an even number,
the jumper wire in a phase connects between a coil piece positioned at one phase belt end and a coil piece positioned at the other phase belt end, and
one jumper wire equivalent to one coil pitch is provided at one position at the connection side coil end in each phase belt.

17. The armature winding of a rotating electrical machine according to claim 4, wherein:
the jumper wire in a phase connects a coil piece positioned at one phase belt end and a coil piece positioned at the other phase belt end, and
a coil pitch at the connection side coil end is one less than a winding pitch, and a coil pitch at the counter-connection side coil end is equal to the winding pitch.

18. The armature winding of a rotating electrical machine according to claim 4, wherein:
the jumper wire in a phase connects between a coil piece positioned at one phase belt end and a coil piece positioned at the other phase belt end, and
a coil pitch at the connection side coil end is one higher than a winding pitch.

19. The armature winding of a rotating electrical machine according to claim 4, wherein:
the jumper wire in a phase connects between a coil piece positioned at one phase belt end and a coil piece positioned at the other phase belt end, and
a coil pitch at the connection side coil end is equal to a winding pitch, and a coil pitch at the counter-connection side coil end is one less than the winding pitch.

20. The armature winding of a rotating electrical machine according to claim 4, wherein:
the jumper wire in a phase connects between a coil piece positioned at one phase belt end and a coil piece positioned at the other phase belt end, and
a coil pitch at the connection side coil end is equal to a winding pitch, and a coil pitch at the counter-connection side coil end is one higher than the winding pitch.

21. The armature winding of a rotating electrical machine according to claim 4, wherein:
the jumper wire in a phase connects between a coil piece positioned at one phase belt end and a coil piece positioned at the other phase belt end, and
a coil pitch at the connection side coil end is two less than a winding pitch, and a coil pitch at the counter-connection side coil end is one higher than the winding pitch.

22. The armature winding of a rotating electrical machine according to claim 1, wherein:
when the number of slots per one phase belt is $N_t$, $N_{t2}$ is a minimum integer not smaller than $N_t/2$, and the coil piece connected to the lead-out portion is X-th counted from the phase belt end close to the magnetic pole center, X satisfies $3X \leq N_{t2}$.

23. The armature winding of a rotating electrical machine according to claim 1, wherein the jumper wire in a phase belt is provided at the counter-connection side coil end.

24. The armature winding of a rotating electrical machine according to claim 6, wherein:
in a winding forming one phase belt in each phase, the output terminal lead-out connection conductor is connected to upper coil pieces other than those at both ends of each phase belt,
in the winding, upper coil pieces are sequentially wound toward the magnetic pole, so that a coil pitch at the connection side coil end is one less than a winding pitch, and a coil pitch at the counter-connection side coil end is equal to the winding pitch,
the jumper wire in a phase belt is connected between a lower coil piece positioned at the phase belt end far from the magnetic pole center and an upper coil piece positioned at the phase belt end far from the magnetic pole center, at the connection side coil end,
the lower coil piece at the phase belt end close to the magnetic pole center, which is connected to the upper coil piece connected to the jumper wire with the above coil pitch, is connected to the neutral terminal lead-out connection conductor, and
in a winding forming the other phase belt in each phase, the output terminal lead-out connection conductor is connected to lower coil pieces other than those at both ends of each phase belt,
in the winding, lower coil pieces are sequentially wound toward the magnetic pole center, so that a coil pitch at the connection side coil end is one less than the winding pitch, and a coil pitch at the counter-connection side coil end is equal to the winding pitch,
the jumper wire in a phase belt is connected between an upper coil piece positioned at the phase belt end far from the magnetic pole center and a lower coil piece positioned at the phase belt end far from the magnetic pole center, at the connection side coil end, and
the upper coil piece at the phase belt end close to the magnetic pole center, which is connected to the lower coil piece connected to the jumper wire with the above coil pitch, is connected to the neutral terminal lead-out connection conductor.

25. The armature winding of a rotating electrical machine according to claim 7, wherein:
in a winding forming one phase belt in each phase, the output terminal lead-out connection conductor is connected to upper coil pieces other than those at both ends of each phase belt,
in the winding, upper coil pieces are sequentially wound away from the magnetic pole center, so that a coil pitch at the connection side coil end is one higher than a winding pitch, and a coil pitch at the counter-connection side coil end is equal to the winding pitch,
the jumper wire in a phase belt is connected between a lower coil piece positioned at the phase belt end close to the magnetic pole center and an upper coil piece positioned at the phase belt end close to the magnetic pole center, at the connection side coil end,
lower coil pieces and upper coil pieces are sequentially wound from the upper coil piece connected to the jumper wire, with the above coil pitch, and the upper coil piece is connected to the neutral terminal lead-out connection conductor, and
in a winding forming the other phase belt in each phase, the output terminal lead-out connection conductor is connected to lower coil pieces other than those at both ends of each phase belt,
in the winding, upper coil pieces are sequentially wound away from the magnetic pole center, so that a coil pitch at the connection side coil end is one higher than the winding pitch, and a coil pitch at the counter-connection side coil end is equal to the winding pitch,
the jumper wire in a phase belt is connected between a lower coil piece positioned at the phase belt end close to the magnetic pole center and an upper coil piece positioned at the phase belt end close to the magnetic pole center, at the connection side coil end, and lower coil pieces and upper coil pieces are sequentially wound from the upper coil piece connected to the jumper wire, with the above coil pitch, and the upper coil piece is connected to the neutral terminal lead-out connection conductor.

26. The armature winding of a rotating electrical machine according to claim 7, wherein:
in a winding forming one phase belt in each phase, the output terminal lead-out connection conductor is connected to upper coil pieces other than those at both ends of each phase belt,
in the winding, upper coils are sequentially wound away from the magnetic pole center, so that a coil pitch at the connection side coil end is equal to a winding pitch, and a coil pitch at the counter-connection side coil end is one less than the winding pitch,
the jumper wire in a phase belt is connected between an upper coil piece positioned at the phase belt end far from the magnetic pole center and a lower coil piece positioned at the phase belt end far from the magnetic pole center, at the counter-connection side coil end,
upper coil pieces and lower coil pieces are sequentially wound from the lower coil piece connected to the jumper wire, with the above coil pitch,
the lower coil piece is connected to the neutral terminal lead-out connection conductor, and
in a winding forming the other phase belt in each phase, the output terminal lead-out connection conductor is connected to lower coil pieces other than those at both ends of each phase belt,
in the winding, lower coil pieces are sequentially wound away from the magnetic pole with the above coil pitch,
the jumper wire in a phase belt is connected between a lower coil piece positioned at the phase belt end far from the magnetic pole center and an upper coil piece positioned at the phase belt end far from the magnetic pole center, at the counter-connection side coil end,
lower coil pieces and upper coil pieces are sequentially wound from the upper coil piece connected to the jumper wire, with the above coil pitch, and
the upper coil piece is connected to the neutral terminal lead-out connection conductor.

27. The armature winding of a rotating electrical machine according to claim 10, wherein:
in a winding forming one phase belt in each phase, the output terminal lead-out connection conductor is connected to upper coil pieces other than those at both ends of each phase belt,
in the winding, upper coil pieces are sequentially wound toward the magnetic pole center, with the above coil pitch,
the jumper wire in a phase belt is connected between a lower coil piece positioned at the second from the phase belt end far from the magnetic pole center and an upper coil piece positioned at the phase belt end far from the magnetic pole center, at the connection side coil end,
upper coil pieces are sequentially wound from the upper coil piece connected to the jumper wire toward the magnetic pole center, with the above coil pitch,
the lower coil piece at the phase belt end far from the magnetic pole center is connected to the neutral terminal lead-out connection conductor, and
in a winding forming the other phase belt in each phase, the output terminal lead-out connection conductor is connected to lower coil pieces other than those at both ends of each phase belt,
in the winding, lower coil pieces are sequentially wound toward the magnetic pole center with the above coil pitch,
the jumper wire in a phase belt is connected between an upper coil piece positioned at the second from a phase belt end far from the magnetic pole center and a lower coil piece positioned at the phase belt end far from the magnetic pole center, at the connection side coil end,
lower coil pieces are sequentially wound from the lower coil piece connected to the jumper wire toward the magnetic pole center, with the above coil pitch, and
the upper coil piece at the phase belt end far from the magnetic pole center is connected to the neutral terminal lead-out connection conductor.

28. The armature winding of a rotating electrical machine according to claim 11, wherein:
in a winding forming one phase belt in each phase, the output terminal lead-out connection conductor is connected to upper coil pieces other than those at both ends of each phase belt,
in the winding, upper coil pieces are sequentially wound toward the magnetic pole center with the above coil pitch,
the jumper wire in a phase belt is connected between a lower coil piece positioned at the phase belt end far from the magnetic pole center and an upper coil piece positioned at the phase belt end far from the magnetic pole center, at the connection side coil end,
upper coil pieces are sequentially wound from the upper coil piece connected to the jumper wire toward the magnetic pole center, with the above coil pitch,
a lower coil piece at the second from the phase belt far from the magnetic pole center is connected to the neutral terminal lead-out connection conductor, and
in a winding forming the other phase belt in each phase, the output terminal lead-out connection conductor is connected to lower coil pieces other than those at both ends of each phase belt,
in the winding, lower coil pieces are sequentially wound toward the magnetic pole center with the above coil pitch,
the jumper wire in a phase belt is connected between an upper coil piece positioned at the phase belt end far from the magnetic pole center and a lower coil piece positioned at the phase belt end far from the magnetic pole center, at the connection side coil end,
lower coil pieces are sequentially wound from the lower coil piece connected to the jumper wire toward the magnetic pole center, with the above coil pitch, and
the upper coil piece positioned at the second from a phase belt far from the magnetic pole center is connected to the neutral terminal lead-out connection conductor.

29. The armature winding of a rotating electrical machine according to claim 12, wherein:
in a winding forming one phase belt in each phase, the output terminal lead-out connection conductor is connected to upper coil pieces other than those at both ends of each phase belt,
in the winding, upper coil pieces are sequentially wound toward the magnetic pole center with the above coil pitch,
a jumper wire equivalent to one coil pitch in a phase belt is connected between a lower coil piece positioned at the second from a phase belt end far from the magnetic pole center and an upper coil piece positioned at the phase belt end close the magnetic pole center, at the connection side coil end, the upper coil piece connected to the jumper wire is connected to a lower coil piece positioned at the phase belt end far from the magnetic pole center, the jumper wire in a phase belt is connected between the lower coil piece and an upper coil piece positioned at the phase belt end far from the magnetic pole center, at the connection side coil end, upper coil pieces are sequentially wound from the upper coil piece connected to the jumper wire toward the magnetic pole center, with the above coil pitch, the lower coil piece positioned at the third from the phase belt far from the magnetic pole center is connected to the neutral terminal lead-out connection conductor, and in a winding forming the other phase belt in each phase, the output terminal lead-out connection conductor is connected to lower coil pieces other than those at both ends of each phase belt, in the winding, lower coil pieces are sequentially wound toward the magnetic pole center with the above coil pitch, the jumper wire in a phase belt is connected between an upper coil piece positioned at the second from a phase belt end far from the magnetic pole center and a lower coil piece positioned at the phase belt end far from the magnetic pole center, at the connection side coil end, and lower coil pieces are sequentially wound from the lower coil piece connected to the jumper wire toward the magnetic pole center, with the above coil pitch, and an upper coil piece at the phase belt end far from the magnetic pole center is connected to the neutral terminal lead-out connection conductor.

30. The armature winding of a rotating electrical machine according to claim 13, wherein:

in a winding forming one phase belt in each phase, the output terminal lead-out connection conductor is connected to upper coil pieces other than those at both ends of each phase belt, in the winding, upper coil pieces are sequentially wound toward the magnetic pole center with the above coil pitch, a jumper wire equivalent to one coil pitch in a phase belt is connected between a lower coil piece and an upper coil piece at the connection side coil end in a phase belt, upper coil pieces are sequentially wound from the upper coil piece connected toward the magnetic pole center, with the above coil pitch, the jumper wire in a phase belt is connected between a lower coil piece positioned at the second from a phase belt end far from the magnetic pole center and an upper coil piece positioned at the phase belt end far from the magnetic pole center, at the connection side coil end, upper coil pieces are sequentially wound from the upper coil piece connected to the jumper wire toward the magnetic pole center, with the above coil pitch, a jumper wire equivalent to one coil pitch in a phase belt is connected between a lower coil piece and an upper coil piece at the connection side coil end in a phase belt, upper coil pieces are sequentially wound from the upper coil piece connected to the jumper wire toward the magnetic pole center, with the above coil pitch, a lower coil piece at the phase belt end far from the magnetic pole center is connected to the neutral terminal lead-out connection conductor, and in a winding forming the other phase belt in each phase, the output terminal lead-out connection conductor is connected to lower coil pieces other than those at both ends of each phase belt, in the winding, lower coil pieces are sequentially wound toward the magnetic pole center with the above coil pitch, the jumper wire in a phase belt is connected between an upper coil piece positioned at the second from a phase belt end far from the magnetic pole center and a lower coil piece positioned at the phase belt end far from the magnetic pole center, at the connection side coil end, lower coil pieces are sequentially wound from the lower coil piece connected to the jumper wire toward the magnetic pole center, with the above coil pitch, and an upper coil piece at the phase belt end far from the magnetic pole center is connected to the neutral terminal lead-out connection conductor.

31. The armature winding of a rotating electrical machine according to claim 15, wherein:

in a winding forming one phase belt in each phase, the output terminal lead-out connection conductor is connected to upper coil pieces other than those at both ends of each phase belt, in the winding, upper coil pieces are sequentially wound toward the magnetic pole center with the above coil pitch, the jumper wire in a phase belt is connected between an upper coil piece positioned at the second from the phase belt end close to the magnetic pole center and a lower coil piece positioned at the phase belt end close to the magnetic pole center, at the counter-connection side coil end, a jumper wire equivalent to one coil in a phase belt is connected between the lower coil piece connected to the jumper wire in a phase belt and an upper coil piece positioned at the phase belt end far from the magnetic pole center, at the connection side coil end, upper coil pieces are sequentially wound from the upper coil piece connected to the jumper wire equivalent to one coil pitch, toward the magnetic pole center, with the above coil pitch, a jumper wire equivalent to one coil pitch in a phase belt is connected between an upper coil piece at the phase belt end close to the magnetic pole center and a lower coil piece at the phase belt end far from the magnetic pole center, at the counter-connection side coil end, the lower coil piece at the phase belt end is connected to the neutral terminal lead-out connection conductor, and in a winding forming the other phase belt in each phase, the output terminal lead-out connection conductor is connected to lower coil pieces other than those at both ends of each phase belt, a jumper wire equivalent to one coil pitch in a phase belt is connected between a lower coil end positioned at the second from the phase belt end far from the magnetic pole center and an upper coil piece positioned at the second from the phase belt end close to the magnetic pole center, at the counter-connection side coil end, lower coil pieces are sequentially wound from the second upper coil piece toward the magnetic pole center, with the above coil pitch, the jumper wire in a phase belt is connected between a lower coil piece positioned at the phase belt end close to the magnetic pole center and an upper coil piece positioned at the phase belt end close to the magnetic pole center, at the counter-connection side coil end, a jumper wire equivalent to one coil pitch in a phase belt is connected between an upper coil end at the phase belt end close to the magnetic pole center and a lower coil piece at the phase belt end far from the magnetic pole center, at the connection side coil end, a jumper wire equivalent to one coil pitch in a phase belt is connected between the lower coil piece and an upper coil end positioned at the third from the phase belt end close to the magnetic pole center, at the counter-connection side coil end, lower coil pieces are sequentially wound from the third upper coil piece toward the magnetic pole center, with the above coil pitch, and the upper coil piece at the phase belt end far from the magnetic pole center is connected to the neutral terminal lead-out connection conductor.

32. The armature winding of a rotating electrical machine according to claim 16, wherein:

in a winding forming one phase belt in each phase, the output terminal lead-out connection conductor is connected to upper coil pieces other than those at both ends of each phase belt, in the winding, the upper coil pieces are sequentially wound toward the magnetic pole center, with the above coil pitch, the jumper wire in a phase belt is connected between an upper coil piece positioned at the phase belt end close to the magnetic pole center and a lower coil piece positioned at the phase belt end close to the magnetic pole center, at the counter-connection side coil end, a jumper wire equivalent to one coil in a phase belt is connected between the lower coil piece positioned at the phase belt end close to the magnetic pole center and an upper coil piece positioned at the phase belt end far from the magnetic pole center, at the connection side coil end, upper coil pieces are sequentially wound from the upper coil piece toward the magnetic pole center, with the above coil pitch, a lower coil piece positioned at the phase belt end far from the magnetic pole center is connected to the neutral terminal lead-out connection conductor, and in a winding forming the other phase belt in each phase, the output terminal lead-out connection conductor is connected to lower coil pieces other than those at both ends of each phase belt, in the winding, the lower coil pieces are sequentially wound toward the magnetic pole center, with the above coil pitch, the jumper wire in a phase belt is connected between a lower coil piece positioned at the phase belt end close to the magnetic pole center and an upper coil piece positioned at the phase belt end close to the magnetic pole center, at the counter-connection side coil end, a jumper wire equivalent to one coil in a phase belt is connected between the upper coil piece positioned at the phase belt end close to the magnetic pole center and a lower coil piece positioned at the phase belt end far from the magnetic pole center, at the connection side coil end, lower coil pieces are sequentially wound from the lower coil piece toward the magnetic pole center, with the above coil pitch, and an upper coil piece positioned at the phase belt end far from the magnetic pole center is connected to the neutral terminal lead-out connection conductor.

33. The armature winding of a rotating electrical machine according to claim 17, wherein:

in a winding forming one phase belt in each phase, the output terminal lead-out connection conductor is connected to upper coil pieces other than those at both ends of each phase belt, in the winding, upper coil pieces are sequentially wound toward the magnetic pole center, with the above coil pitch, the jumper wire in a phase belt is connected between a lower coil piece positioned at the phase belt end far from the magnetic pole center and an upper coil piece positioned at the phase belt end far from the magnetic pole center, at the connection side coil end, the upper coil piece is connected to a lower coil piece with the above coil pitch, a lead-out connection conductor is connected between the lower coil piece positioned at the phase belt end close to the magnetic pole center and a lower coil piece positioned at the phase belt end far from the magnetic pole center in the other phase belt, lower coil pieces are sequentially wound from the lower coil piece toward the magnetic pole center, with the above coil pitch, and an upper coil piece positioned at the phase belt end far from the magnetic pole center is connected to the neutral terminal lead-out connection conductor.

34. The armature winding of a rotating electrical machine according to claim 33, wherein:

lower coil pieces other than those at both ends of each phase belt connected to the neutral terminal lead-out connection conductor is connected to a lead-out connection conductor connected to the other phase belt, lower coil pitches are sequentially wound from the lower coil piece toward the magnetic pole center, with the above coil pitch, the jumper wire in a phase belt is connected between an upper coil piece positioned at the phase belt end far from the magnetic pole center and a lower coil piece positioned at the phase belt end far from the magnetic pole center, at the connection side coil end, the lower coil piece is connected to an upper coil piece with the above coil pitch, and the upper coil piece is connected to the neutral terminal lead-out connection conductor.

35. The armature winding of a rotating electrical machine according to claim 18, wherein:

in a winding forming one phase belt in each phase, the output terminal lead-out connection conductor is connected to upper coil pieces other than those at both ends of each phase belt, in the winding, upper coil pieces are sequentially wound away from the magnetic pole center with the above coil pitch, the jumper wire in a phase belt is connected between a lower coil piece positioned at the phase belt end close to the magnetic pole center and an upper coil piece positioned at the phase belt end close to the magnetic pole center, at the connection side coil end, the upper coil piece is connected to a lower coil piece positioned far from the magnetic pole center with the above coil pitch, the lower coil piece is connected to lower coil pieces other than those at both ends of the other phase belt, lower coil pieces are sequentially wound from the lower coil piece away from the magnetic pole center, with the above coil pitch, the jumper wire in a phase belt is connected between an upper coil piece positioned at the phase belt end close to the magnetic pole center and a lower coil piece positioned at the phase belt end close to the magnetic pole center, at the connection side coil end, the lower coil piece is connected to an upper coil piece positioned far from the magnetic pole center, with the above coil pitch, and the upper coil piece is connected to the neutral terminal lead-out connection conductor.

36. The armature winding of a rotating electrical machine according to claim 19, wherein:

in a winding forming one phase belt in each phase, the output terminal lead-out connection conductor is connected to upper coil pieces other than those at both ends of each phase belt, in the winding, upper coil pieces are sequentially wound away from the magnetic pole center with the above coil pitch, the jumper wire in a phase belt is connected between an upper coil piece positioned at the phase belt end far from the magnetic pole center and a lower coil piece positioned at the phase belt end far from the magnetic pole center, at the counter-connection side coil end, upper coil pieces and lower coil pieces are connected from the lower coil piece with the above coil pitch, the lower coil piece is connected to lower coil pieces other than those at both ends of the other phase belt by a lead-out connection conductor, lower coil pieces are sequentially wound from the lower coil piece away from the magnetic pole center with the above coil pitch, the jumper wire in a phase belt is connected between a lower coil piece positioned at the phase belt end far from the magnetic pole center and an upper coil piece positioned at the phase belt end far from the magnetic pole center, at the counter-connection side coil end, lower coil pieces and upper coil pieces are sequentially connected from the upper coil piece with the above coil pitch, and the upper coil piece is connected to the neutral terminal lead-out connection conductor.

37. The armature winding of a rotating electrical machine according to claim 20, wherein:

in a winding forming one phase belt in each phase, the output terminal lead-out connection conductor is connected to upper coil pieces other than those at both ends of each phase belt, in the winding, upper coil pieces are sequentially wound away from the magnetic pole center with the above coil pitch, the jumper wire in a phase belt is connected between an upper coil piece positioned at the phase belt end close to the magnetic pole center and a lower coil piece positioned at the phase belt end close to the magnetic pole center, at the counter-connection side coil end, upper coil pieces and lower coil pieces are sequentially connected from the lower coil piece with the above coil pitch, the lower coil piece is connected to lower coil pieces other than those at both ends of the other phase belt by a lead-out connection conductor, lower coil pieces are sequentially wound from the lower coil piece toward the magnetic pole center with the above coil pitch, the jumper wire in a phase belt is connected between a lower coil piece positioned at the phase belt end close to the magnetic pole center and an upper coil piece positioned at the phase belt end close to the magnetic pole center, at the counter-connection side coil end, lower coil pieces and upper coil pieces are sequentially connected from the upper coil piece with the above coil pitch, and the upper coil piece is connected to the neutral terminal lead-out connection conductor.

38. The armature winding of a rotating electrical machine according to claim 21, wherein:

in a winding forming one phase belt in each phase, the output terminal lead-out connection conductor is connected to upper coil pieces other than those at both ends of each phase belt, in the winding, upper coil pieces are sequentially wound toward the magnetic pole center with the above coil pitch, the jumper wire in a phase belt is connected between a lower coil piece positioned at the second from the phase belt end far from the magnetic pole center and a lower coil piece positioned at the phase belt end far from the magnetic pole center, at the connection side coil end, the upper coil pieces are sequentially wound toward the magnetic pole center with the above coil pitch, a lower coil piece positioned at the phase belt far from the magnetic pole center is connected to lower coil pieces other than those at both ends of the other phase belt by a lead-out connection conductor, lower coil pieces are sequentially wound from the lower coil piece away from the magnetic pole center with the above coil pitch, the jumper wire in a phase belt is connected between an upper coil piece positioned at the second from the phase belt end far from the magnetic pole center and a lower coil piece positioned at the phase belt end far from the magnetic pole center, at the connection side coil end, lower coil pieces are sequentially connected from the lower coil piece with the above coil pitch, and an upper coil piece positioned at the phase belt end far from the magnetic pole center is connected to the neutral terminal lead-out connection conductor.

39. The armature winding of a rotating electrical machine according to claim 5, wherein:

the armature winding is a 3-phase 2-layer armature winding, in which an armature core is provided with 36 slots per one magnetic pole, a winding which forms one phase belt in each phase is configured by connecting first to third winding circuits in parallel for each phase, a coil pitch at the connection side coil end is three less than a winding pitch, and a coil pitch at the counter-connection side coil end is equal to the winding pitch, in a winding which forms a first phase belt in each phase, in an upper coil piece and a lower coil piece, parallel circuits are numbered sequentially 1, 2, 3, 1, 2, 3, 1, 2, 3, 1, 2, 3 from the position far from the magnetic pole center in the upper coil piece, and from the position close to the magnetic pole center in the lower coil piece, in a winding which forms a second phase belt that is the other phase belt, in an upper coil piece and a lower coil piece, parallel circuits are numbered 3, 2, 1, 3, 2, 1, 3, 2, 1, 3, 2, 1 sequentially from the position far from the magnetic pole center in the upper coil piece, and from the position close to the magnetic pole center in the lower coil pieces, in the first phase belt, in the first winding circuit, an upper coil piece at the fourth counted from the side far from the magnetic pole of the phase belt is connected to a lead-out connection conductor, and upper coil pieces are wound from the upper coil piece toward the magnetic pole center with the above coil pitch, a lower coil piece at the third counted from the side far from the magnetic pole center is connected to an upper coil piece positioned at the phase belt end far from the magnetic pole center by a jumper wire, a lower coil piece at the phase belt end close to the magnetic pole center connected to the upper coil piece is connected to a lower coil piece at the fourth counted from the side far from the magnetic pole center of the second phase belt, and lower coil pieces are wounded from the lower coil piece toward the magnetic pole center with the above coil pitch, and an upper coil piece at the third counted from the side far from the magnetic pole center is connected to a lower coil piece positioned at the phase belt end far from the magnetic pole center by a jumper wire, and an upper coil piece at the phase belt end close to the magnetic pole center connected to the neutral terminal lead-out connection conductor.

40. The armature winding of a rotating electrical machine according to claim 5, wherein:

the armature winding is a 3-phase 2-layer armature winding, in which an armature core is provided with 36 slots per one magnetic pole, a winding which forms one phase belt in each phase is configured by connecting first to third winding circuits in parallel for each phase, a coil pitch at the connection side coil end is three less than a winding pitch, and a coil pitch at the counter-connection side coil end is equal to the winding pitch, in a winding which forms a first phase belt in each phase, in an upper coil piece and a lower coil piece, parallel circuits are numbered 1, 2, 1, 1, 2, 2, 1, 1, 2, 1 sequentially from the position far from the magnetic pole center in the upper coil piece, and from the position close to the magnetic pole center in the lower coil piece, in a second phase belt that is the other phase belt, in an upper coil piece and a lower coil piece, parallel circuits are numbered 3, 2, 3, 3, 2, 3, 3, 2, 3, 3, 2, 3 sequentially from the position far from the magnetic pole center in the upper coil piece, and from the position close to the magnetic pole center in the lower coil piece, in the first phase belt, in the first winding circuit, an upper coil piece at the fourth counted from the side far from the magnetic pole of the phase belt is connected to a lead-out connection conductor, and upper coil pieces are wound from the upper coil piece toward the magnetic pole center with the above coil pitch, a lower coil piece positioned at the phase belt end far from the magnetic pole center is connected to an upper coil piece positioned at the phase belt end far from the magnetic pole center by a jumper wire, and wound from the upper coil piece with the above coil pitch, and a lower coil piece at the third counted from the side far from the magnetic pole center is connected to the neutral terminal lead-out connection conductor, and in the second phase belt, in the third winding circuit, a lower coil piece at the fourth counted from the side far from the magnetic pole of the phase belt is connected to a lead-out connection conductor, and lower coil pieces are wound from the lower coil piece toward the magnetic pole center with the above coil pitch, and an upper coil piece positioned at the phase belt end far from the magnetic pole center is connected to a lower coil piece positioned at the phase belt end far from the magnetic pole center by a jumper wire, and wounded from the lower coil piece with the above coil pitch, and an upper coil piece at the third counted from the side far from the magnetic pole center is connected to the neutral terminal lead-out connection conductor.

41. A rotating electrical machine comprising the armature winding according to claim 1.

\* \* \* \* \*